US012743220B2

(12) United States Patent
Ganigarakoppal Kantharaju et al.

(10) Patent No.: US 12,743,220 B2
(45) Date of Patent: Sep. 22, 2026

(54) SOFTWARE RAID MULTIPATH PLUGIN/DRIVER COMMUNICATION SYSTEM

(71) Applicant: Dell Products L.P., Round Rock, TX (US)

(72) Inventors: Nikhith Ganigarakoppal Kantharaju, Hassan (IN); Abhijit Shashikant Mirajkar, Bangalore (IN); Ajay Sukumaran Nair Syamala Bai, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 18/915,649

(22) Filed: Oct. 15, 2024

(65) Prior Publication Data

US 2026/0104811 A1 Apr. 16, 2026

(51) Int. Cl.
*G06F 3/06* (2006.01)

(52) U.S. Cl.
CPC .......... *G06F 3/0635* (2013.01); *G06F 3/0656* (2013.01); *G06F 3/0689* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16;
(Continued)

(56) References Cited

U.S. PATENT DOCUMENTS 6,272,591 B2 * 8/2001 Grun .................... G06F 3/0611 710/52
2014/0281306 A1 * 9/2014 Nakajima ............ G06F 3/0647 711/162

(Continued)

OTHER PUBLICATIONS

Implementing multipathing with the multipath-tools; IBM; Mar. 1, 2021; retrieved from https://web.archive.org/web/20240528051711/https://www.ibm.com/docs/en/linux-on-systems?topic=multipathing-implement (Year: 2021).*

(Continued)

*Primary Examiner* — Daniel C. Chappell
(74) *Attorney, Agent, or Firm* — Joseph Mencher

(57) ABSTRACT

A software RAID multipath plugin/driver communication system includes physical storage devices that are configured to provide a software RAID logical storage system, a software RAID driver subsystem that presents an active path and a failover path to the RAID logical storage system, and a software RAID multipath plugin subsystem coupled to the software RAID driver subsystem. The software RAID multipath plugin subsystem configures a buffer memory subsystem to receive software RAID data, generates a software RAID data command that requests the software RAID data from the software RAID driver subsystem, and transmits the software RAID data command via the failover path to the software RAID driver subsystem. In response to transmitting the software RAID data command, the software RAID multipath plugin subsystem initiates a software RAID data command timer and, in response to its completion, retrieves the software RAID data from the buffer memory subsystem.

20 Claims, 35 Drawing Sheets

(58) Field of Classification Search
CPC ... G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | | |
|---|---|---|---|---|
| 2015/0317219 | A1* | 11/2015 | Madhusudana ..... | G06F 11/2092 714/6.21 |
| 2020/0233584 | A1* | 7/2020 | Yang ...................... | G06F 11/00 |

OTHER PUBLICATIONS

W. Lei, H. Li, W. Zhang, S. Liu and Y. Guan, "A multipath transport system based on application level relay," 2015 IEEE Conference on Computer Communications Workshops (INFOCOM WKSHPS), Hong Kong, China, 2015, pp. 29-30, doi: 10.1109/INFCOMW.2015.7179327. (Year: 2015).*

Ritika and S. Sinha, "DynaSAN: Multipathing integration, load balancing & failover over storage virtualization," 2015 4th International Conference on Reliability, Infocom Technologies and Optimization (Trends and Future Directions), Noida, India, 2015, pp. 1-5, doi: 10.1109/ICRITO.2015.7359221. (Year: 2015).*

Wikipedia, "Multipath I/O," Wikipedia, The Free Encyclopedia, 1 page. Available at: https://en.wikipedia.org/w/index.php?title=Multipath_I/O&oldid=1221433818. Accessed Oct. 22, 2024.

Wikipedia, "Shared memory," Wikipedia, The Free Encyclopedia, 5 pages. Available at: https://en.wikipedia.org/w/index.php?title=Shared_memory&oldid=1187523856. Accessed Oct. 22, 2024.

* cited by examiner

1600

SOFTWARE RAID MULTIPATH PLUGIN SUBSYSTEM CONFIGURES BUFFER MEMORY SUBSYSTEM TO RECEIVE SOFTWARE RAID DATA ASSOCIATED WITH SOFTWARE RAID LOGICAL STORAGE SYSTEM
1602

SOFTWARE RAID MULTIPATH PLUGIN SUBSYSTEM GENERATES SOFTWARE RAID DATA COMMAND REQUESTING SOFTWARE RAID DATA FROM SOFTWARE RAID DRIVER SUBSYSTEM
1604

SOFTWARE RAID MULTIPATH PLUGIN SUBSYSTEM TRANSMITS SOFTWARE RAID DATA COMMAND VIA FAILOVER PATH TO SOFTWARE RAID DRIVER SUBSYSTEM AND INITIATES SOFTWARE RAID DATA COMMAND TIMER
1606

SOFTWARE RAID DRIVER SUBSYSTEM RECEIVES SOFTWARE RAID DATA COMMAND AND PROVIDES SOFTWARE RAID DATA IN BUFFER MEMORY SUBSYSTEM
1608

SOFTWARE RAID DATA COMMAND TIMER COMPLETES AND SOFTWARE RAID MULTIPATH PLUGIN SUBSYSTEM RETRIEVES SOFTWARE RAID DATA FROM BUFFER MEMORY SUBSYSTEM
1610

SOFTWARE RAID MULTIPATH PLUGIN DEALLOCATES BUFFER MEMORY SUBSYSTEM
1612

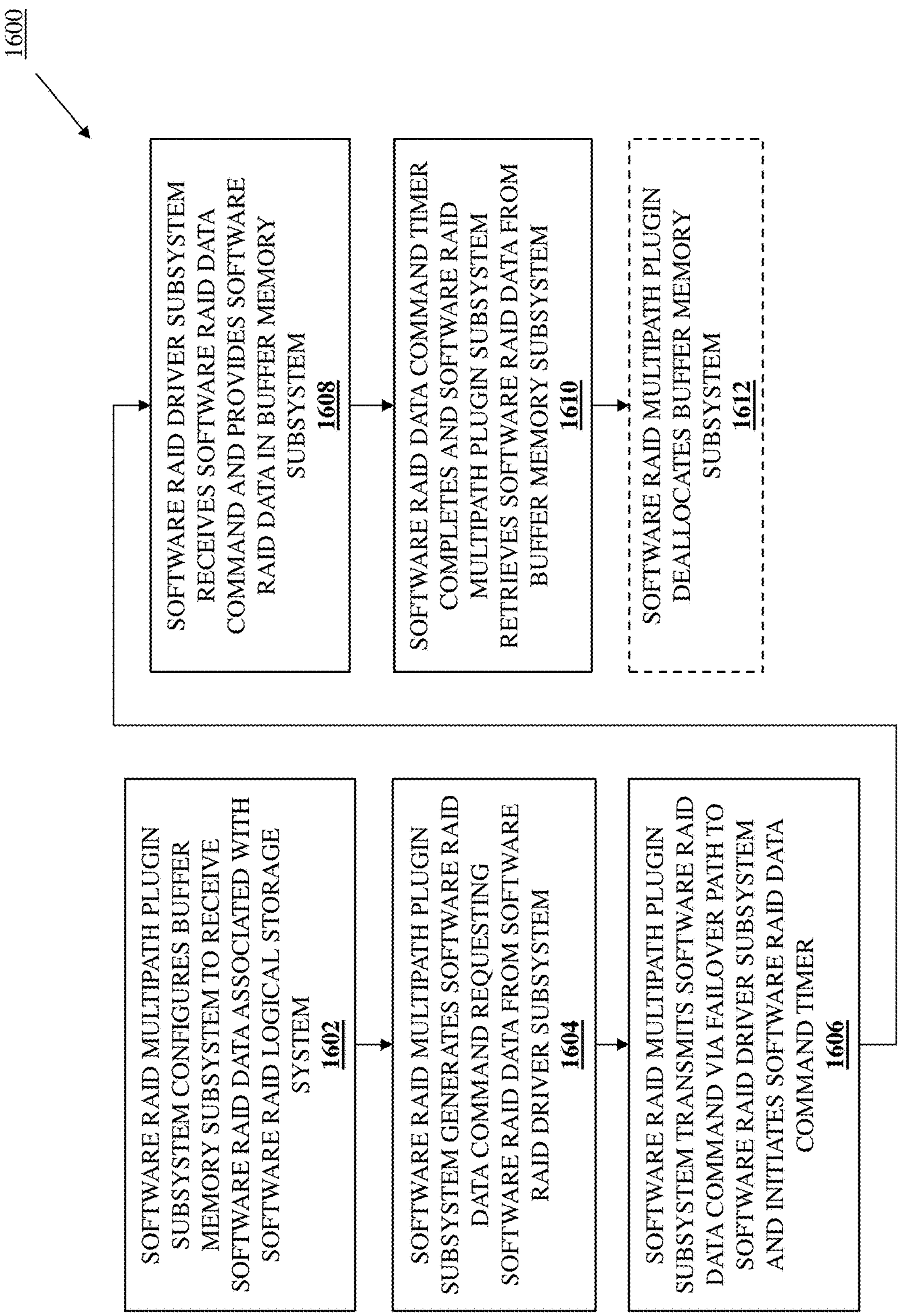

FIG. 16

SOFTWARE RAID MULTIPATH PLUGIN/DRIVER COMMUNICATION SYSTEM

CROSS-REFERENCE TO RELATED APPLICATIONS

The present application is related to the following co-pending applications: U.S. patent application Ser. No. 18/915,430, filed Oct. 15, 2024; U.S. patent application Ser. No. 18/915,500, filed Oct. 15, 2024; and U.S. patent application Ser. No. 18/915,862, filed Oct. 15, 2024, the disclosures of which are incorporated by reference herein in their entirety.

BACKGROUND

The present disclosure relates generally to information handling systems, and more particularly to multipath plugin/driver communications in a software Redundant Array of Independent Disks (RAID) that is provided using an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, sometimes use a software Redundant Array of Independent Disks (RAID) to store their data. As will be appreciated by one of skill in the art in possession of the present disclosure, a software RAID uses software in place of dedicated hardware (e.g., a hardware RAID controller, etc.) in order to perform RAID operations that utilize multiple physical storage devices to provide a RAID logical storage system that is configured to store data in a manner that provides data redundancy, storage performance improvements, and/or other RAID benefits known in the art. For example, a server device will typically utilize its processing resources (e.g., the Central Processing Unit (CPU), operating system, drivers, etc.) to perform RAID operations for the software RAID that include data redundancy operations, striping operations, and/or other RAID operations known in the art. However, the conventional provisioning of a software RAID can raise some issues.

For example, some conventional operating systems (e.g., the ESXi hypervisor available from VMWARE, LLC of Palo Alto, California, United States) utilize a storage controller that requires native Small Computer System Interface (SCSI) drivers, thus requiring a software RAID driver for that operating system to be provided by a native SCSI driver (a "software RAID SCSI driver" below). However, many conventional software RAID systems are provided using Non-Volatile Memory express (NMVe) storage devices, and in such conventional software RAID systems the software RAID SCSI drivers discussed above must receive Input/Output (IO) commands from the operating system in an SCSI format (e.g., in a Command Descriptor Block (CDB)), convert those I/O commands to NVMe commands, and send those NVMe commands to the NVMe storage devices. Similarly, in such conventional software RAID systems the software RAID SCSI drivers discussed above must receive NVMe responses from the NVMe storage devices, convert those NVMe responses to SCSI responses, and send those SCSI responses to the operating system.

Furthermore, in conventional software RAID systems the software RAID SCSI drivers discussed above present the RAID logical storage system to the operating system as being controlled by a native controller that is included in the processing system of the server device, that is not hot-removable, and that performs RAID operations using the logical storage system. For example, in some processing systems that native controller is provided by an Advanced Host Controller Interface (AHCI) controller, while in other processing systems (e.g., Virtual RAID on CPU (VROC) processing systems available from INTEL® corporation of Santa Clara, California, United States) that native controller is provided by a Volume Management Device (VMD). As will be appreciated by one of skill in the art, such native controller requirements result in the native controllers discussed above being provided in processing systems in order to support software RAIDs even in server devices that do not support Serial AT Attachment (SATA) storage devices (e.g., a server device including only NVMe storage devices).

As will be appreciated by one of skill in the art in possession of the present disclosure, such software RAID hardware dependencies (e.g., the dependency of the software RAID on the native controller provided in the processing system by the AHCI controller or VMD) raise the costs of providing software RAIDs. Furthermore, for processing systems that use the AHCI controller as the native controller discussed above, a chipset SATA controller that provides the AHCI operates as a dedicated boot controller for the software RAID. However, such chipset SATA controllers are being phased out of future server devices, thus presenting issues with the ability to control the boot of software RAIDs in the future. Further still, even in the event a new dedicated boot controller is provided in future processing systems (i.e., in place of the chipset SATA controller discussed above), such hardware controllers require development resources for each generation of server device, thus raising costs associated with those server devices as described above.

Accordingly, it would be desirable to provide a software RAID provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an operating system engine that includes: a software Redundant Array of Independent Disks (RAID) multipath plugin sub-engine is configured to: configure a buffer memory subsystem to receive software RAID data associated with a software RAID logical storage system that is provided by a plurality of physical storage devices and for which an active path and a failover path are presented by a software RAID driver sub-engine included in the operating system engine; generate a software RAID data command that requests the software RAID data from the software RAID driver sub-engine; transmit the software RAID data command via the failover path to the software RAID driver sub-engine; initiate, in response to transmitting the software RAID data command, a software RAID data command timer; and retrieve, in response to completion of the software RAID data command timer, the software RAID data from the buffer memory subsystem.

BRIEF DESCRIPTION OF THE DRAWINGS

FIG. 16 is a flow chart illustrating an embodiment of a portion of a method for providing multipath plugin/driver communications in a software RAID.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
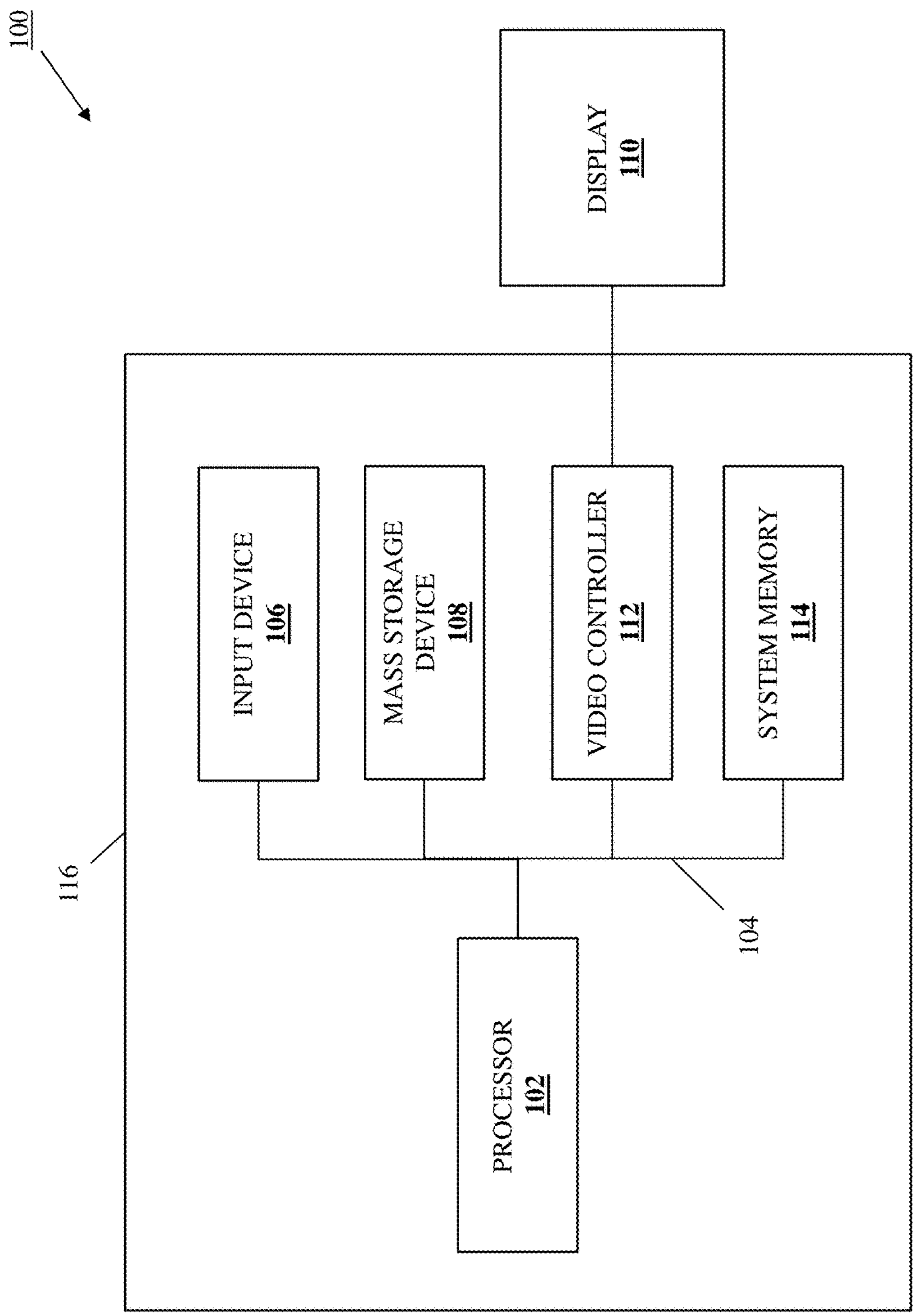
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
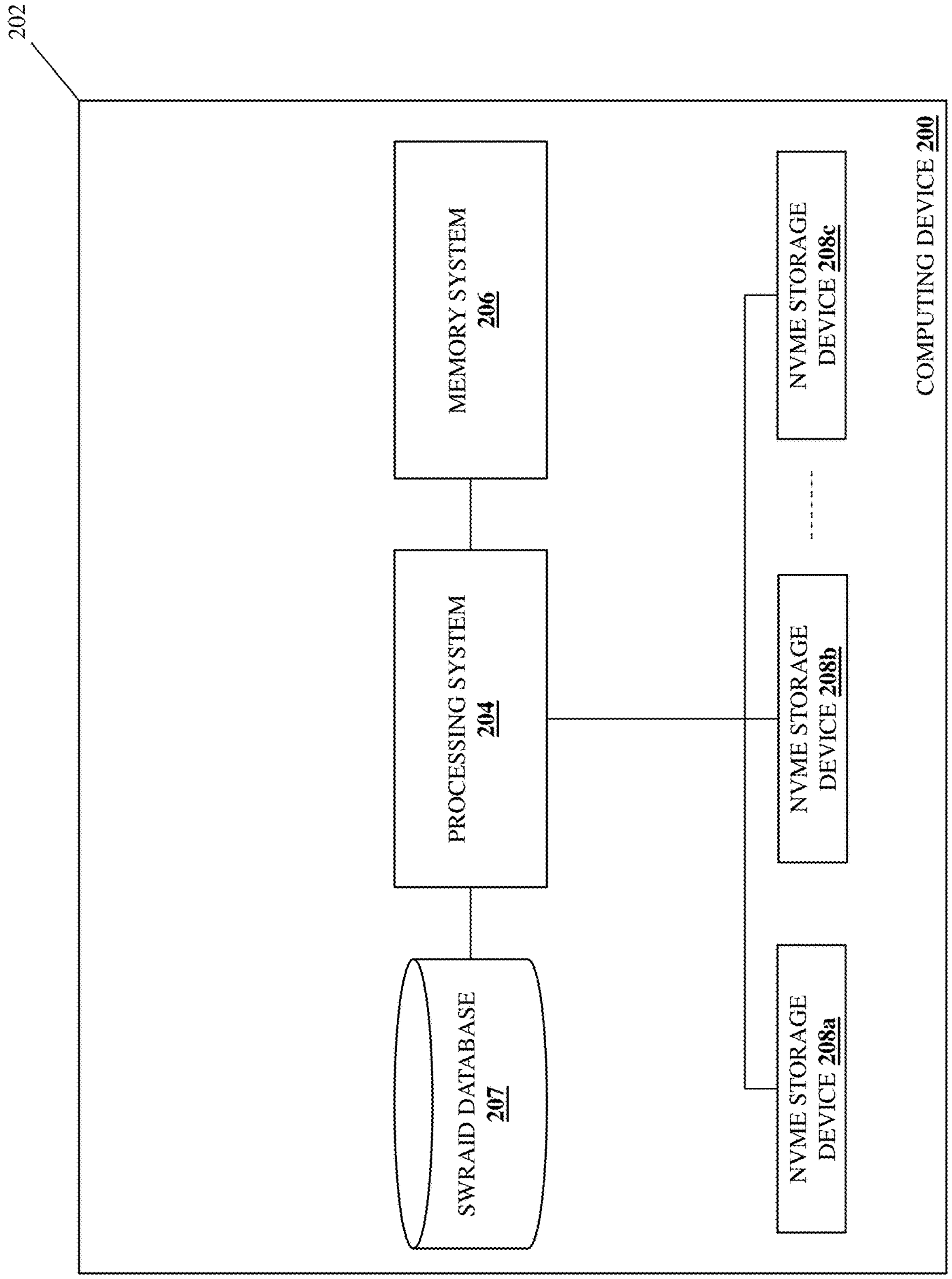
FIG. 2 is a schematic view illustrating an embodiment of a computing device that may provide the software RAID provisioning system of the present disclosure.

Referring now to FIG. 2, an embodiment of a computing device 200 is illustrated that may provide the software RAID provisioning system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other devices that are configured to operate similarly as the computing device 200 discussed below.

In the illustrated embodiment, the computing device 200 includes a chassis 202 that houses the components of the computing device 200, only some of which are illustrated and described below. For example, the chassis 202 may house a processing system 204 that may include the processor 102 discussed above with reference to FIG. 1 such as, for example, a Central Processing Unit (CPU) and/or other processors that would be apparent to one of skill in the art in possession of the present disclosure. The chassis 202 may also house a memory system 206 that is coupled to the processing system 204 and that may include the memory 114 discussed above with reference to FIG. 1 such as, for example, a Dynamic Random Access Memory (DRAM) system and/or other memory systems that would be apparent to one of skill in the art in possession of the present disclosure. As discussed below, the memory system 206 may include instructions that, when executed by the processing system 204, cause the processing system 204 to provide an operating system engine that is configured to provide an operating system for the computing device 200 that performs the functionality of the operating system engines, operating systems, and/or computing devices discussed below.

The chassis 202 may also house a storage system (not illustrated, but which may include the storage 108 discussed above with reference to FIG. 1) that is coupled to the processing system 204 and that includes a software RAID ("SWRAID" in FIG. 2 and the other figures referenced below) database 207 that is configured to store any of the information utilized by the operating system engine provided by the processing system 204 as described below. In the embodiments illustrated and described below, the chassis 202 also houses a plurality of physical storage devices that are provided by Non-Volatile Memory express (NVMe) storage devices 208*a*, 208*b*, and up to 208*c* and that are coupled to the processing system 204 via respective physical paths (i.e., cabling, ports, traces, and/or other processor/storage device connections/couplings that would be apparent to one of skill in the art in possession of the present disclosure) to provide a Direct Attached Storage (DAS) topology.

As will be appreciated by one of skill in the art in possession of the present disclosure, each of the physical storage devices may include a physical controller such as, for example, an NVMe controller in each of the NVMe storage devices 208*a*-208*c* in the examples illustrated and described below. As will be appreciated by one of skill in the art in possession of the present disclosure, such NVMe controllers have not conventionally be used to provide primary controllers for a software RAID logical storage system because NVMe devices are "hot-removable" from the computing device 200 (i.e., they may be disconnected/decoupled from the processing system 200 while the processing system provides an operating system for the computing device 200), and such hot-removal of the primary controller for a software RAID logical storage system would "crash" or otherwise render the software RAID logical storage system unavailable. However, as discussed below, the systems and methods of the present disclosure allow the use of NVMe storage devices to provide primary controllers for a software RAID logical storage system, and one of skill in the art in possession of the present disclosure will appreciate how the NVMe storage devices described herein may be replaced by other types of storage devices with similar functionality as the NVMe storage devices (e.g., storage devices including controllers similar to NVMe controllers) while remaining within the scope of the present disclosure.

Furthermore, while physical storage devices housed in the chassis 202 are illustrated and described below, one of skill in the art in possession of the present disclosure will recognize how physical storage devices utilized in the software RAID provisioning system of the present disclosure may be located outside of the chassis 202 of the computing device 200 (i.e., while connected to the processing system 204 via a cable, network, etc.), and/or may be provided in any of a variety of physical storage device configurations while remaining within the scope of the present disclosure as well. As such, while a specific computing device 200 has been illustrated and described, one of skill in the art in possession of the present disclosure will recognize that computing devices (or other devices operating according to the teachings of the present disclosure in a manner similar to that described below for the computing device 200) may include a variety of components and/or component configurations for providing conventional computing device functionality, as well as the software RAID provisioning functionality discussed below, while remaining within the scope of the present disclosure as well.

Figure 3A:
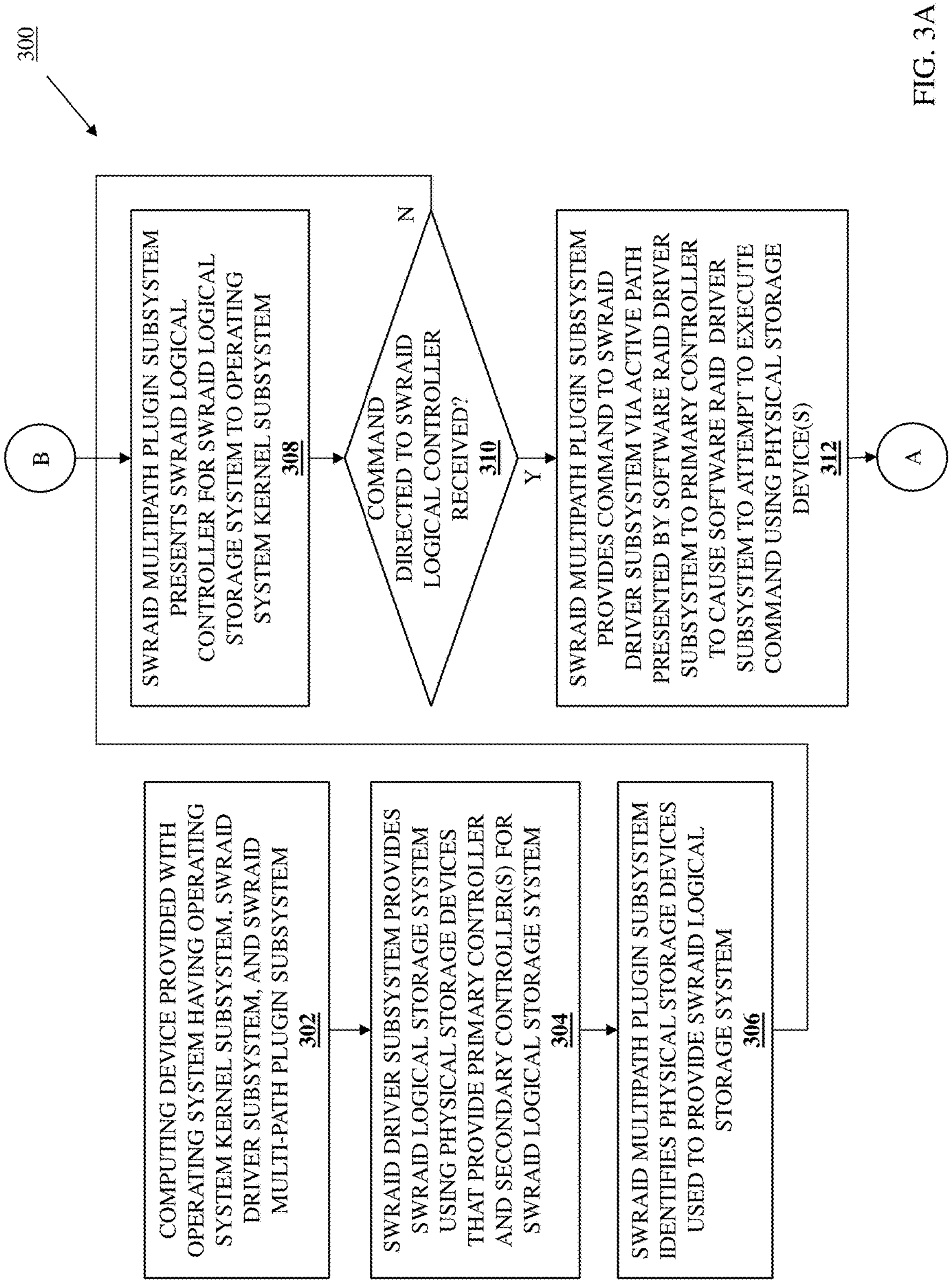
FIG. 3A is a flow chart illustrating an embodiment of a portion of a method for providing a software RAID.
Figure 3B:
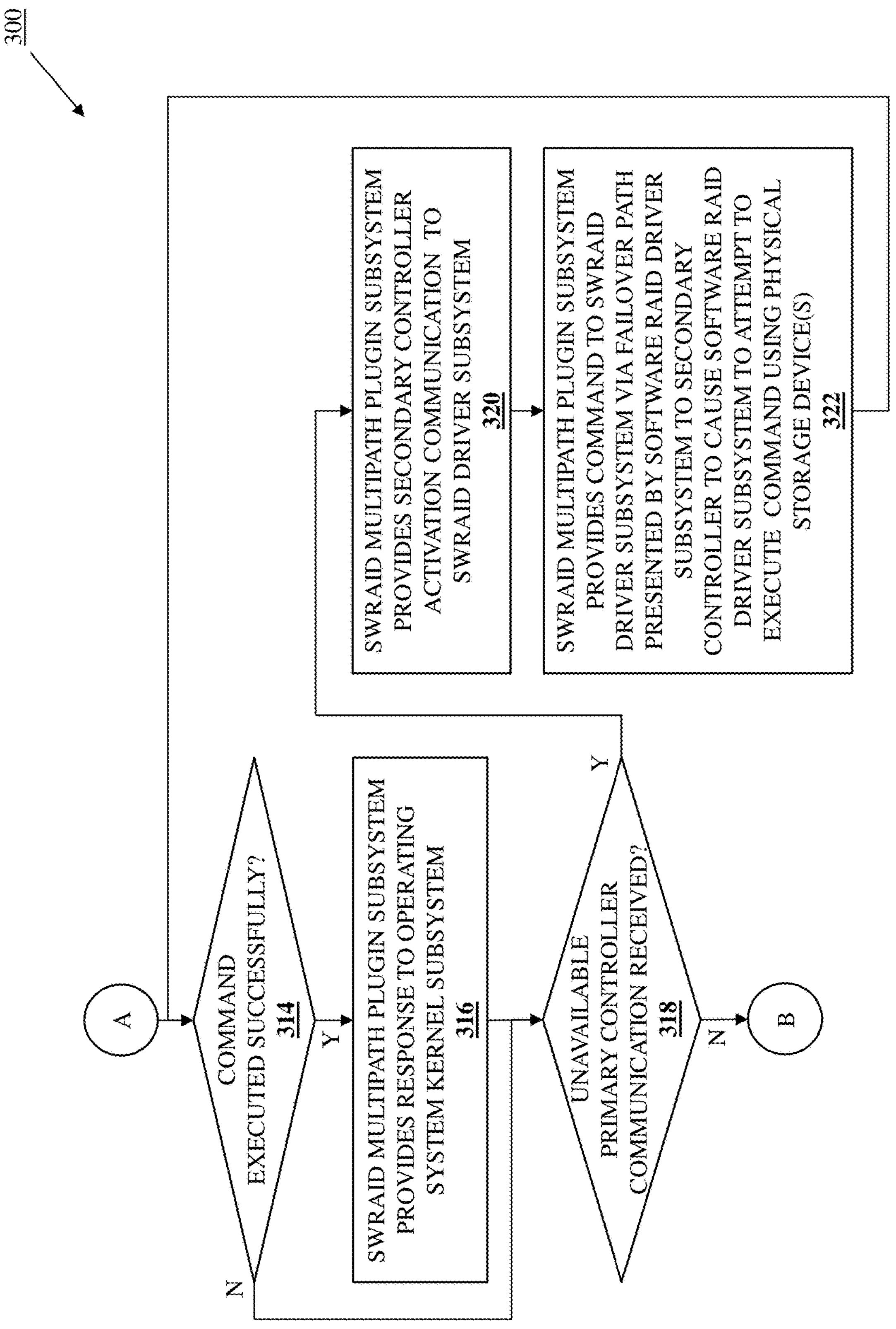
FIG. 3B is a flow chart illustrating an embodiment of a portion of a method for providing a software RAID.

Referring now to FIGS. 3A and 3B, an embodiment of a method 300 for providing a software Redundant Array of Independent Disks (RAID) is illustrated. As discussed below, the systems and methods of the present disclosure provide a software RAID multipath plugin for an operating system that allows any of a plurality of hot-removable storage devices that provide a software RAID logical storage system to be presented as the controller for the software RAID logical storage system via presentation of an "active" path to that controller. For example, the software RAID provisioning system of the present disclosure may include an operating system having a software RAID multipath plugin coupled to a software RAID driver and an operating system kernel. The software RAID multipath plugin identifies first and second physical storage devices that have been configured by the software RAID driver to provide a software RAID logical storage system, and that provide a primary and secondary controller, respectively, for the software RAID logical storage system. The software RAID multipath plugin then presents a software RAID logical controller for the software RAID logical storage system to the operating system kernel. When the software RAID multipath plugin receives a command from the operating system kernel directed to the software RAID logical controller, it provides the command via an active path to the primary controller presented by the software RAID driver to cause the software RAID driver to attempt to execute the command As will be appreciated by one of skill in the art in possession of the present disclosure, the systems and methods of the present disclosure eliminate the hardware dependency of software RAIDs on the native controller provided in the processing system used to provide those software RAIDs, solving the issues with conventional software RAID provisioning systems discussed above.

Figure 4:
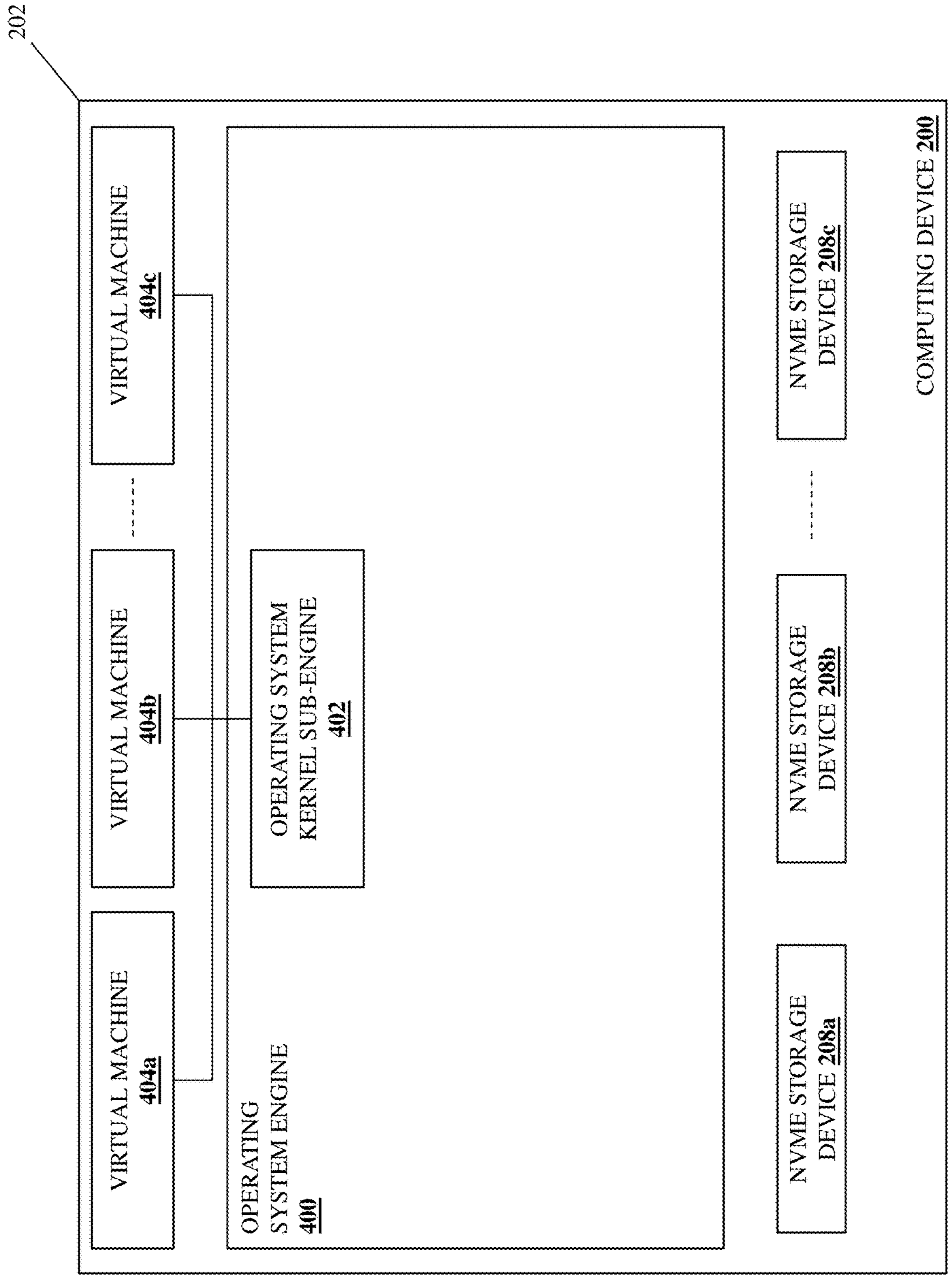
FIG. 4 is a schematic view illustrating an embodiment of the computing device of FIG. 2 operating during the method of FIG. 3.

The method 300 begins at block 302 where a computing device is provided with an operating system having an operating system kernel subsystem, a software RAID driver subsystem, and a software RAID multi-path plugin subsystem. With reference to FIGS. 2 and 4, in an embodiment of block 302, the processing system 204 in the computing device 200 may execute instructions stored on the memory system 206 to provide an operating system engine 400 that is configured to provide an operating system for the computing device 200 that performs any of the operating system operations described below. In a specific example, the operating system engine 400 may be configured to provide a hypervisor such as the ESXi hypervisor available from VMWARE, LLC of Palo Alto, California, United States, although one of skill in the art in possession of the present disclosure will appreciate how other operating systems will fall within the scope of the present disclosure as well. As will be appreciated by one of skill in the art in possession of the present disclosure, the operating system provided by the operating system engine 400 includes the storage multipath functionality described below that allows simultaneous use of multiple physical data paths between the processing system 204 and a software RAID logical storage system (e.g., a RAID volume/LUN) provided by the NVMe storage devices 208*a*-208*c*.

As illustrated, the processing system 204 in the computing device 200 may also execute instructions stored on the memory system 206 to provide an operating system kernel sub-engine 402 in the operating system engine 400 that is configured to provide an operating system kernel for the operating system that performs any of the operating system kernel operations performed by the operating system kernel sub-engines, operating system kernel subsystems, operating system engines, operating systems, and/or computing devices described below. In a specific example, the operating system kernel sub-engine 402 may be configured to provide a virtual machine kernel that, as illustrated, is configured to use the components in the computing device 200 to provide a plurality of virtual machines 404*a*, 404*b*, and up to 404*c*, although one of skill in the art in possession of the present disclosure will appreciate how other operating system kernels will fall within the scope of the present disclosure as well.

Figure 5:
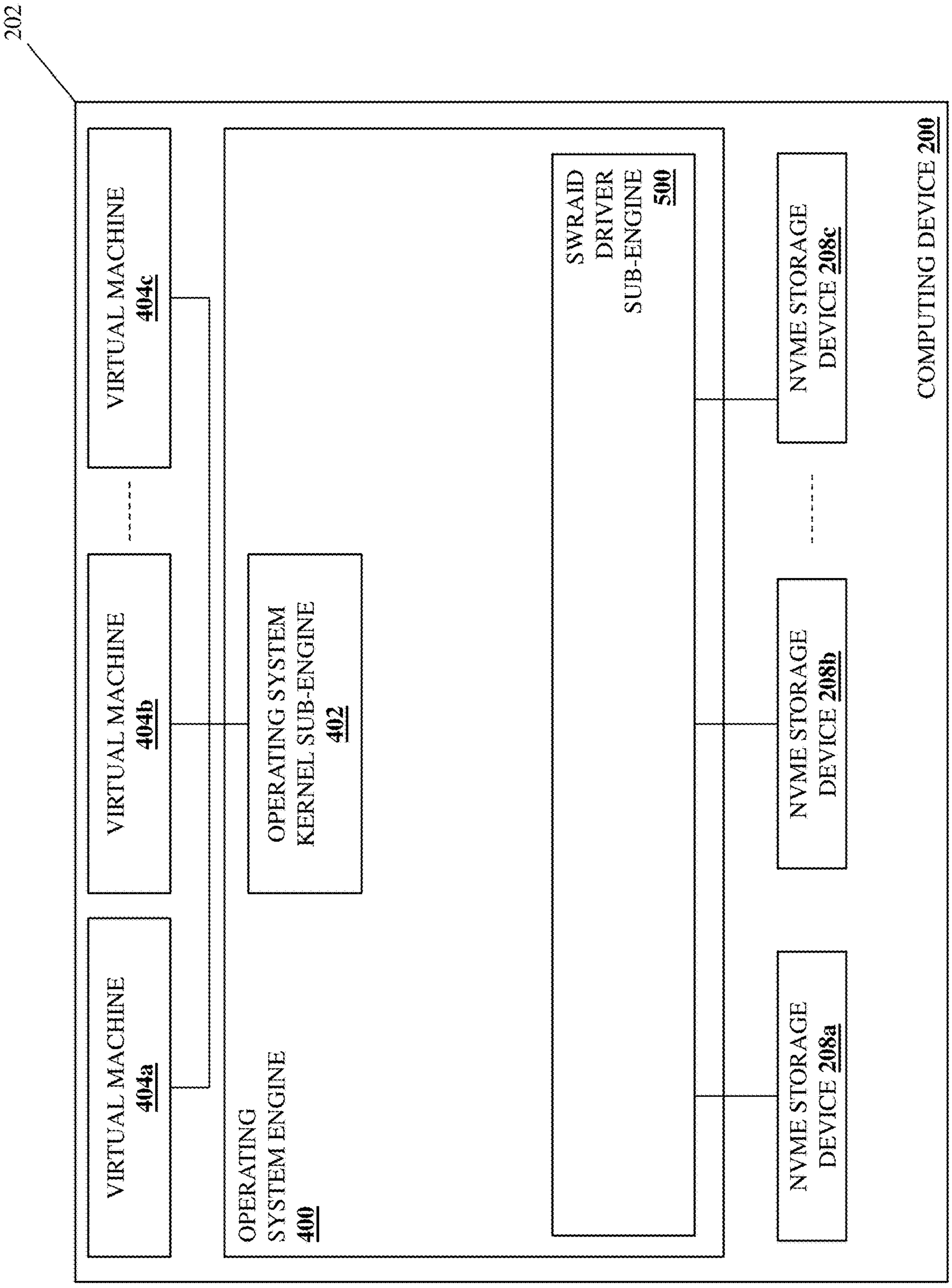
FIG. 5 is a schematic view illustrating an embodiment of the computing device of FIG. 2 operating during the method of FIG. 3.

With reference to FIG. 5, as part of the provisioning of the operating system by the operating system engine 400 (e.g., during a boot process or other initialization of the computing device 200), the processing system 204 in the computing device 200 may execute instructions stored on the memory system 206 to provide a software RAID driver sub-engine 500 in the operating system engine 400 that is configured to provide a software RAID driver for the operating system that is coupled to each of the NVMe storage devices 208*a*-208*c* (e.g., via a coupling between the processing system 204 and the NVMe storage devices 208*a*-208*c*), and that performs any of the software RAID driver operations performed by the software RAID driver sub-engines, software RAID driver subsystems, operating system engines, operating systems, and/or computing devices described below.

In the specific examples discussed below, the software RAID driver sub-engine 500 is provided by an NVMe driver sub-engine that is configured to provide an NVMe driver that operates with an NVMe transport layer in the operating system kernel sub-engine 402 to eliminate the need for SCSI-to-NVMe translations. However, in other embodiments, the software RAID driver sub-engine 500 may be provided by a Small Computer System Interface (SCSI) driver sub-engine that is configured to provide a SCSI driver that supports the NVMe storage devices 208*a*-208*c*, which one of skill in the art in possession of the present disclosure will appreciate may include receiving CDB-format SCSI commands generated by the operating system kernel sub-engine 402 and converting them to NVMe commands (e.g., using a SCSI-to-NVMe translation layer). Furthermore, while two specific examples have been described, one of skill in the art in possession of the present disclosure will appreciate how the software RAID driver sub-engine 500 may be, provided by other storage technology driver sub-engine/drivers known in the art.

Figure 6:
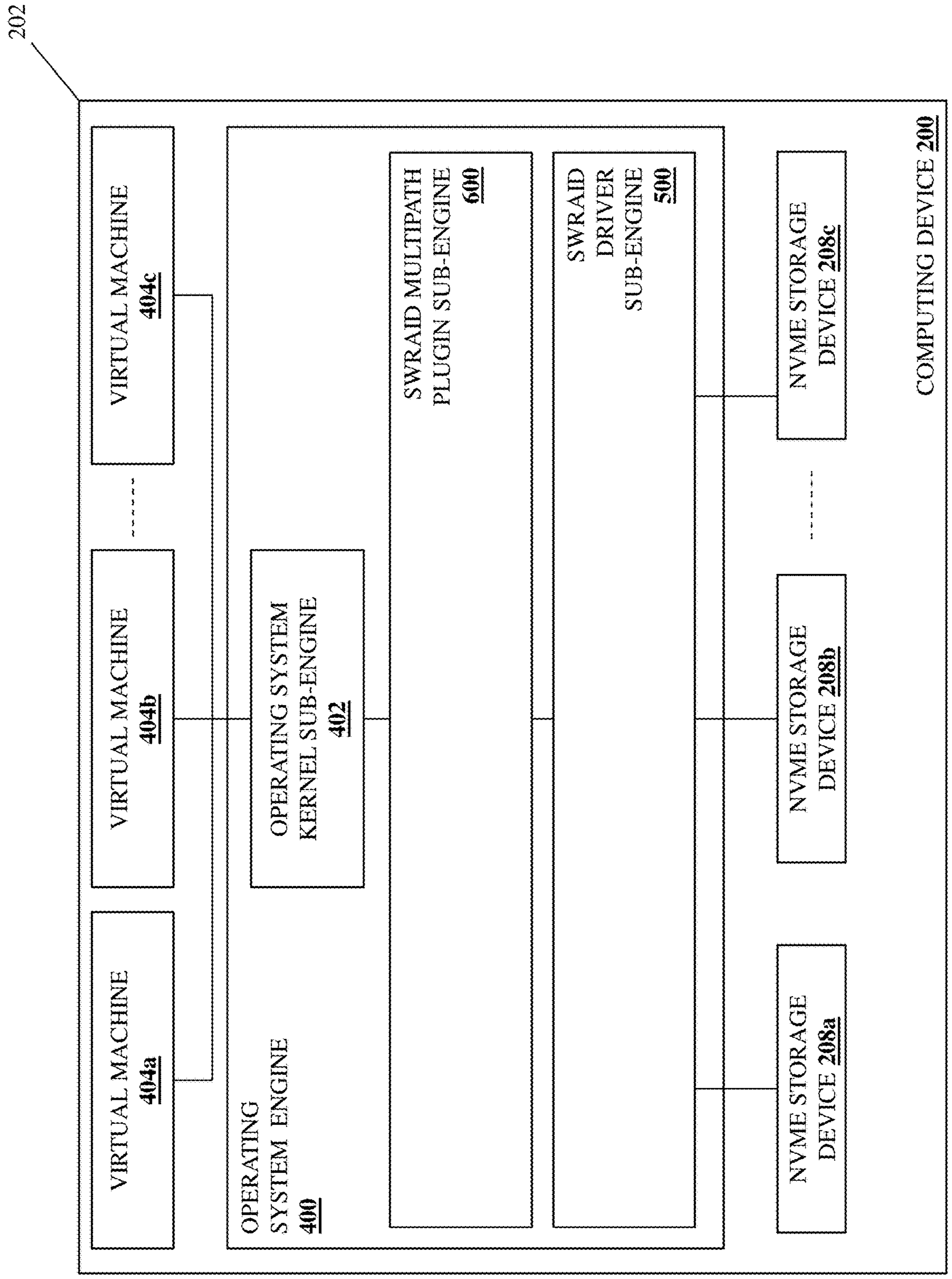
FIG. 6 is a schematic view illustrating an embodiment of the computing device of FIG. 2 operating during the method of FIG. 3.

With reference to FIG. 6, as part of the provisioning of the operating system by the operating system engine 400 (e.g., during a boot process or other initialization of the computing device 200), the processing system 204 in the computing device 200 may execute instructions stored on the memory system 206 to provide a software RAID multipath plugin sub-engine 600 in the operating system engine 400 that is configured to provide a software RAID multipath plugin for the operating system that performs any of the software RAID multipath plugin operations performed by the software RAID multipath plugin sub-engines, software RAID multipath plugin subsystems, operating system engines, operating systems, and/or computing devices described below. As illustrated, the software RAID multipath plugin sub-engine 600 is communicatively coupled to each of the operating system kernels sub-engine 402 and the software RAID driver sub-engine 500 using any of a variety of hardware/software coupling techniques known in the art.

As will be appreciated by one of skill in the art in possession of the present disclosure, the provisioning of the software RAID driver sub-engine 500 and the software RAID multipath plugin sub-engine 600 at block 302 may be based on one or more claim rules in a claim rule set. For example, a claim rule may provide for the loading or other provisioning of the software RAID multipath plugin sub-engine 600 whenever the software RAID driver sub-engine 500 has been loaded (e.g., during boot or other initialization of the computing device 200 as described above). However, in another example, a claim rule may provide for the loading or other provisioning of the software RAID multipath plugin sub-engine 600 when a software RAID logical storage system is detected as being provided by the software RAID driver sub-engine 500 as described in further detail below. However, while two specific claim rules/techniques for providing the software RAID multipath plugin sub-engine 600 have been described, one of skill in the art in possession of the present disclosure will appreciate how the software RAID multipath plugin sub-engine 600 may be provide using a variety of techniques and in a variety of manners that will fall within the scope of the present disclosure.

In some examples, the software RAID multipath plugin sub-engine 600 may be provided using a "native multipath plugin" for the operating system provided by the operating system engine 400, which one of skill in the art in possession of the present disclosure will recognize requires a provider of the operating system engine 400/operating system to configure the "native multipath plugin" with the functionality of the software RAID multipath plugin sub-engine 600 described below. However, in other examples, the software RAID multipath plugin sub-engine 600 may be provided using a "third-party multipath plugin" for the operating system provided by the operating system engine 400, which one of skill in the art in possession of the present disclosure will recognize allows a third-party to configure the "third-party multipath plugin" with the functionality of the software RAID multipath plugin sub-engine 600 described below, and provide it for use with the operating system engine 400 and its operating system. As such, if the "native multipath plugin" for the operating system provided by the operating system engine 400 does not provide the functionality of the software RAID multipath plugin sub-engine 600 described below, the third-party plugin for the operating system provided by the operating system engine 400 may be developed to do so.

Figure 7:
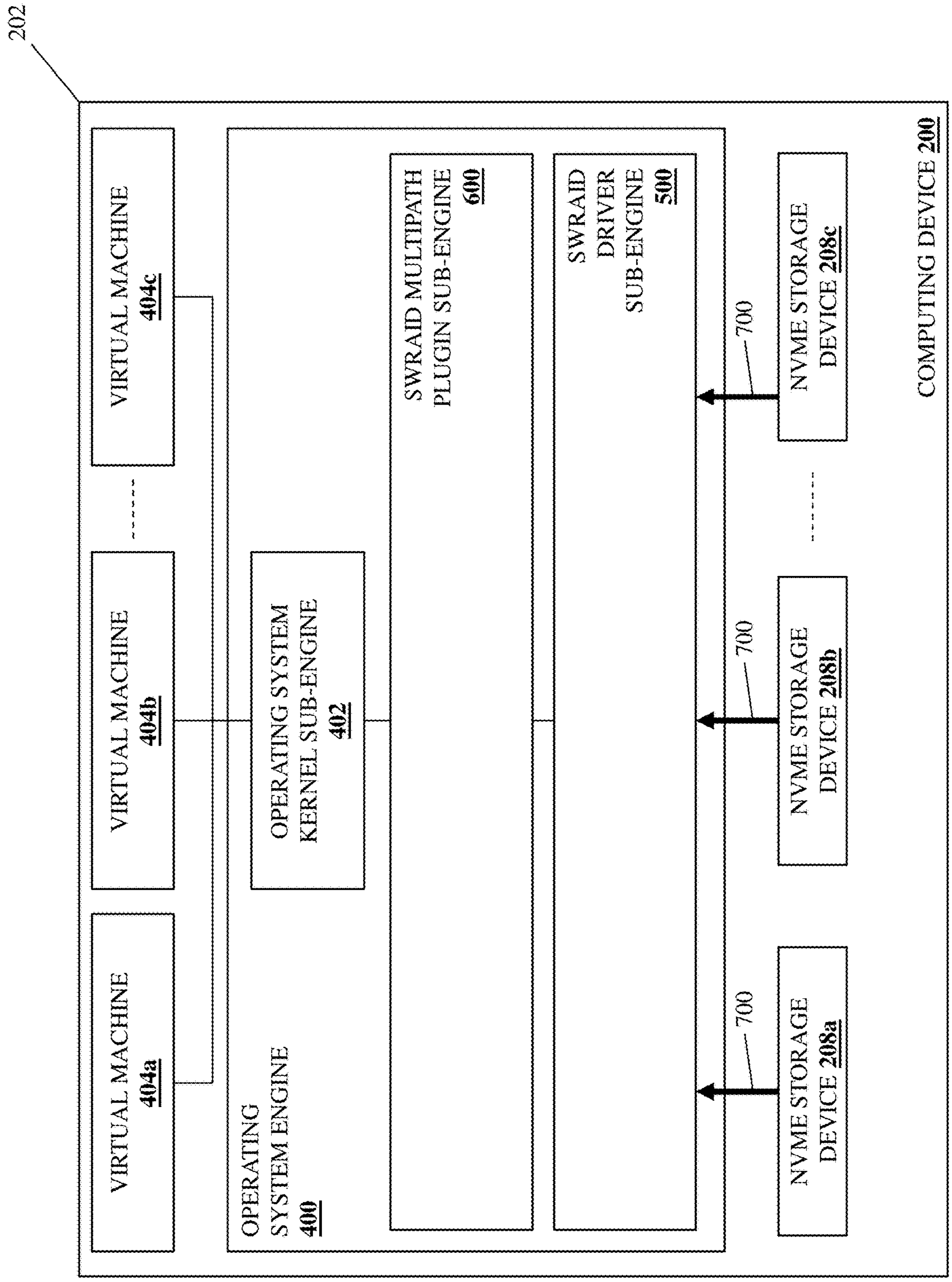
FIG. 7 is a schematic view illustrating an embodiment of the computing device of FIG. 2 operating during the method of FIG. 3.
Figure 8:
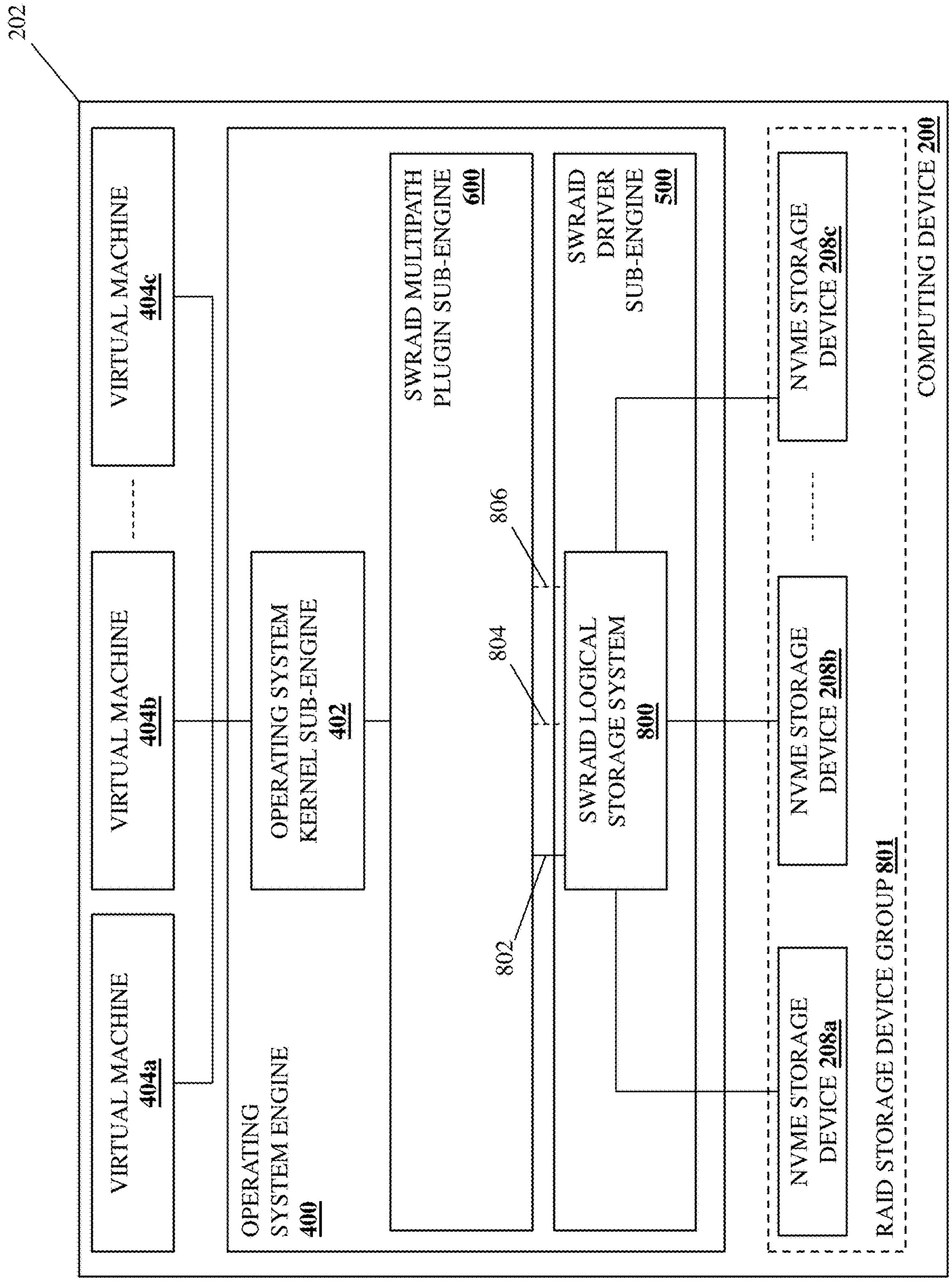
FIG. 8 is a schematic view illustrating an embodiment of the computing device of FIG. 2 operating during the method of FIG. 3.

The method 300 then proceeds to block 304 where the software RAID driver subsystem provides a software RAID logical storage system using physical storage devices that provide a primary controller and at least one secondary controller for the software RAID logical storage system. With reference to FIG. 7, in an embodiment of block 304, the software RAID driver sub-engine 500 in the operating system engine 400 of the computing device 200 may initialize and discover each of the NVMe storage devices 208*a*, 208*b*, and up to 208*c*, and then perform storage device metadata retrieval operations 700 that include retrieving metadata from each of the NVMe storage devices 208*a*, 208*b*, and up to 208*c*. With reference to FIG. 8, the software RAID driver sub-engine 500 may then use the metadata retrieved from the NVMe storage devices 208*a*, 208*b*, and up to 208*c* with any of a variety of software RAID creation techniques known in the art to create a software RAID logical storage subsystem 800 that one of skill in the art in possession of the present disclosure will recognize provides a RAID volume, Logical Unit Number (LUN), and/or other software RAID logical storage known in the art.

In the illustrated example, each of the NVMe storage devices 208*a*-208*c* are used to provide the software RAID logical storage system 800, and thus those NVMe storage devices 208*a*-208*c* belong to a RAID storage device group 801 (e.g., a "RAID disk group"). However, one of skill in the art in possession of the present disclosure will appreciate the software RAID provisioning system of the present disclosure may provide a software RAID using as few as two physical storage devices while remaining within the scope of the present disclosure as well.

Following the provisioning of the software RAID logical storage system 800, the software RAID driver sub-engine 500 may select one of the NVMe storage devices 208*a*-208*c* to present as a primary controller for the software RAID logical storage system 800, and may select at least one of the remaining NVMe storage devices 208*a*-208*c* (i.e., other than the NVMe storage device that was selected for presentation as the primary controller) to present as a secondary controller for the software RAID logical storage system 800, and one of skill in the art in possession of the present disclosure will appreciate how any selection criteria known in the art may be used to select the primary controller and the secondary controller(s) at block 304.

In the embodiments illustrated and described below, the software RAID driver sub-engine 500 selects the NVMe storage device 208*a* for presentation as the primary controller for the software RAID logical storage system 800 (as indicated by the "active" path 802 illustrated by the solid line connecting the software RAID logical storage system 800 to the software RAID multipath plugin sub-engine 600 that, as described below, is presented by the software RAID driver sub-engine 500 between the software RAID logical storage system 800 and the software RAID multipath plugin sub-engine 600), and selects the NVMe storage device 208*c* for presentation as the secondary controller for the software RAID logical storage system 800 (as indicated by the "failover" path 806 illustrated by the dashed line connecting the software RAID logical storage system 800 to the software RAID multipath plugin sub-engine 600 that, as described below, is presented by the software RAID driver sub-engine 500 between the software RAID logical storage system 800 and the software RAID multipath plugin sub-engine 600).

While not illustrated or described in detail below, the software RAID driver sub-engine 500 may also select the NVMe storage device 208*b* for presentation as a tertiary controller for the software RAID logical storage system 800 (as indicated by the "failover" path 804 illustrated by the dashed line connecting the software RAID logical storage system 800 to the software RAID multipath plugin sub-engine 600 that, as described below, is presented by the software RAID driver sub-engine 500 between the software RAID logical storage system 800 and the software RAID multipath plugin sub-engine 600), and one of skill in the art in possession of the present disclosure will appreciate how the tertiary controller may provide failover for the secondary controller in the event the secondary controller is unavailable similarly as described below with regard to the secondary controller providing failover for the primary controller in the event the primary controller is unavailable.

Furthermore, while the presentation of only two failover paths are illustrated and described herein, one of skill in the art in possession of the present disclosure will appreciate how failover paths in the software RAID provisioning system of the present disclosure are only limited by the number of NVMe storage devices that are used to provide the software RAID logical storage system 800 (i.e., failover path may be presented to each NVMe storage device that provides the software RAID logical storage system, other than the NVMe storage device presented as the primary controller for the software RAID logical storage system). In the discussions below, the tertiary controller may be considered a "second" secondary controller, a quaternary controller provided by another NVMe storage device (not illustrated) may be considered a "third" secondary controller, and so on, such that a plurality of "failover" paths to respective "secondary controllers" for the software RAID logical storage system 800 are presented.

While the paths to the NVMe storage devices 208*a*-208*c* are illustrated and described below as being used to present "active" and "failover" paths to controllers provided by the NVMe storage devices 208*a*-208*c*, one of skill in the art in possession of the present disclosure will appreciate how the paths to the NVMe storage devices 208*a*-208*c* may provide a variety of other functionality that will fall within the scope of the present disclosure as well. For example, the inventors of the present disclosure describe techniques for performing data striping by the software RAID multi-path plugin sub-engine 600 via the paths to the NVMe storage devices 208*a*-208*c* in U.S. patent application Ser. No. 18/915,862, filed Oct. 15, 2024, the disclosure of which is incorporated by reference herein in its entirety. Furthermore, while not described in detail below, one of skill in the art in possession of the present disclosure will recognize how the paths to the NVMe storage devices 208*a*-208*c* may be used for load balancing associated with data storage operations for the software RAID logical storage system 800, as well any other operations that would be apparent to one of skill in the art in possession of the present disclosure.

The software RAID driver sub-engine 500 may then report the paths for the NVMe storage devices 208*a*-208*c* that are being used to provide the RAID logical storage system 800 to the software RAID multipath plugin sub-engine 600. For example, the software RAID driver sub-engine 500 may generate controller/path information for each NVMe storage device that is being used to provide the software RAID logical storage system 800, and may store that controller/path information in the software RAID database 207. To provide a specific example, a format that identifies the NVMe storage device, the controller included in that NVMe storage device, a target that identifies the address of that NVMe storage device, and in the case of the primary controller, the software RAID logical storage system, may be used as follows for each NVMe storage device 208*a*-208*c* to identify the controller/path information for the NVMe storage devices 208*a*-208*c* providing the software RAID logical storage system 800:

"NVME208*a*:Controller208*a*:target208*a*:SWRAIDLogicalStorage800"

"NVME208*b*:Controller208*b*:target208*b*"

"NVME208*c*:Controller208*c*:target208*c*"

As will be appreciated by one of skill in the art in possession of the present disclosure, the controller/path information used to identify the NVMe storage device that is presented as the primary controller (i.e., the NVMe storage device 208*a* in the above example) includes an identification of the software RAID logical storage system (i.e., the software RAID logical storage system 800), while the controller/path information used to identify the NVMe storage devices (i.e., the NVMe storage devices 208*b* and 208*c* in the above example) that are presented as the secondary/tertiary controllers does not identify the software RAID logical storage system. However, other controller/physical path formats and/or controller/path information conventions may be used to identify physical storage devices providing a software RAID logical storage system while remaining within the scope of the present disclosure as well.

Figure 9:
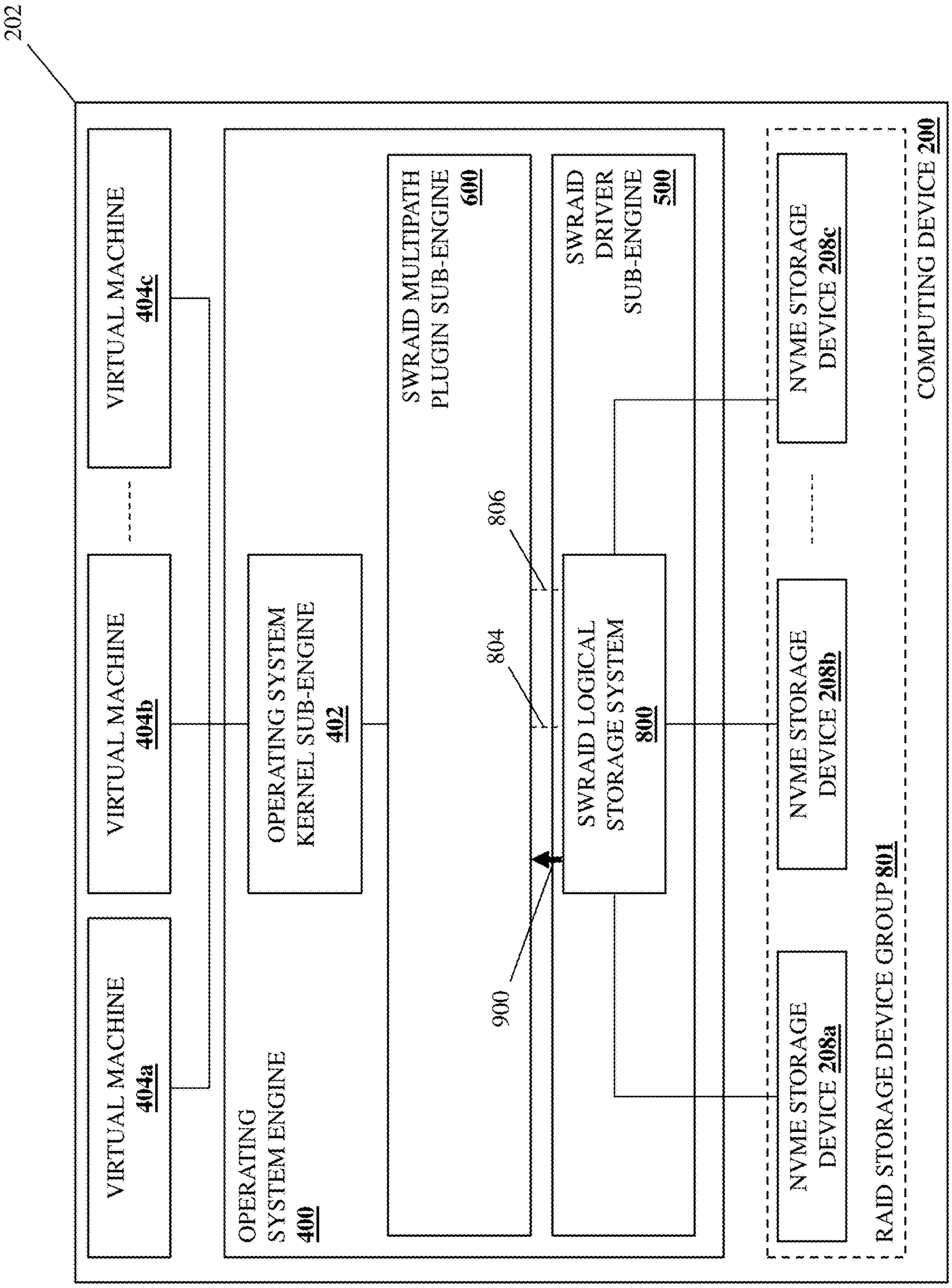
FIG. 9 is a schematic view illustrating an embodiment of the computing device of FIG. 2 operating during the method of FIG. 3.

The method 300 then proceeds to block 306 where the software RAID multipath plugin identifies physical storage devices used to provide the software RAID logical storage system. With reference to FIG. 9, in an embodiment of block 306, the software RAID driver sub-engine 500 may perform software RAID logical storage system information provisioning operations 900 that include providing software RAID logical storage system information about the software RAID logical storage system 800 to the software RAID multipath plugin sub-engine 600. For example, the software RAID driver sub-engine 500 may retrieve the controller/path information for each NVMe storage device 208*a*-208*c* that is being used to provide the software RAID logical storage system 800 from the software RAID database 207, and provide that controller/path information to the software RAID multipath plugin sub-engine 600 (which is illustrated as being performed via the "active" path 802 in FIG. 9, but which one of skill in the art in possession of the present disclosure will appreciate may be performed via any available path while remaining within the scope of the present disclosure).

However, while the provisioning of the controller/path information for each of the NVMe storage devices 208*a*-208*c* being used to provide the software RAID logical storage system 800 has been illustrated and described, one of skill in the art in possession of the present disclosure will appreciate how controller/path information for as few as two physical storage devices/two paths to primary/secondary controllers for the software RAID logical storage system 800 may be provided to the software RAID multipath plugin sub-engine 600 while remaining within the scope of the present disclosure as well. Furthermore, while specific software RAID logical storage system information about the software RAID logical storage system 800 provided by the controller/path information discussed above has been described, one of skill in the art in possession of the present disclosure will appreciate how the software RAID driver sub-engine 500 may identify a variety of details about the software RAID logical storage system 800 using any of a variety of software RAID logical storage system information while remaining within the scope of the present disclosure as well.

Figure 10A:
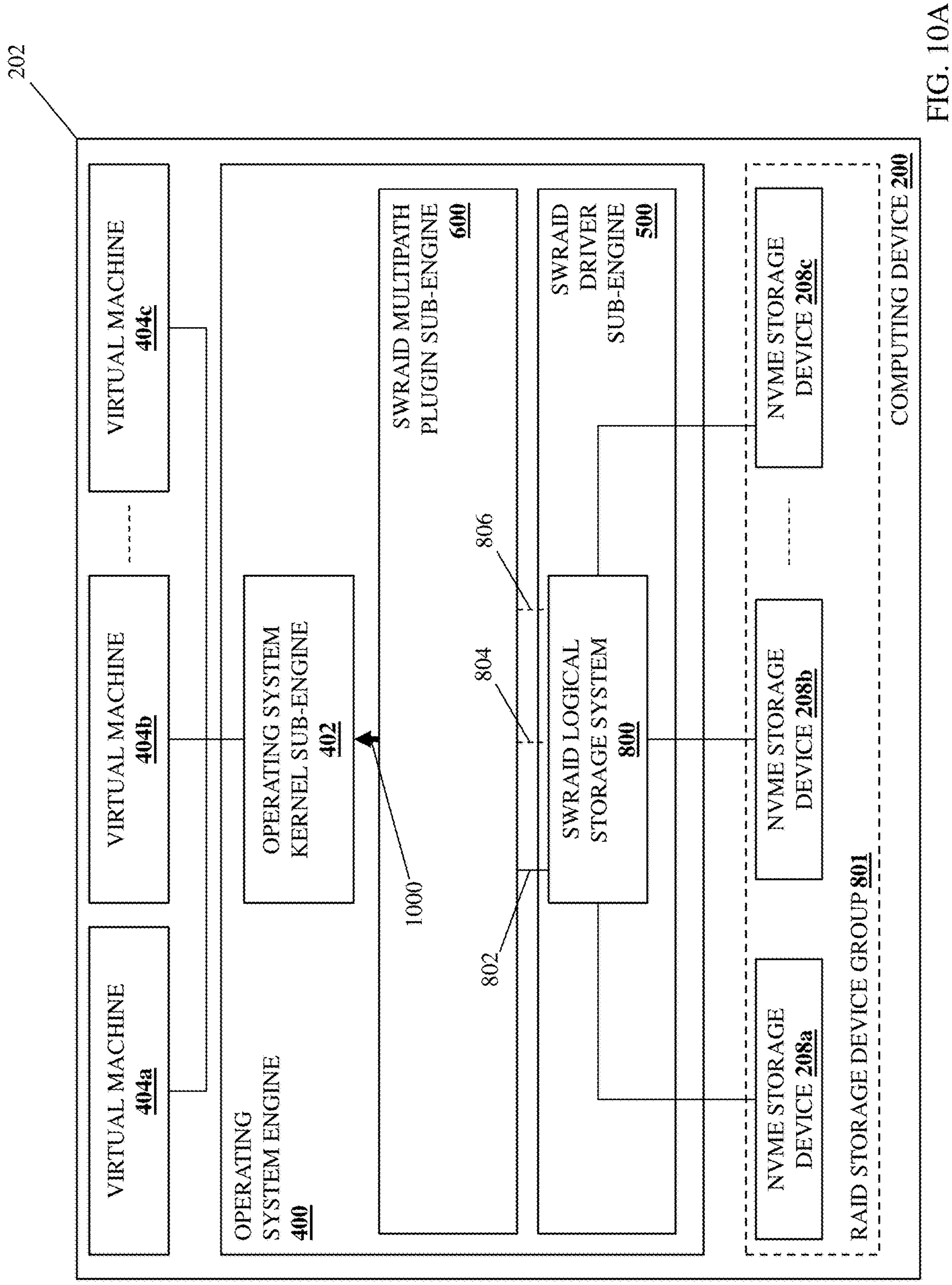
FIG. 10A is a schematic view illustrating an embodiment of the computing device of FIG. 2 operating during the method of FIG. 3.

The method 300 then proceeds to block 308 where the software RAID multipath plugin subsystem presents a software RAID logical controller for the software RAID logical storage system to the operating system kernel subsystem. In response to receiving the controller/path information, the software RAID multipath plugin sub-engine 600 may use that controller/path information to create a software RAID logical controller (or a software RAID logical multipath disk that operates similarly to the software RAID logical controller discussed below) for the software RAID logical storage system 800 based on the respective paths to each of the NVMe storage devices 208*a*-208*c* (i.e., as identified in the controller/path information). For example, with reference to FIG. 10A, the software RAID multipath plugin sub-engine 600 may perform path claiming initiation operations 1000 that may include generating and transmitting a path claiming initiation communication (e.g., a "pathClaimBegin" callback communication that indicates that the software RAID multipath plugin sub-engine 600 is ready to claim paths based on claim rule(s)) to the operating system kernel sub-engine 402.

Figure 10B:
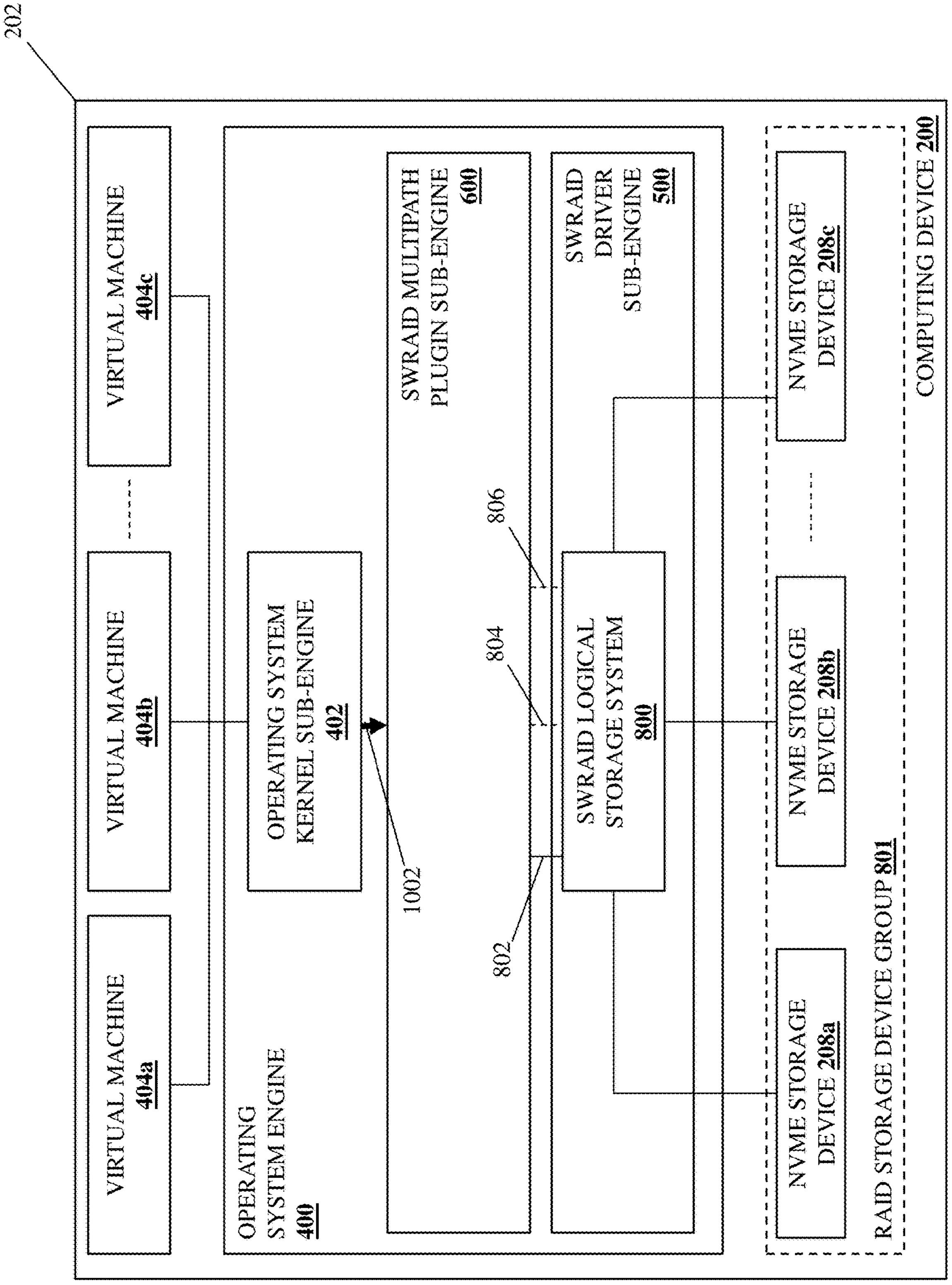
FIG. 10B is a schematic view illustrating an embodiment of the computing device of FIG. 2 operating during the method of FIG. 3.

With reference to FIG. 10B, following the sending of the path claiming initiation communication, the software RAID multipath plugin sub-engine 600 may then perform path claiming operations 1002 that may include, for each path available to the operating system kernel sub-engine 402, generating a path information retrieval communication for that path (e.g., using a "Claim_path" callback communication that is configured to retrieve path data), transmitting that path information retrieval communication to the operating system kernel sub-engine 402 to retrieve path information (e.g., a "vmk_ScsiPath" parameter), using data included in that path parameter to determine whether its associated path matches a path utilized in the software RAID logical storage system 800 (e.g., whether a path identified in the controller/path information matches that path according to claim rule(s)) and, if so, claiming that path. In an embodiment, the software RAID multipath plugin sub-engine 600 may then store path information for each path it claims in the software RAID database 207.

Figure 10C:
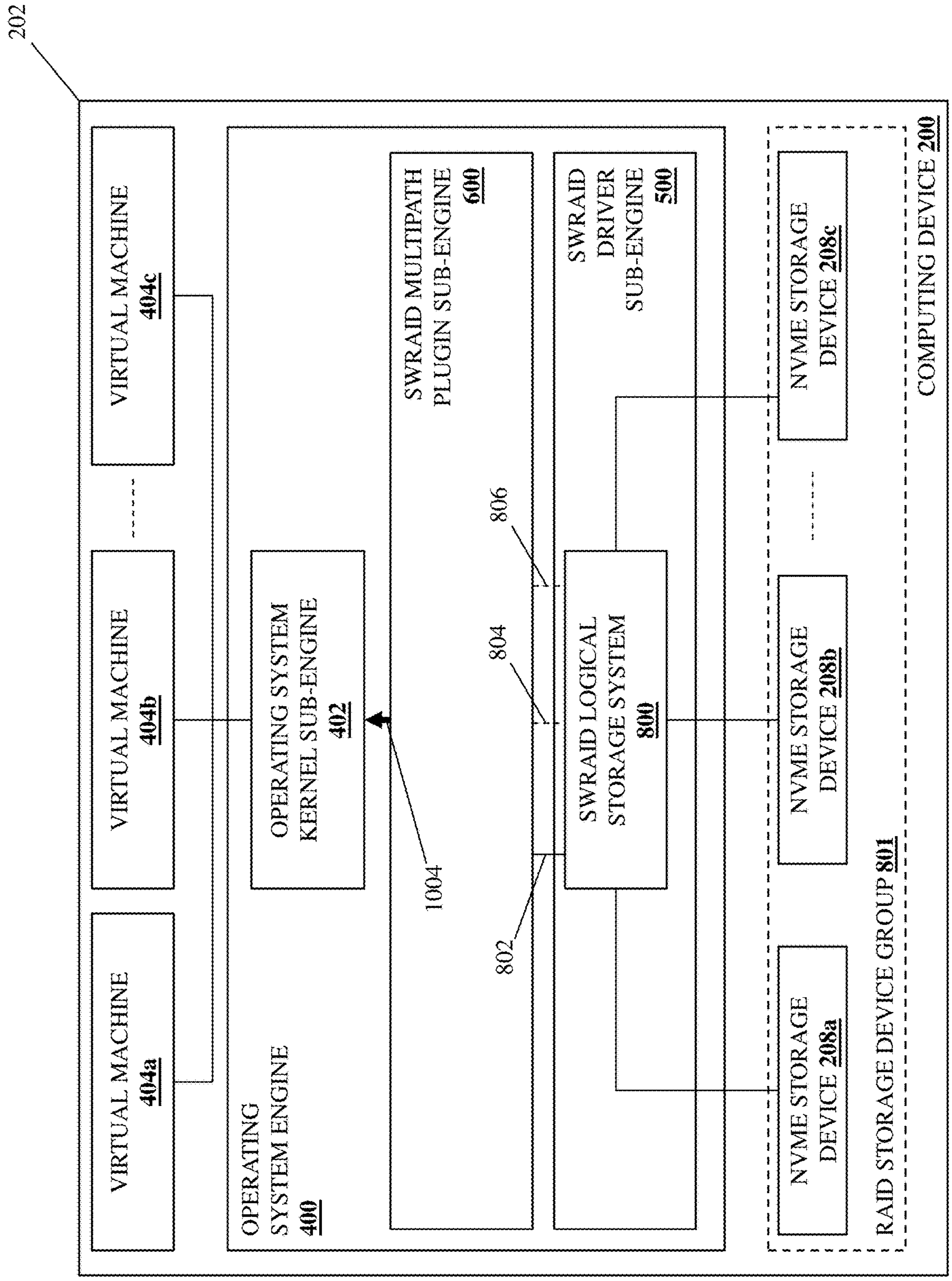
FIG. 10C is a schematic view illustrating an embodiment of the computing device of FIG. 2 operating during the method of FIG. 3.

With reference to FIG. 10C, once each path utilized in the software RAID logical storage system 800 (e.g., each path identified in the controller/path information) is claimed, the software RAID multipath plugin sub-engine 600 may perform path claiming completion operations 1004 that may include generating and transmitting a path claiming completion communication (e.g., a "pathClaimEnd" callback communication that indicates that the software RAID multipath plugin sub-engine 600 has completed path claiming operations) to the operating system kernel sub-engine 402 As such, the paths to each of the NVMe storage devices 208*a*-208*c* that provide the software RAID logical storage system 800 may be claimed by the software RAID multipath plugin sub-engine 600 to provide the software RAID logical storage system 800. However, while a specific technique for providing a software RAID multipath plugin multiple paths to a software RAID logical storage system provided by multiple physical storage devices has been described, one of skill in the art in possession of the present disclosure will appreciate how multiple paths to a software RAID logical storage system may be provided using other techniques that will fall within the scope of the present disclosure as well.

Figure 11:
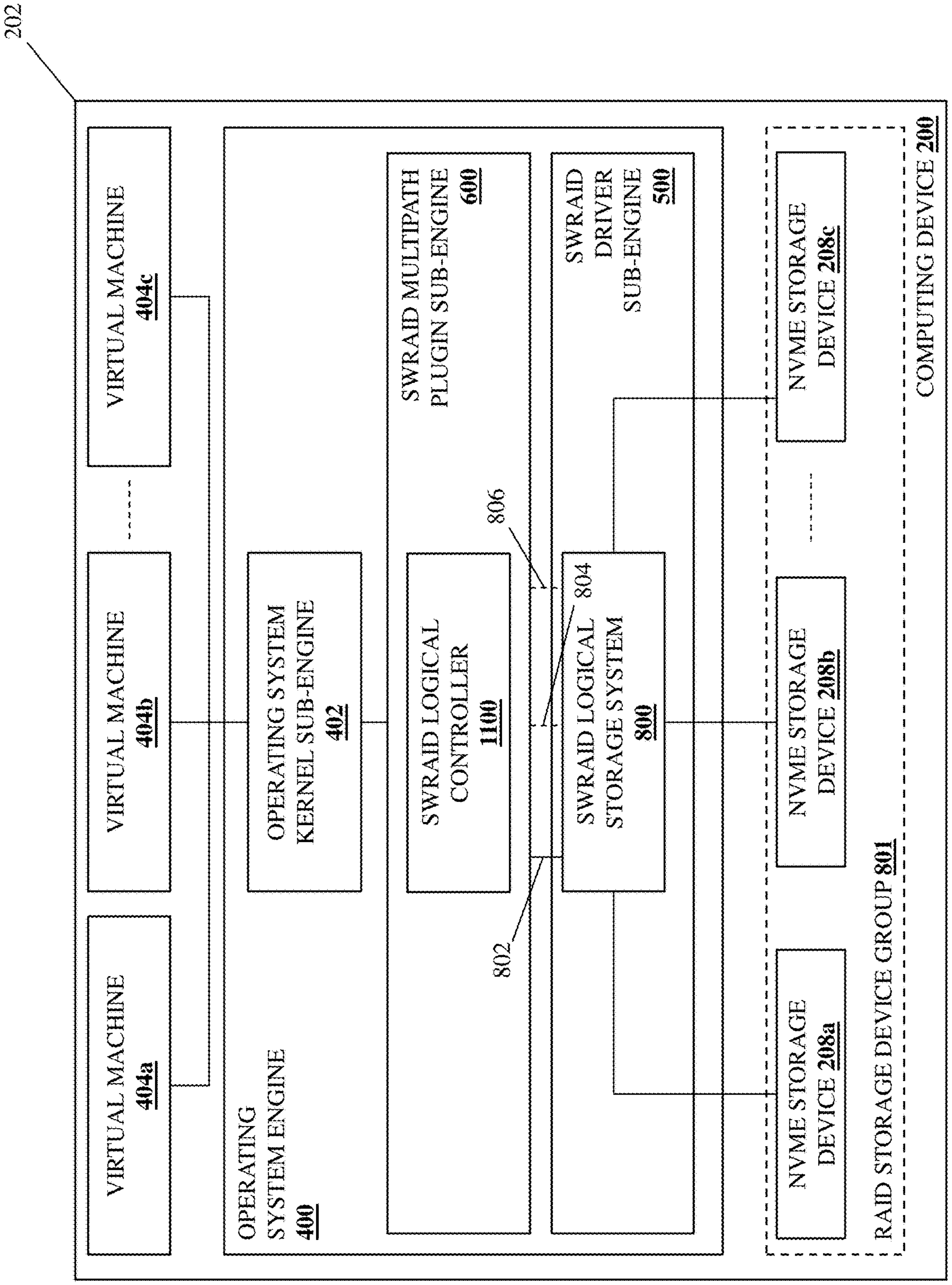
FIG. 11 is a schematic view illustrating an embodiment of the computing device of FIG. 2 operating during the method of FIG. 3.

With reference to FIG. 11, following the provisioning of the multiple paths for the software RAID multipath plugin sub-engine 600 to software RAID logical storage system 800, the software RAID multipath plugin sub-engine 600 may create a software RAID logical controller 1100 for the software RAID logical storage system 800, with the NVMe storage device 208*a* presented as the primary controller for the software RAID logical storage system 800 that is accessible via the "active" path 802 between the software RAID logical storage system 800 and the software RAID multipath plugin sub-engine 600, the NVMe storage device 208*c* that presented as the secondary controller for the software RAID logical storage system 800 that is accessible via the "failover" path 806 between the software RAID logical storage system 800 and the software RAID multipath plugin sub-engine 600 (and in some embodiments the NVMe storage device 208*b* presented as the tertiary controller for the software RAID logical storage system 800 that is accessible via the "failover" path 804 between the software RAID logical storage system 800 and the software RAID multipath plugin sub-engine 600). The software RAID multipath plugin sub-engine 600 may then present that software RAID logical controller 1100 to the operating system kernel sub-engine 402.

In some embodiments, following the creation of the software RAID logical controller 1100, the software RAID driver sub-engine 500 may configure the software RAID logical storage system 800 to operate in a desired manner. For example, the metadata retrieved from the NVMe storage devices 208*a*, 208*b*, and up to 208*c* as part of the storage device metadata retrieval operations 700 may include a configuration for the software RAID logical storage system 800 (e.g., a software RAID logical storage system configuration provided by a network administrator or other user in the metadata included in the NVMe storage devices 208*a*-208*c*). In another example, the configuration for the software RAID logical storage system 800 may be accessible via the software RAID database 207 and/or a database that is otherwise accessible to the software RAID driver sub-engine 500. However, while a few specific examples of providing software RAID logical storage system configurations have been described, one of skill in the art in possession of the present disclosure will appreciate how the software RAID logical storage system configurations may be provided in a variety of manners that will fall within the scope of the present disclosure as well.

In a specific example, the software RAID logical storage system 800 may be configured at block 308 with a RAID-storage-device-group-based striping configuration that provides for the dividing of data included in a data write request into data subsets (i.e., RAID "strips") that are written to the respective NVMe storage devices 208*a*-208*c* in the RAID storage device group 801 that provide the software RAID logical storage system 800, allowing data to be written and read simultaneously across the NVMe storage devices 208*a*-208*c* and improving data read and write speeds and other Input/Output Per Second (IOPS) characteristics. As such, one of skill in the art in possession of the present disclosure will appreciate how the RAID-storage-device-group-based striping configuration provided for the software RAID logical storage system 800 may define the size of the data subsets described above, as well as any other parameters of the RAID-storage-device-group-based striping configuration that would be apparent to one of skill in the art in possession of the present disclosure.

In another example, the software RAID logical storage system 800 may be configured at block 308 with a maximum data transfer size configuration that defines a maximum size of data that may be transmitted to the software RAID logical storage system 800. For example, the software RAID driver sub-engine 500 may provide the maximum data transfer size configuration for the software RAID logical storage system 800 by configuring the operating system kernel sub-engine 402 with that maximum data transfer size. In another example, the software RAID logical storage system 800 may be configured at block 308 with a maximum queue depth configuration that defines a maximum depth of a data queue for the software RAID logical storage system 800. For example, the software RAID driver sub-engine 500 may provide the maximum queue depth configuration for the software RAID logical storage system 800 by configuring the operating system kernel sub-engine 402 with that maximum queue depth. However, while a few specific examples have been provided, one of skill in the art in possession of the present disclosure will appreciate how the software RAID logical storage system 800 may be configured in any of a variety of manners that will fall within the scope of the present disclosure.

Furthermore, while the configuration of a single software RAID logical controller 1100 is illustrated and described herein, the inventors of the present disclosure describe techniques for providing a plurality of software RAID logical controllers for respective software RAID logical storage systems, and configuring each of those software RAID logical controllers with different configurations, in U.S. patent application Ser. No. 18/915,500, filed Oct. 15, 2024, the disclosure of which is incorporated by reference herein in its entirety.

The method 300 then proceeds to decision block 310 where the method 300 proceeds depending on whether a command is received that is directed to the software RAID logical controller. As described below, the operating system kernel sub-engine 402 may receive data requests (e.g., data write requests, data read requests, etc.) from any of the virtual machines 404*a*-404*c* and, in response, may generate NVMe commands for those data requests that are directed to the software RAID logical controller 1100, and transmit those NVMe commands to the software RAID multipath plugin sub-engine 600. As such, in an embodiment of decision block 310, the software RAID multipath plugin sub-engine 600 may monitor for NVMe commands from the operating system kernel sub-engine 402. However, while particular commands have been described, one of skill in the art in possession of the present disclosure will appreciate how the software RAID logical storage system 800 may be accessed by the operating system kernel sub-engine 402 in a variety of manners that will fall within the scope of the present disclosure as well.

If, at decision block 310, no command is received that is directed to the software RAID logical controller, the method 300 returns to block 308. As such, the method 300 may loop such that the software RAID multipath plugin sub-engine 600 continues to present the software RAID logical controller 1100 to the operating system kernel sub-engine 402 until a command is received.

Figure 12A:
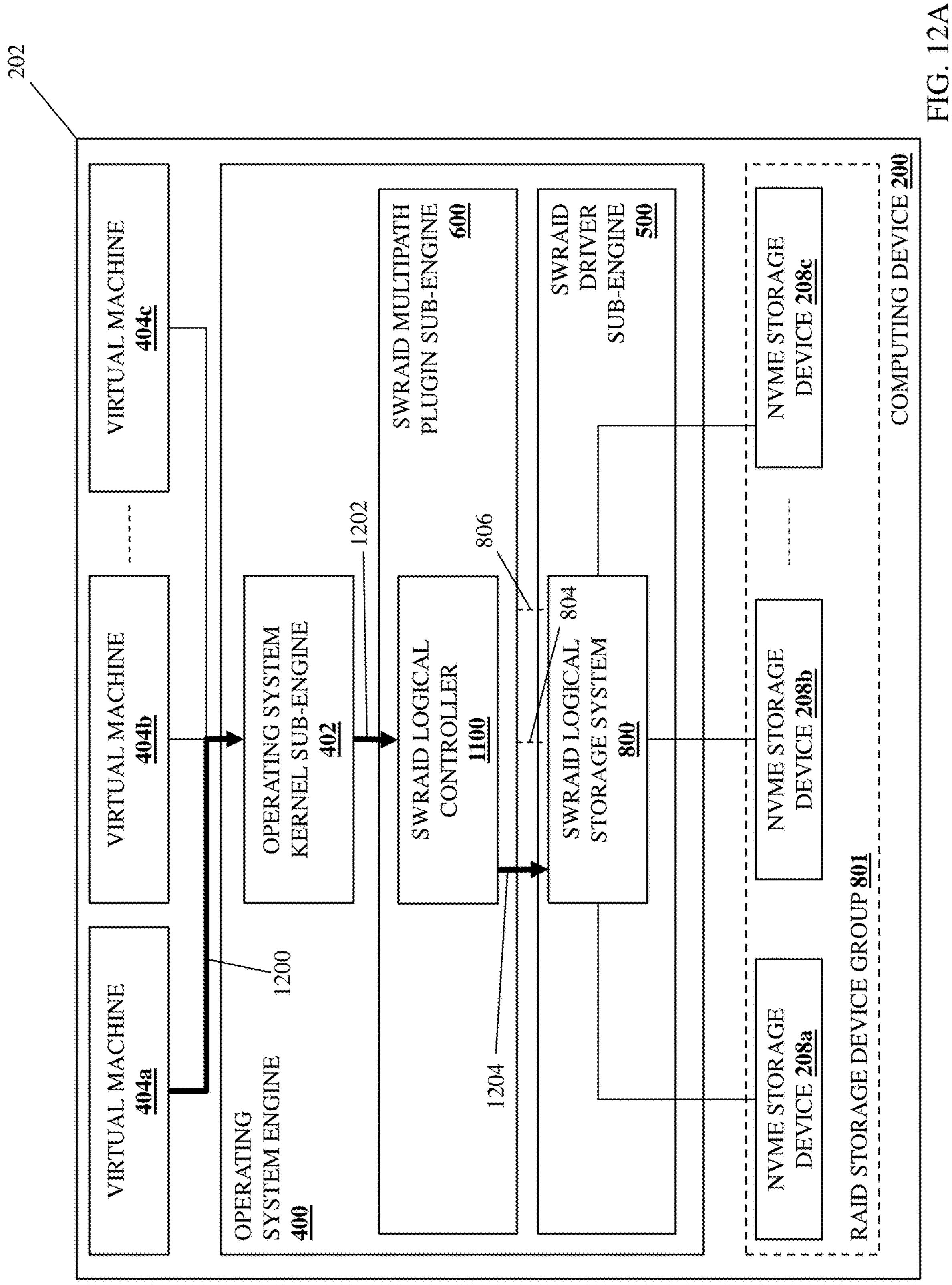
FIG. 12A is a schematic view illustrating an embodiment of the computing device of FIG. 2 operating during the method of FIG. 3.

If, at decision block 310, a command is received that is directed to the software RAID logical controller, the method 300 proceeds to block 312 where the software RAID multipath plugin subsystem provides the command to the software RAID driver subsystem via an active path presented by the software RAID driver subsystem to cause the software RAID driver subsystem to attempt to execute the command using the physical storage device(s). With reference to FIG. 12A, in a specific example of decision block 310, the virtual machine 404*a* may perform data request operations 1200 that may include providing a data request (e.g., a data write request, a data read request, etc.) to the operating system kernel sub-engine 402. In response to receiving the data request, the operating system kernel sub-engine 402 may perform command provisioning operations 1202 that include generating an NVMe command for the data request (e.g., an NVMe write command for a data write request, an NVMe read command for a data read request, etc.) that is directed to the software RAID logical controller 1100, and transmitting that NVMe command to the software RAID logical controller 1100 such that it is received by the software RAID multipath plugin sub-engine 600. As will be appreciated by one of skill in the art in possession of the present disclosure, the transmission of the NVMe command may be according to the maximum data transfer size configuration and/or the maximum queue depth configuration for the software RAID logical storage system 800 discussed above, and/or any other software RAID logical storage system configurations that would be apparent to one of skill in the art in possession of the present disclosure.

However, while a particular virtual machine 404*a* is described as providing a data request that causes the NVMe command to be generated and transmitted to the software RAID logical controller 1100/software RAID multipath plugin sub-engine 600 at block 306, one of skill in the art in possession of the present disclosure will appreciate that the operating system kernel sub-engine 402 may generate and provide commands (e.g., CDB-format SCSI commands that must be translated to NVMe commands by the software RAID driver sub-engine 500 as described above) to the software RAID logical controller 1100/software RAID multipath plugin sub-engine 600 in other manners that will fall within the scope of the present disclosure as well.

In an embodiment, at block 312 and in response to receiving the NVMe command, the software RAID multipath plugin sub-engine 600 may perform command provisioning operations 1204 that may include transmitting the NVMe command via the "active" path 802 to the software RAID logical storage system 800 such that it is received by the software RAID driver sub-engine 500. For example, the instruction (as well as other plugin/driver communications described below) may be transmitted by the software RAID multipath plugin sub-engine 600 to the software RAID driver sub-engine 500 using Input/Output ConTroL (IOCTL) communications, vendor-defined commands, and/or other plugin/driver communication techniques known in the art.

The software RAID driver sub-engine 500 may then attempt to execute the NVMe command at block 312. As will be appreciated by one of skill in the art in possession of the present disclosure, the attempt to execute the NVMe command by the software RAID driver sub-engine 500 may be based on the software RAID logical storage system configurations discussed above, and thus the attempt to execute the NVMe command may conform to the RAID-storage-device-group-based striping configuration described above, and/or any other software RAID logical storage system configuration of the software RAID logical storage system 800.

Figure 12B:
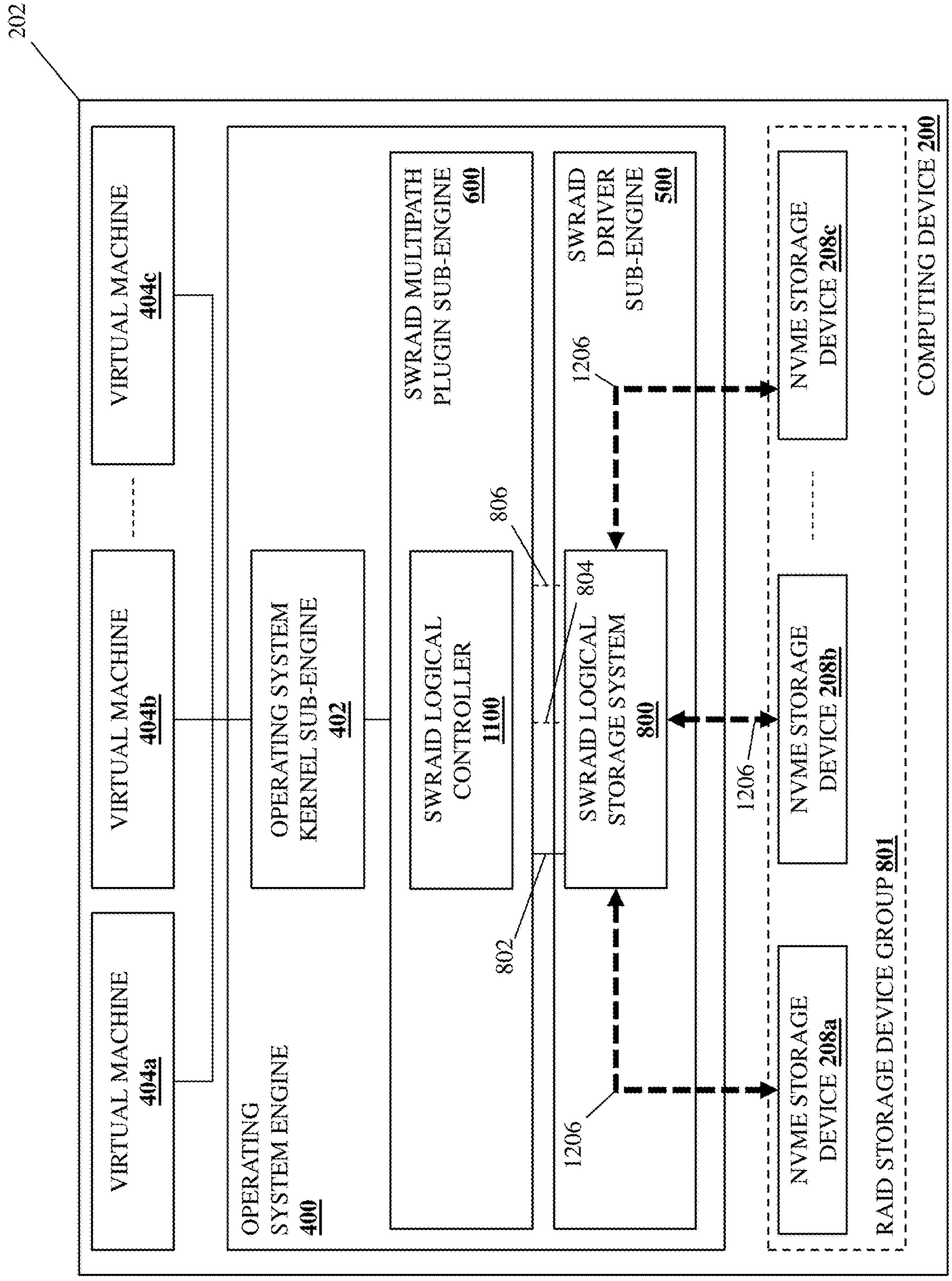
FIG. 12B is a schematic view illustrating an embodiment of the computing device of FIG. 2 operating during the method of FIG. 3.

With reference to FIG. 12B, in response to receiving the NVMe command, the software RAID driver sub-engine 500 may perform command execution operations 1206 that may include attempting to execute the NVMe command by attempting to perform any data exchange operations with any or all of the NVMe storage devices 208*a*-208*c* (as illustrated by the dashed/bolded double-sided arrows between the software RAID logical storage system 800 and each of the NVMe storage devices 208*a*-208*c*), which one of skill in the art in possession of the present disclosure will appreciate will depend on the details of the NVMe command. To provide some specific examples, the command execution operations 1206 may include an attempt to perform a "full stripe" write to all of the NVMe storage devices 208*a*-208*c*, an attempt to perform a "full stripe" read from all of the NVMe storage devices 208*a*-208*c*, an attempt to perform a "partial stripe" write to some of the NVMe storage devices 208*a*-208*c*, an attempt to perform a "partial stripe" read from some of the NVMe storage devices 208*a*-208*c*, and/or any an attempt to perform other data exchange operations that would be apparent to one of skill in the art in possession of the present disclosure.

The method 300 then proceeds to decision block 314 where the method 300 proceeds depending on whether the command was executed successfully. As will be appreciated by one of skill in the art in possession of the present disclosure, the attempt to execute the NVMe command at block 312 on the software RAID logical storage system 800 may succeed and, following successful execution of the NVMe command, any of the NVMe storage devices 208*a*-208*c* used to execute that NVMe command will generate a response for the executed NVMe command (e.g., an Input/Output (IO) completion communication), and transmit that response to the software RAID logical storage system 800 such that it is received by the software RAID driver sub-engine 500. As such, in an embodiment of decision block 314 and following the attempt to execute the command, the software RAID multipath plugin sub-engine 600 may monitor for responses for the executed NVMe command to determine whether the NVMe command executed successfully.

Figure 12C:
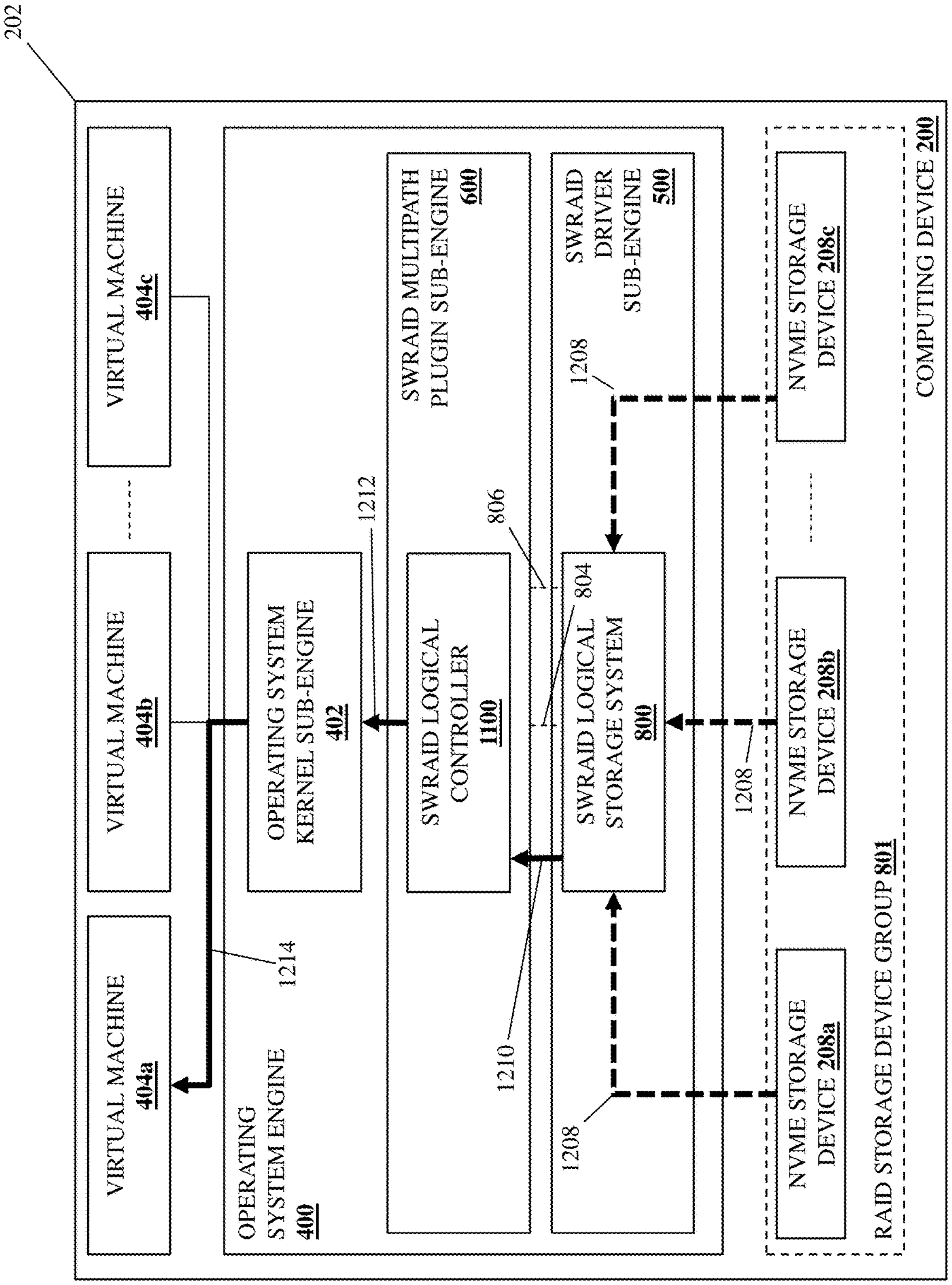
FIG. 12C is a schematic view illustrating an embodiment of the computing device of FIG. 2 operating during the method of FIG. 3.

If, at decision block 314, the NVMe command executed successfully, the method 300 proceeds to block 316 where the software RAID multipath plugin subsystem provides the response to the operating system kernel subsystem. With reference to FIG. 12C, in an embodiment of decision block 314 and following the successful execution of the NVMe command, any or all of the NVMe storage devices 208*a*-208*c* that were used to execute the NVMe command may perform response provisioning operations 1208 that include generating a respective response for the executed NVMe command, and transmitting that response to the software RAID logical storage system 800 such that it is received by the software RAID driver sub-engine 500 (with the response provisioning operations 1208 illustrated in bolded/dashed lines to indicate that only the NVMe storage devices 208*a*-208*c* that are used to execute the NVMe command will perform those response provisioning operations 1208).

In response to receiving the NVMe response, the software RAID driver sub-engine 500 may perform response provisioning operations 1210 that include providing an NVMe response to the software RAID logical controller 1100 via the "active" path 802 such that it is received by the software RAID multipath plugin sub-engine 600. For example, the NVMe response (as well as other driver/plugin communications described herein) may be forwarded to the software RAID multipath plugin sub-engine 600 by the software RAID driver sub-engine 500 using IOCTL communications, vendor-defined commands, and/or other plugin/driver communication techniques known in the art.

In an embodiment, at block 316 and in response to receiving the NVMe response, the software RAID multipath plugin sub-engine 600 may perform response forwarding operations 1212 that may include forwarding the NVMe response received from the software RAID driver sub-engine 500 to the operating system kernel sub-engine 402. In the specific example illustrated in FIG. 12C, in response to receiving the NVMe response, the operating system kernel sub-engine 402 may perform data request confirmation provisioning operations 1214 that include providing a confirmation for the data request to the virtual machine 404*a*, although one of skill in the art in possession of the present disclosure will appreciate how the operating system kernel sub-engine 402 may perform other NVMe response operations in response to receiving the NVMe response while remaining within the scope of the present disclosure as well.

If, at decision block 314, the NVMe command is not executed successfully, or following block 316, the method 300 proceeds to decision block 318 where the method 300 proceeds depending on whether an unavailable primary controller communication is received. As will be appreciated by one of skill in the art in possession of the present disclosure, if the NVMe storage device 208*a* that is presented as the primary controller for the software RAID logical storage system 800 is unavailable, an attempt to execute the NVMe command by the software RAID driver sub-engine 500 at block 312 may not succeed if that NVMe command requires the NVMe storage device 208*a* for its execution, and no response will be received by the software RAID driver sub-engine 500 from the NVMe storage device 208*a* in such a situation. As such, in some embodiments, the failure of the attempt to execute the NVMe command may identify to the software RAID driver sub-engine 500 the unavailability of the NVMe storage device 208*a* that is presented as the primary controller for the software RAID logical storage system 800.

However, an attempt to execute the NVMe command by the software RAID driver sub-engine 500 at block 312 may succeed despite the unavailability of the NVMe storage device 208*a* that is presented as the primary controller for the software RAID logical storage system 800 if that NVMe command does not require the NVMe storage device 208*a* for its execution, As such, in some embodiments of decision block 318, the software RAID driver sub-engine 500 monitor for the unavailability of the NVMe storage device 208*a* that is presented as the primary controller for the software RAID logical storage system 800. However, while two specific examples of the identification of the unavailability of the primary controller have been described, one of skill in the art in possession of the present disclosure will appreciate how the unavailability of the primary controller may be identified in a variety of manners that will fall within the scope of the present disclosure as well.

In response to identifying the unavailability of the primary controller, the software RAID driver sub-engine 500 may provide an unavailable primary controller communication to the software RAID multipath plugin sub-engine 600. As such, at decision block 318, the software RAID multipath plugin sub-engine 600 may monitor for an unavailable primary controller communication. If, at decision block 318, no unavailable primary controller communication is received, the method 300 returns to block 308. As such, the method 300 may loop such that the software RAID multipath plugin sub-engine 600 receives NVMe commands from the operating system kernel sub-engine 402 that are directed to the software RAID logical controller 1100, and provides those NVMe commands via the "active" path presented by by the software RAID driver sub-engine 500 for execution (while providing NVMe responses to the operating system kernel sub-engine 402 upon successful NVMe command execution), as long as no unavailable primary controller communication is received.

Figure 13A:
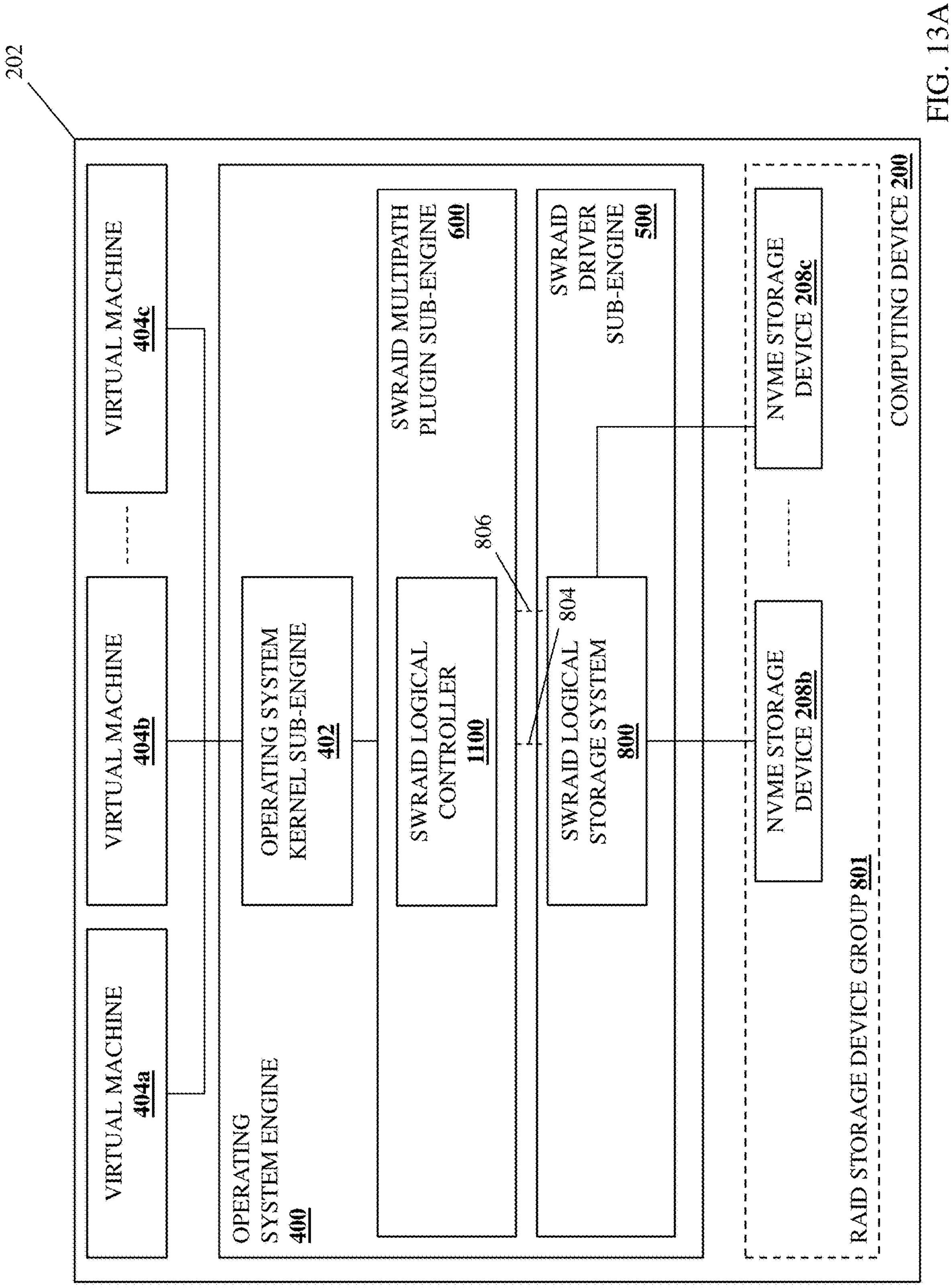
FIG. 13A is a schematic view illustrating an embodiment of the computing device of FIG. 2 operating during the method of FIG. 3.

If, at decision block 318, an unavailable primary controller communication is received, the method 300 proceeds to block 320 where the software RAID multipath plugin subsystem provides a secondary controller activation communication to the software RAID driver subsystem. With reference to FIG. 13A, in an embodiment, the NVMe storage device 208*a* may be removed from the RAID storage device group 801 or may otherwise become unavailable (e.g., the NVMe controller in the NVMe storage device 208*a* that is presented as the primary controller for the software RAID logical storage system 800 may become unavailable), and at decision block 314 the software RAID driver sub-engine 500 will identify that unavailability. As described below, the identification of the unavailability of the NVMe storage device 208*a* that is presented as the primary controller for the software RAID logical storage system 800 may initiate primary controller switching operations (or "active"/"failover" path switching operations) that are described as being performed by the software RAID multipath plugin sub-engine 600 below, but that may be performed by a Storage Array Type Plugin (SATP) in the operating system and/or using other techniques that would be apparent to one of skill in the art in possession of the present disclosure.

Figure 13B:
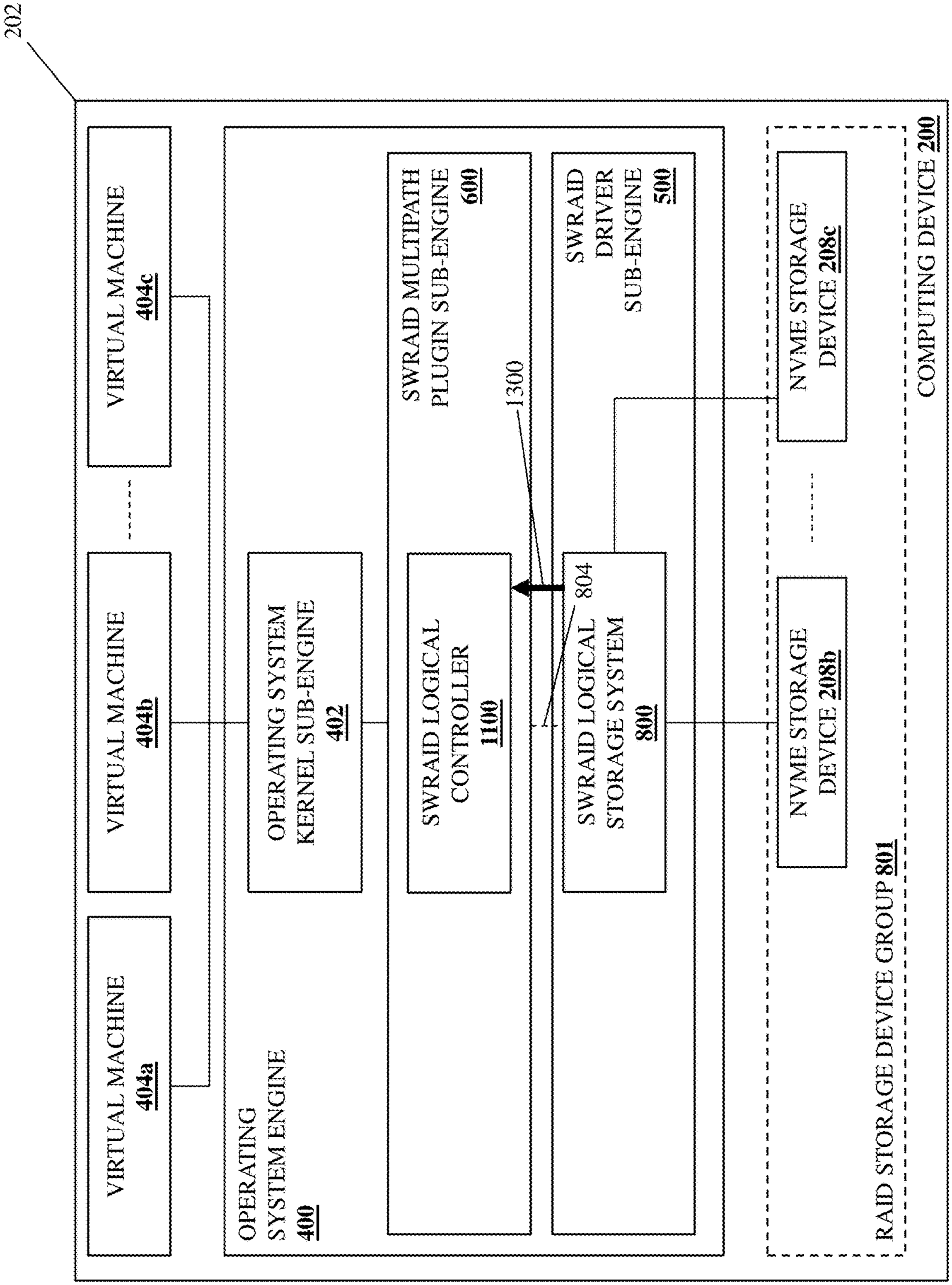
FIG. 13B is a schematic view illustrating an embodiment of the computing device of FIG. 2 operating during the method of FIG. 3.

For example, with reference to FIG. 13B and in response to identifying the unavailability of the NVMe storage device 208*a* that was presented as the primary controller for the software RAID logical storage system 800, the software RAID drive engine 500 will perform unavailable primary controller communication provisioning operations 1300 that include generating an unavailable primary controller communication that is configured to inform the software RAID multipath plugin sub-engine 600 that the primary controller for the RAID logical storage system 800 is not available, and providing the unavailable primary controller communication via the "failover" path 806 (or any other available path) to the software RAID multipath plugin sub-engine 600 at decision block 318 as described above.

In a specific example, the NVMe storage device 208*a* may be "hot-removed" from the RAID storage device group 801 by disconnecting or otherwise decoupling the NVMe storage device 208*a* from the processing system while the operating system engine 400 is providing an operating system for the computing device 200, preventing the NVMe storage device 208*a* (i.e., the NVMe controller in the NVMe storage device 208*a* that is presented as the primary controller for the software RAID logical storage system 800) from being presented as the primary controller for the software RAID logical storage system 800, and resulting in the software RAID driver sub-engine 400 providing the primary controller unavailable communication to the software RAID multipath plugin sub-engine 600 at decision block 318. However, one of skill in the art in possession of the present disclosure will appreciate that the NVMe storage device and/or its NVMe controller may become unavailable for other reasons that will fall within the scope of the present disclosure as well.

Figure 13C:
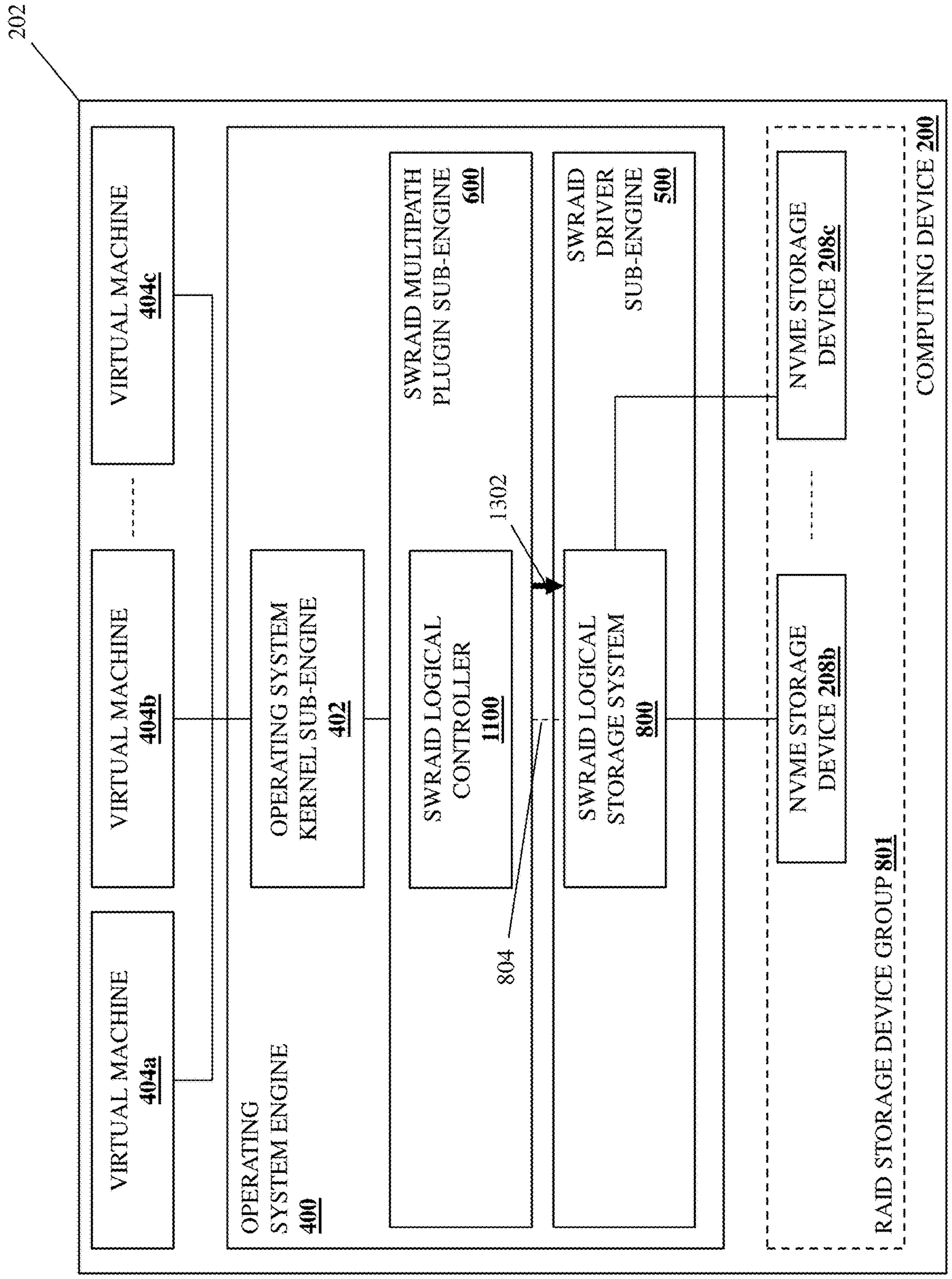
FIG. 13C is a schematic view illustrating an embodiment of the computing device of FIG. 2 operating during the method of FIG. 3.

With reference to FIG. 13C, in an embodiment of block 320 and in response to receiving the primary controller unavailable communication, the software RAID multipath plugin sub-engine 600 may perform secondary controller activation communication provisioning operations 1302 that include generating a secondary controller activation communication that is configured to instruct the software RAID driver sub-engine 500 to switch from presenting the NVMe storage device 208*a* as the primary controller for the software RAID logical storage system 800 to presenting the NVMe storage device 208*c* as the primary controller for the software RAID logical storage system 800, and providing the secondary controller activation communication via the "failover"path 806 to the software RAID driver sub-engine 500.

In a specific embodiment, the secondary controller activation communication may instruct the software RAID driver sub-engine 500 to switch the primary controller presented for the RAID logical storage system 800 from the NVMe storage device 208*a* to the NVMe storage device 208*c* (i.e., remove the NVMe storage device 208*a* from being presented as the primary controller of the RAID logical storage system 800, switch the NVMe storage device 208*c* from being presented as the secondary controller of the RAID logical storage system 800 to being presented as the primary controller of the RAID logical storage system 800, switch the NVMe storage device 208*b* from being presented as the tertiary controller of the RAID logical storage system 800 to being presented as the secondary controller of the RAID logical storage system 800, and so on).

As illustrated in FIG. 13C, the secondary controller activation communication may cause the software RAID driver sub-engine 500 to present the NVMe storage device 208*c* as the "new" primary controller for the software RAID logical storage system 800 (with the "failover" path 806 between the software RAID multipath plugin sub-engine 600 and the software RAID logical storage system 800 becoming the "active" path presented to the "new" primary controller for the software RAID logical storage system 800), and provide an acknowledgement to the software RAID multipath plugin sub-engine 600 that the primary controller for the software RAID logical storage system 800 has been switched from the NVMe storage device 208*a* to the NVMe storage device 208*c*. In response to receiving the acknowledgement, the software RAID multipath plugin sub-engine 600 may present the NVMe storage device 208*c* as the "new" primary controller for the software RAID logical storage system 800 that is accessible via an "active" path 806, and present the NVMe storage device 208*b* as the "new" secondary controller for the software RAID logical storage system 800 that is accessible via a "failover" path 804 for the software RAID logical controller 1100.

Figure 14:
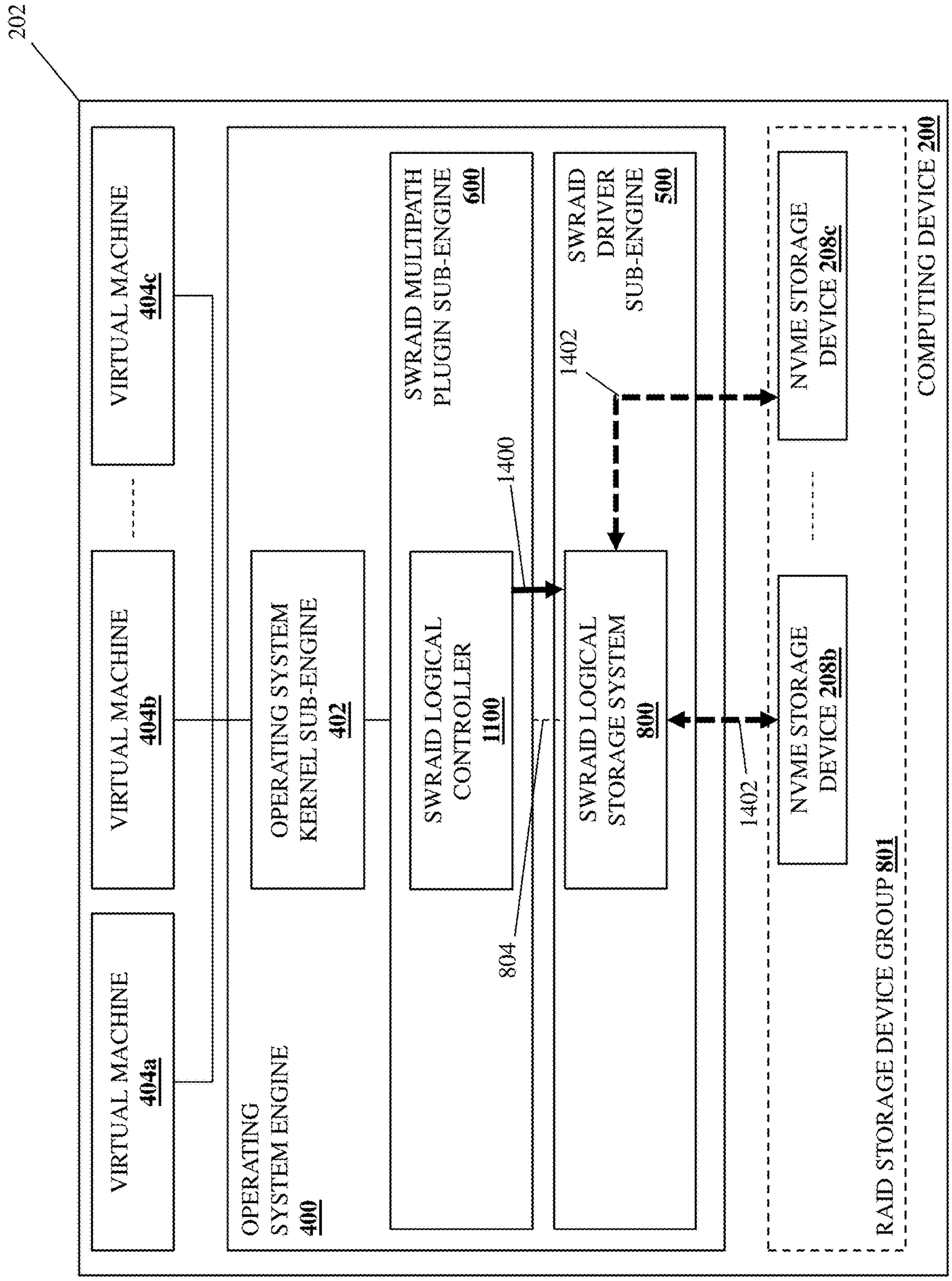
FIG. 14 is a schematic view illustrating an embodiment of the computing device of FIG. 2 operating during the method of FIG. 3.

The method 300 then proceeds to block 322 where the software RAID multipath plugin subsystem provides the command to the software RAID driver subsystem via the failover path presented by the software RAID driver subsystem to cause the software RAID driver subsystem to attempt to execute the command using the physical storage device(s). With reference to FIG. 14, in an embodiment of block 322 and following the provisioning of the secondary controller activation communication, the software RAID driver sub-engine 500 may perform command instruction provisioning operations 1400 that may include using the software RAID logical controller 1100 to transmit the NVMe command via the "failover" path 806 (now the "active" path 806) to the software RAID logical storage system 800 such that it is received by the software RAID driver sub-engine 500.

Similarly as described above, in response to receiving the NVMe command, the software RAID driver sub-engine 500 may perform instruction execution operations 1402 that include attempting to execute the command using any or all of the NVMe storage devices 208*b*-208*c* similarly as described above with reference to FIG. 12C.

The method 300 then returns to decision block 314. As such, one of skill in the art in possession of the present disclosure will appreciate that the method 300 may loop until the NVMe command received from the operating system kernel sub-engine 402 is successfully executed, with the software RAID provisioning system of the present disclosure changing the NVMe storage device that is presented as the primary controller for the software RAID logical storage system 800 until an available NVMe storage device/NVMe storage controller is selected to present as that primary controller (i.e., the NVME storage device that is presented as the primary controller for the software RAID logical storage system 800 may be changed a number of times that is only limited on the number of NVMe storage devices being used to provide the software RAID logical storage system 800).

While not described in detail herein, one of skill in the art in possession of the present disclosure will recognize that the "hot-removal" or other unavailability of the NVMe storage device 208*a* and/or its NVMe controller described above with reference to FIG. 13A will require any of a variety of RAID data recovery operations known in the art to recover the data that was stored on the NVMe storage device 208*a*, and while those RAID data recovery operations are not described herein in detail, one of skill in the art in possession of the present disclosure will appreciate how they may be performed by the software RAID driver sub-engine 500 using NVMe commands similarly as discussed above.

Thus, systems and methods have been described that provide a software RAID multipath plugin for an operating system that allows any of a plurality of hot-removable storage devices that provide a software RAID logical storage system to be used at the controller for the software RAID logical storage system. For example, the software RAID provisioning system of the present disclosure may include an operating system having a software RAID multipath plugin coupled to a software RAID driver and an operating system kernel. The software RAID multipath plugin identifies first and second physical storage devices that have been configured by the software RAID driver to provide a software RAID logical storage system, and that provide a primary and secondary controller, respectively, for the software RAID logical storage system. The software RAID multipath plugin then presents a software RAID logical controller for the software RAID logical storage system to the operating system kernel. When the software RAID multipath plugin receives a command from the operating system kernel directed to the software RAID logical controller, it provides the command via an active path to the primary controller presented by the software RAID driver to cause the software RAID driver to attempt to execute the command As such, the hardware dependency of software RAIDs on the native controller provided in the processing system (e.g., the non-hot-pluggable ACHI controller or VMD described above) used to provide those software RAIDs is eliminated, solving the issues with conventional software RAID provisioning systems discussed above.

In the software RAID provisioning system described above, the software RAID multipath plugin sub-engine 600 and the software RAID driver sub-engine 500 will require data exchange that is unrelated to the storage of data in the software RAID logical storage system 800. For example, during initialization and/or runtime of the computing device 200, the software RAID multipath plugin sub-engine 600 and the software RAID driver sub-engine 500 may require the exchange of storage device path data identifying at least one path to the NVMe storage devices 208*a*-208*c*, software RAID multipath plugin sub-engine configuration data for the software RAID multipath plugin sub-engine 600, event data identifying an event associated with the software RAID logical storage system 800, log data for logs generated by the software RAID driver sub-engine 500, hot plug data identifying the hot-plugging of a hot-plugged device (e.g., an NVMe storage device that has been hot-plugged or otherwise added to the RAID storage device group 801), and/or a variety of other software RAID logical storage system data that would be apparent to one of skill in the art in possession of the present disclosure. As such, the inventors of the present disclosure have developed the software RAID multipath plugin/driver communication system of the present disclosure to enable such data exchanges without affecting performance of the active path 802 used for the storage of data in the software RAID logical storage system 800.

Figure 15:
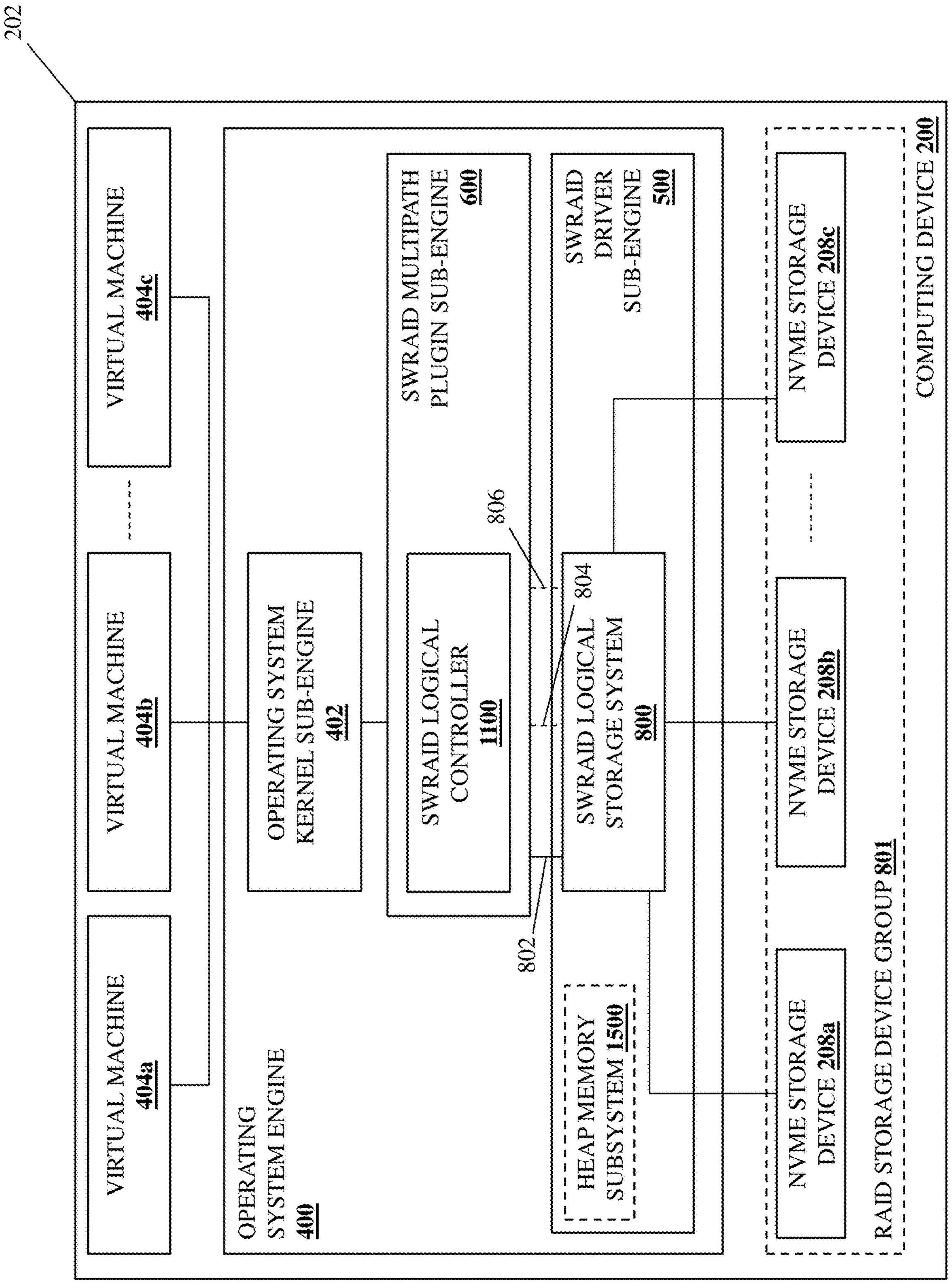
FIG. 15 is a schematic view illustrating an embodiment of a computing device that may provide the software RAID multipath plugin/driver communication system of the present disclosure.

With reference to FIG. 15, the computing device 200 discussed above with reference to FIG. 2 may be provided with an operating system having the operating system kernel sub-engine 402, the software RAID driver sub-engine 500, and the software RAID multipath plugin sub-engine 600 similarly as described above with reference to block 302 of the method 300. Furthermore, the software RAID sub-engine 500 may provide the software RAID logical storage system 800 using the NVMe storage devices 208*a*-208*c* that provide the primary controller and secondary controller(s) for the software RAID logical storage system 800 (and present the "active" path 802 and "failover" paths 804 and 806 to the software RAID multipath plugin sub-engine 600) similarly as described above with reference to block 304 of the method 300. Further still, the software RAID multipath plugin sub-engine 600 may then identify the NVMe storage devices 208*a*-208*c* used to provide the software RAID logical storage system 800, and present the software RAID logical controller 1100 for the software RAID logical storage system 800 to the operating system kernel sub-engine 402 similarly as described above with reference to blocks 306 and 308 of the method 300.

In addition, a heap memory subsystem 1500 may be provided for the software RAID driver sub-engine 500, and one of skill in the art in possession of the present disclosure will appreciate how the heap memory subsystem 1500 may be allocated from the memory system 206 to the software RAID driver sub-engine 500 using any of a variety of heap memory allocation techniques known in the art. Furthermore, one of skill in the art in possession of the present disclosure will appreciate how the software RAID driver sub-engine 500 may reserve a section of its heap memory to provide the heap memory subsystem 1500 for use in performing the software RAID multipath plugin/driver communications described below. However, while a specific configuration of the computing device 200 that provides the software RAID multipath plugin/driver communication system of the present disclosure has been illustrated and described, one of skill in the art in possession of the present disclosure will appreciate how the software RAID multipath plugin/driver communication functionality described below may be enabled via a variety of components and/or component configurations while remaining within the scope of the present disclosure as well.

Referring now to FIG. 16, an embodiment of a method 1600 for providing multipath plugin/driver communications in a software RAID is illustrated. As described below, the systems and methods of the present disclosure enable the exchange of software RAID data between a software RAID multipath plugin subsystem and a software RAID driver subsystem via a failover path presented by the software RAID driver subsystem to the software RAID multipath plugin. For example, the software RAID multipath plugin/driver communication system of the present disclosure may include physical storage devices that are configured to provide a software RAID logical storage system, a software RAID driver subsystem that presents an active path and a failover path to the RAID logical storage system, and a software RAID multipath plugin subsystem coupled to the software RAID driver subsystem. The software RAID multipath plugin subsystem configures a buffer memory subsystem to receive software RAID data, generates a software RAID data command that requests the software RAID data from the software RAID driver subsystem, and transmits the software RAID data command via the failover path to the software RAID driver subsystem. In response to transmitting the software RAID data command, the software RAID multipath plugin subsystem initiates a software RAID data command timer and, in response to its completion, retrieves the software RAID data from the buffer memory subsystem. As such, software RAID data exchange between the software RAID multipath plugin subsystem and a software RAID driver subsystem may be performed without affecting the performance of an active path that is presented by the software RAID driver subsystem to the software RAID multipath plugin and that is used for the storage of data in a software RAID logical storage system.

The method 1600 may begin at block 1602 where a software RAID multipath plugin subsystem configures a buffer memory subsystem to receive software RAID data associated with a software RAID logical storage system. As will be appreciated by one of skill in the art in possession of the present disclosure, the method 1600 may begin in response to the software RAID multipath plugin sub-engine 600 determining that communication with the software RAID driver sub-engine 500 is required, which as initially discussed below may include the software RAID multipath plugin sub-engine 600 providing data to or retrieving data from the software RAID driver sub-engine 500, buy may include the software RAID driver sub-engine 500 providing data to or retrieving data from the software RAID multipath plugin sub-engine 600 as described below with reference to the method 2200, and one of skill in the art in possession of the present disclosure will appreciate that other software RAID multipath plugin sub-engine 600/software RAID driver subsystem 500 communication scenarios will fall within the scope of the present disclosure as well.

Figure 17A:
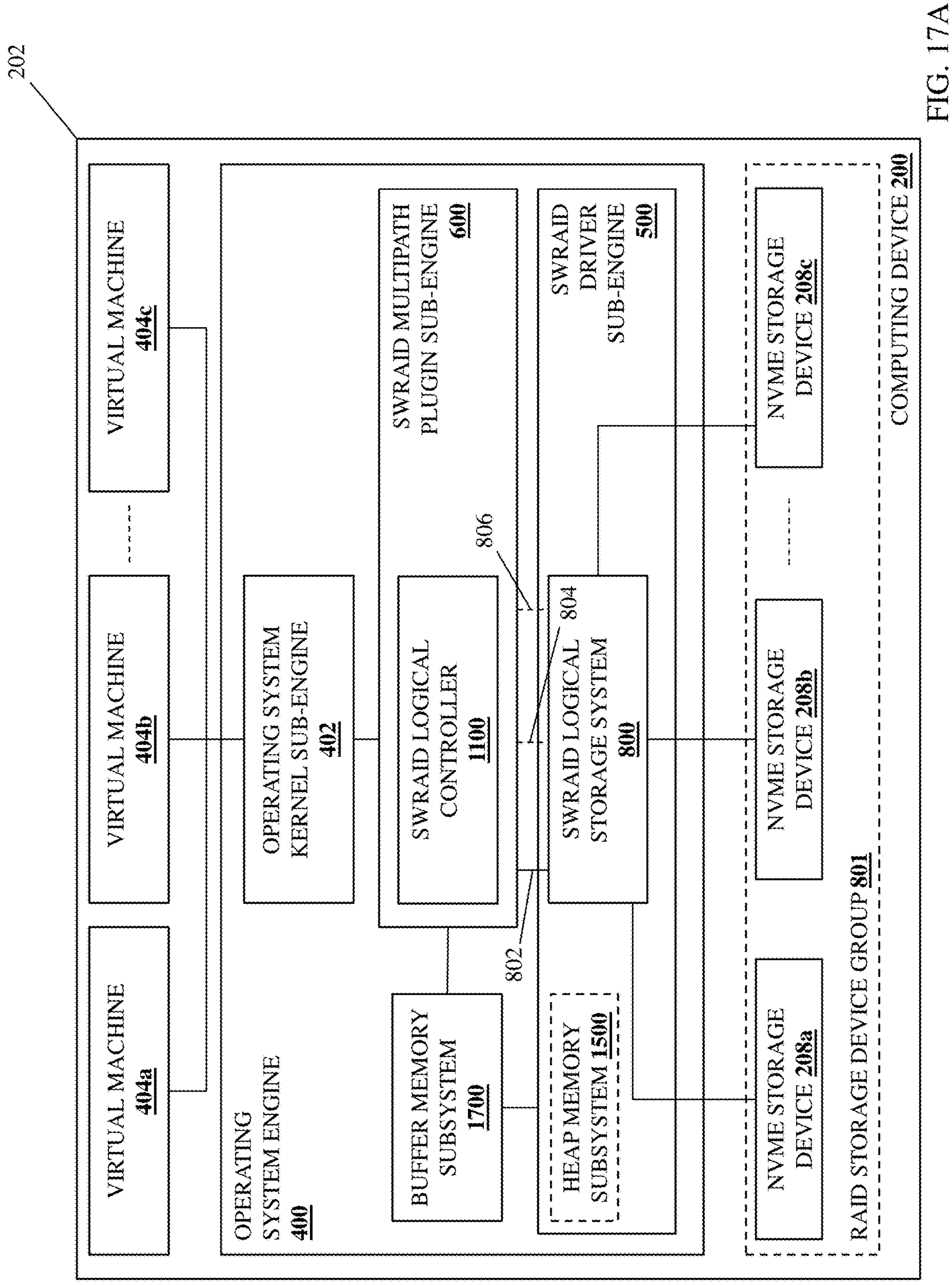
FIG. 17A is a schematic view illustrating an embodiment of the computing device of FIG. 15 operating during the method of FIG. 16.
Figure 17B:
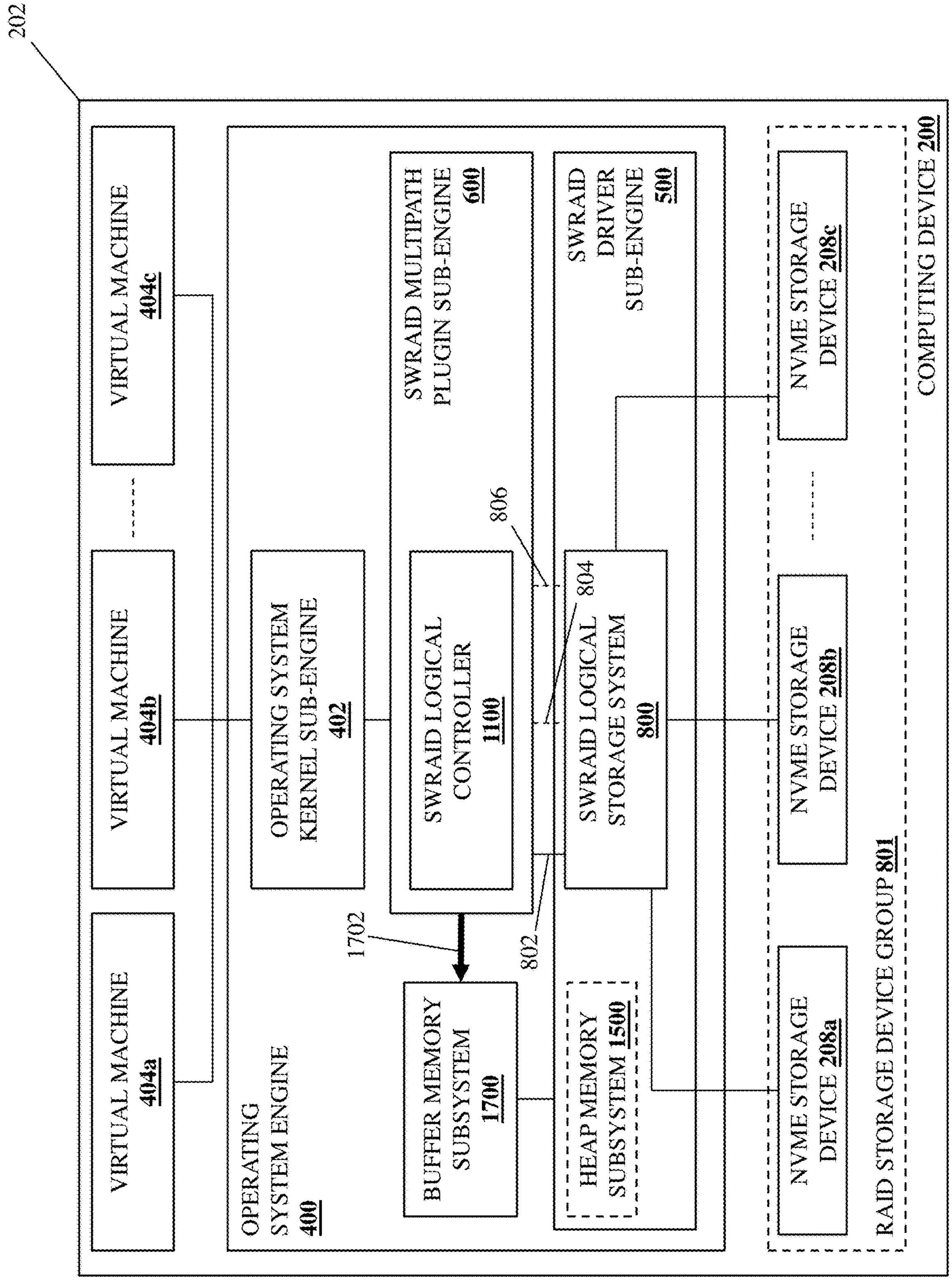
FIG. 17B is a schematic view illustrating an embodiment of the computing device of FIG. 15 operating during the method of FIG. 16.

With reference to FIG. 17A, in this first embodiment of the method 1600, the software RAID multipath plugin sub-engine 600 may determine that communication with the software RAID driver sub-engine 500 is required based on its need to provide data to or retrieve data from the software RAID driver sub-engine 500 and, in response, the software RAID multipath plugin sub-engine 600 may allocate a buffer memory subsystem 1700 from the memory system 206 that is accessible to both the software RAID multipath plugin sub-engine 600 and the software RAID driver sub-engine 500. With reference to FIG. 17B, the software RAID multipath plugin sub-engine 600 may then perform buffer memory subsystem configuration operations 1702 that include configuring the buffer memory subsystem 1700 to receive software RAID data associated with the software RAID logical storage system 800 at block 1602.

As discussed above, the software RAID multipath plugin sub-engine 600 may require storage device path data identifying at least one path to the NVMe storage devices 208*a*-208*c*, software RAID multipath plugin sub-engine configuration data for the software RAID multipath plugin sub-engine 600, event data identifying an event associated with the software RAID driver subs-engine 500, log data for logs generated by the software RAID driver sub-engine 500, hot plug data identifying the hot-plugging of a hot-plugged device (e.g., an NVMe storage device that has been hot-plugged or otherwise added to the RAID storage device group 801) and/or any other software RAID logical storage system data known in the art and, in response, the software RAID multipath plugin sub-engine 600 may allocate the buffer memory subsystem 1700 and configure it to receive that software RAID data. However, while specific software RAID data required by the software RAID multipath plugin sub-engine 600 has been described, one of skill in the art in possession of the present disclosure will appreciate how any software RAID data associated with the software RAID logical storage system 800 may be retrieved from (or provided to) the software RAID drive sub-engine 500 while remaining within the scope of the present disclosure as well.

In an embodiment, at block 1602, the configuration of the buffer memory subsystem 1700 may include configuring the buffer memory subsystem with a command section, a response section, and a status section, and then providing an operation code in the command section that identifies a type of a software RAID data command that will be used with the buffer memory subsystem 1700, identifying the software RAID data being requested in the command section, and providing a status in the status section that identifies a status of that software RAID data command.

In the specific examples provided below, the software RAID data command is a read command (i.e., a software RAID data command being used to retrieve data from the software RAID driver sub-engine 500), and thus the operation code provided in the command section may identify a read type for the software RAID data command, but one of skill in the art in possession of the present disclosure will appreciate how the operation code provided in the command section may identify a write type for the software RAID data command in the event it is a write command (i.e., a software RAID data command being used to provide data to the software RAID driver sub-engine 500). In either scenario, at block 1602, a "PENDING" status may be provided in the status section. However, while a specific example of the use of the buffer memory subsystem 1700 has been described, one of skill in the art in possession of the present disclosure will appreciate how the buffer memory subsystem 1700 may be used in a variety of manners to enable the functionality described below.

The method 1600 then proceeds to block 1604 where the software RAID multipath plugin subsystem generates a software RAID data command requesting software RAID data from the software RAID driver subsystem. In an embodiment, at block 1604, the software RAID multipath plugin sub-engine 600 may generate a software RAID data command that is required to enable communication with the software RAID driver sub-engine 500 described above. In the specific examples provided below, the software RAID multipath plugin sub-engine 600 requires data from the software RAID driver sub-engine 500, and thus the software RAID data command may be provided by a Small Computer System Interface (SCSI) read command that one of skill in the art in possession of the present disclosure will appreciate may be provided by a custom/modified SCSI read command. For example, the software RAID multipath plugin sub-engine 600 may use an operating system Application Programming Interface (API) to create the SCSI read command at block 1604 (e.g., using a "vmk_ScsiCreateCommand" API for the ESXi hypervisor/operating system available from VMWARE® Inc. of Palo Alto, California, United States), although other command creation techniques will fall within the scope of the present disclosure as well.

However, while the creation of a SCSI read command has been described, one of skill in the art in possession of the present disclosure will appreciate how SCSI write commands and/or other software RAID data commands may be created at block 1604 while remaining within the scope of the present disclosure as well. Furthermore, while the software RAID multipath command is illustrated and described as being created following the allocation and configuration of the buffer memory subsystem 1700, one of skill in the art in possession of the present disclosure will appreciate how the software RAID multipath command may be created prior to, or at the same time, as the allocation and configuration of the buffer memory subsystem 1700 while remaining within the scope of the present disclosure as well.

Figure 17C:
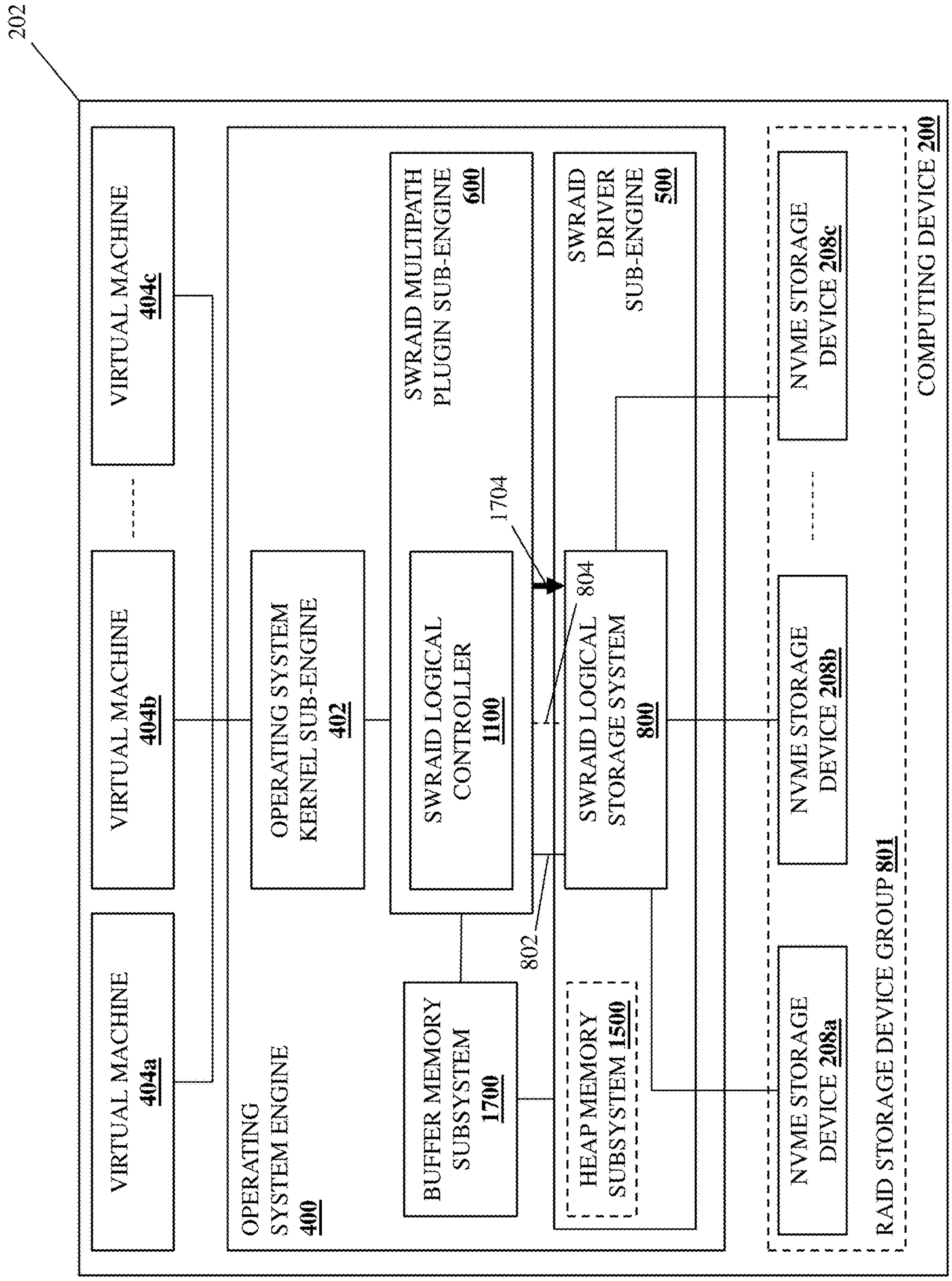
FIG. 17C is a schematic view illustrating an embodiment of the computing device of FIG. 15 operating during the method of FIG. 16.

The method 1600 then proceeds to block 1606 where the software RAID multipath plugin subsystem transmits the software RAID data command via a failover path to the software RAID driver subsystem and initiates a software RAID data command timer. With reference to FIG. 17C, in an embodiment of block 1606, the software RAID multipath plugin sub-engine 600 may identify the failover path 806 for the software RAID logical storage system 800, and then perform software RAID data command transmission operations 1704 that include transmitting the software RAID data command created at block 1604 via the failover path 806 to the software RAID logical storage system 800 such that it is received by the software RAID driver sub-engine 500. However, while the software RAID data command transmission operations 1704 are described as utilizing the failover path 806, one of skill in the art in possession of the present disclosure will appreciate how the failover path 804 and/or any other inactive/standby path may be utilized at block 1606 while remaining within the scope of the present disclosure as well. As will be appreciated by one of skill in the art in possession of the present disclosure, the use of the failover path 806 will prevent the communication between the software RAID multipath plugin sub-engine 600 and the software RAID driver sub-engine 500 from interfering with data transmissions that are performed via the active path 802 to store data in, or retrieve data from, the software RAID logical storage system 800.

As part of the software RAID data command transmission operations 1704, the software RAID multipath plugin sub-engine 600 may initiate a software RAID data command timer, and one of skill in the art in possession of the present disclosure will appreciate how the software RAID data command timer may be initiated immediate prior to, at the same time as, or immediately following the transmitting of the software RAID data command at block 1606. As described below, the software RAID data command timer may be configured, following its initiation, to complete after some time period during which the software RAID driver sub-engine 500 is expected to complete the execution of the software RAID data command. As such, the time period in which the software RAID data command timer is configured to complete may vary depending on the software RAID data commands and the capabilities of the software RAID driver sub-engine 500 to complete their execution, and any of a variety of time periods are envisioned as falling within the scope of the present disclosure.

Figure 18:
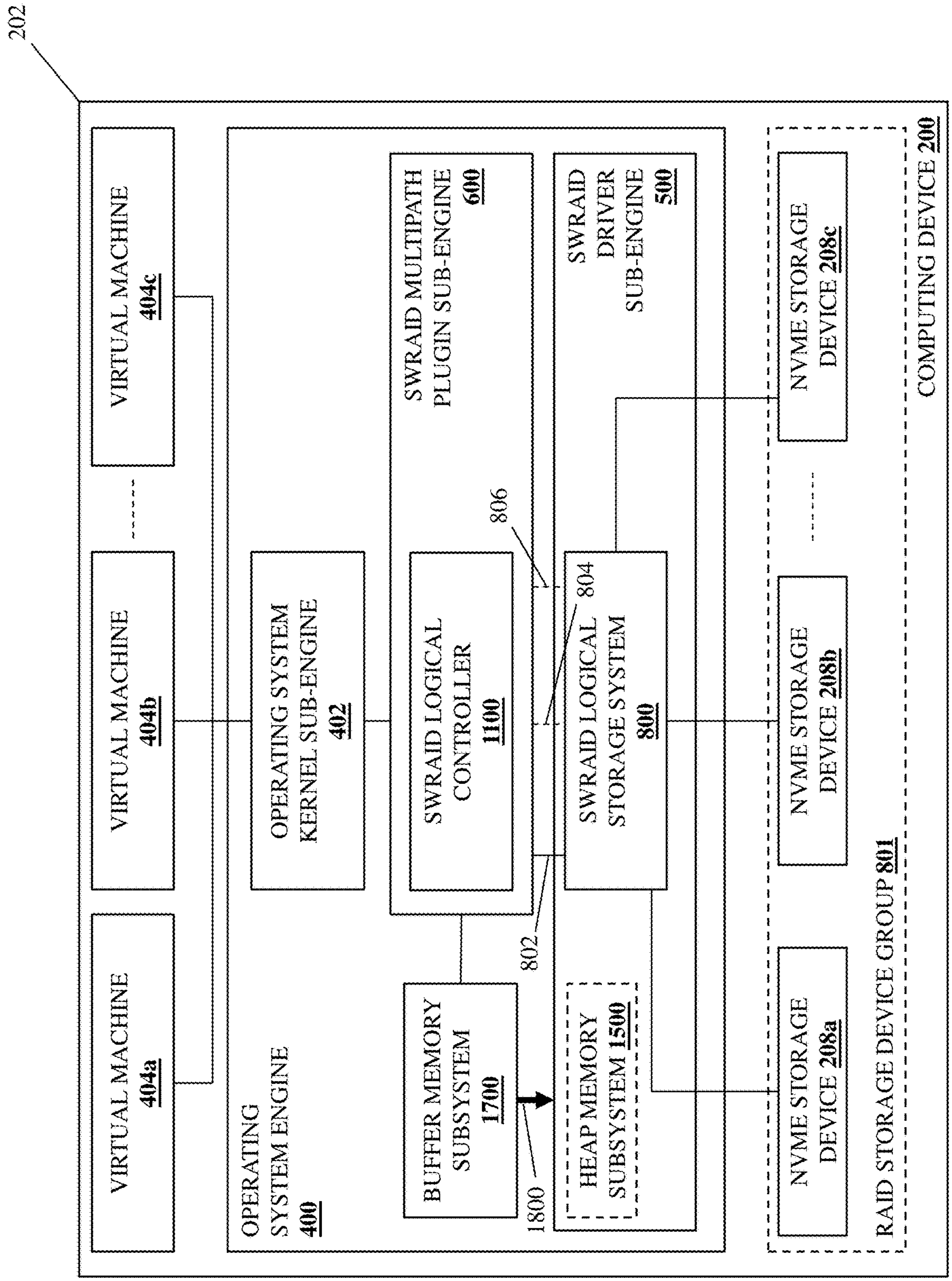
FIG. 18 is a schematic view illustrating an embodiment of the computing device of FIG. 15 operating during the method of FIG. 16.

The method 1600 then proceeds to block 1608 where the software RAID driver subsystem receives the software RAID data command and provides the software RAID data in the buffer memory subsystem. With reference to FIG. 18, in an embodiment of block 1608 and in response to receiving the software RAID data command, the software RAID driver sub-engine 500 may perform buffer memory subsystem access operations 1800 that include accessing the buffer memory subsystem 1700 that was allocated for that software RAID data command to identify the type of the software RAID data command, the software RAID data being requested by that software RAID data command, and the status of that software RAID data command. Continuing with the specific example provided above, in response to receiving the SCSI read command, the buffer memory subsystem access operations 1800 by the software RAID driver sub-engine 500 may include accessing the configuration section of the buffer memory subsystem 1700 to identify the read type of the SCSI read command and the software RAID data being requested by the SCSI read command, and accessing the status section of the buffer memory subsystem 1700 to identify the "PENDING"status of the SCSI read command.

In other embodiments, and as will be appreciated by one of skill in the art in possession of the present disclosure, in response to receiving a SCSI write command, the buffer memory subsystem access operations 1800 by the software RAID driver sub-engine 500 may include accessing the configuration section of the buffer memory subsystem 1700 to identify the write type of the SCSI write command and the software RAID data being provided by the SCSI write command, and accessing the status section of the buffer memory subsystem 1700 to identify the "PENDING" status of the SCSI write command. However, while two specific software RAID data commands have been described, one of skill in the art in possession of the present disclosure will appreciate how the software RAID driver sub-engine 500 may access the buffer memory subsystem 1700 to identify the details of any software RAID data command received from the software RAID multipath plugin sub-engine 600 while remaining within the scope of the present disclosure as well.

Figure 19A:
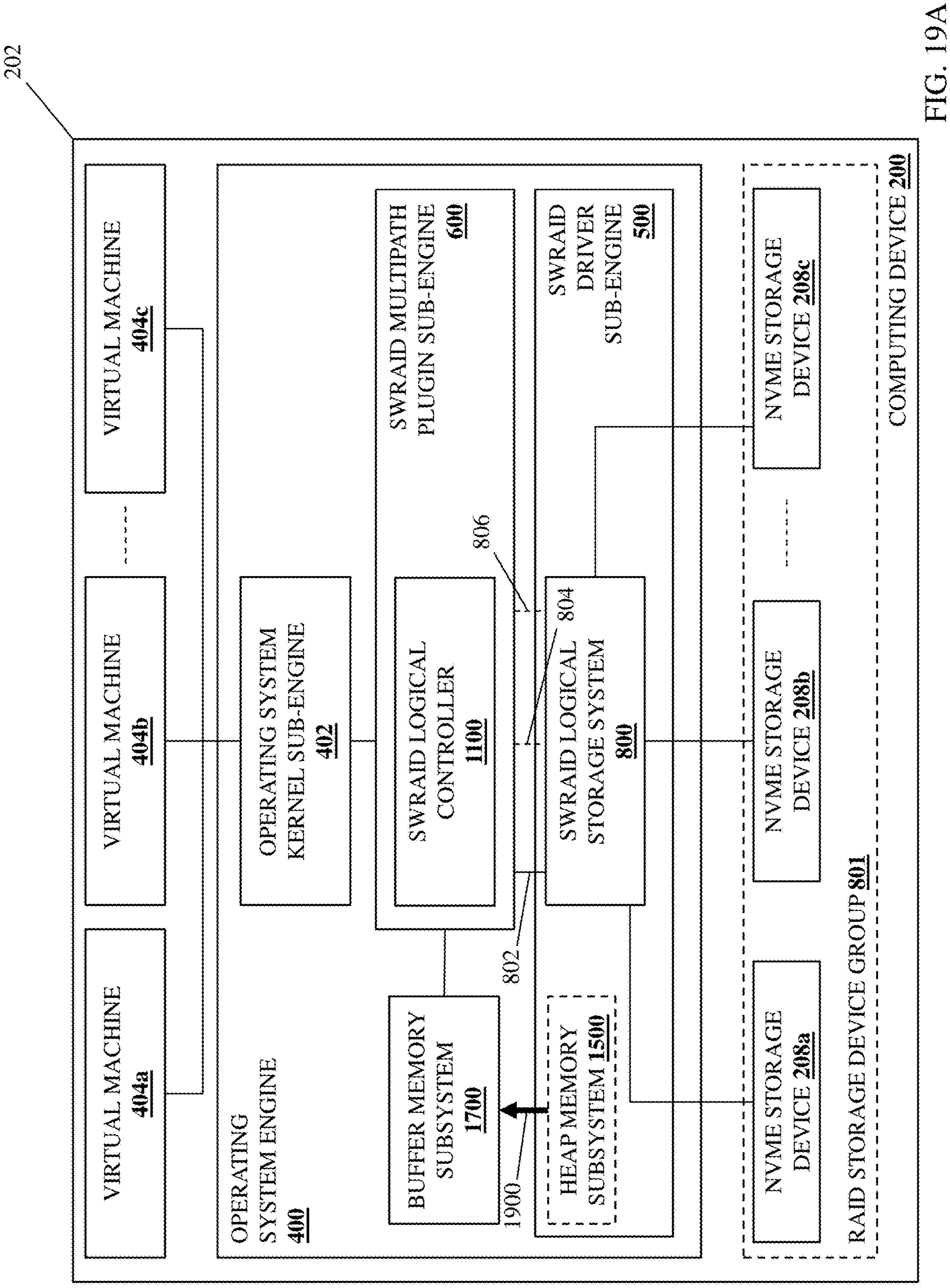
FIG. 19A is a schematic view illustrating an embodiment of the computing device of FIG. 15 operating during the method of FIG. 16.

With reference to FIG. 19A, in embodiments in which the software RAID data command is a SCSI read command, the software RAID driver sub-engine 500 may perform software RAID data provisioning operations 1900 that include copying data that was requested by the SCSI read command from the heap memory subsystem 1500 to the response section of the buffer memory subsystem 1700. In many examples, the software RAID data requested by the SCSI read command may have previously been provided in the heap memory subsystem 1500 by the software RAID driver sub-engine 500, and thus the software RAID driver sub-engine 500 may copy that software RAID data from the heap memory subsystem 1500 to the response section of the buffer memory subsystem 1700 upon receiving the SCSI read command and identifying its details in the buffer memory subsystem 1700. However, in examples in which the software RAID data requested by the SCSI read command is not stored in the heap memory subsystem 1500 when the SCSI read command is received, the software RAID driver sub-engine 500 may retrieve, generate, and/or otherwise access that software RAID data, provide it in the heap memory subsystem 1500, and then copy it from the heap memory subsystem 1500 to the response section of the buffer memory subsystem 1700 upon receiving the SCSI read command and identifying its details in the buffer memory subsystem 1700.

As such, at block 1608, the software RAID driver sub-engine 500 may copy storage device path data identifying at least one path to the NVMe storage devices 208*a*-208*c*, software RAID multipath plugin sub-engine configuration data for the software RAID multipath plugin sub-engine 600, event data identifying an event associated with the software RAID driver subs-engine 500, log data for logs generated by the software RAID driver sub-engine 500, hot plug data identifying the hot-plugging of a hot-plugged device (e.g., an NVMe storage device that has been hot-plugged or otherwise added to the RAID storage device group 801), and/or any other software RAID logical storage system data, from the heap memory subsystem 1500 to the response section of the buffer memory subsystem 1700. Following the copying of the software RAID data from the heap memory subsystem 1500 to the response section of the buffer memory subsystem 1700, the software RAID driver sub-engine 500 may change the "PENDING" status in the status section of the buffer memory subsystem 1700 to a "COMPLETE"status.

Figure 19B:
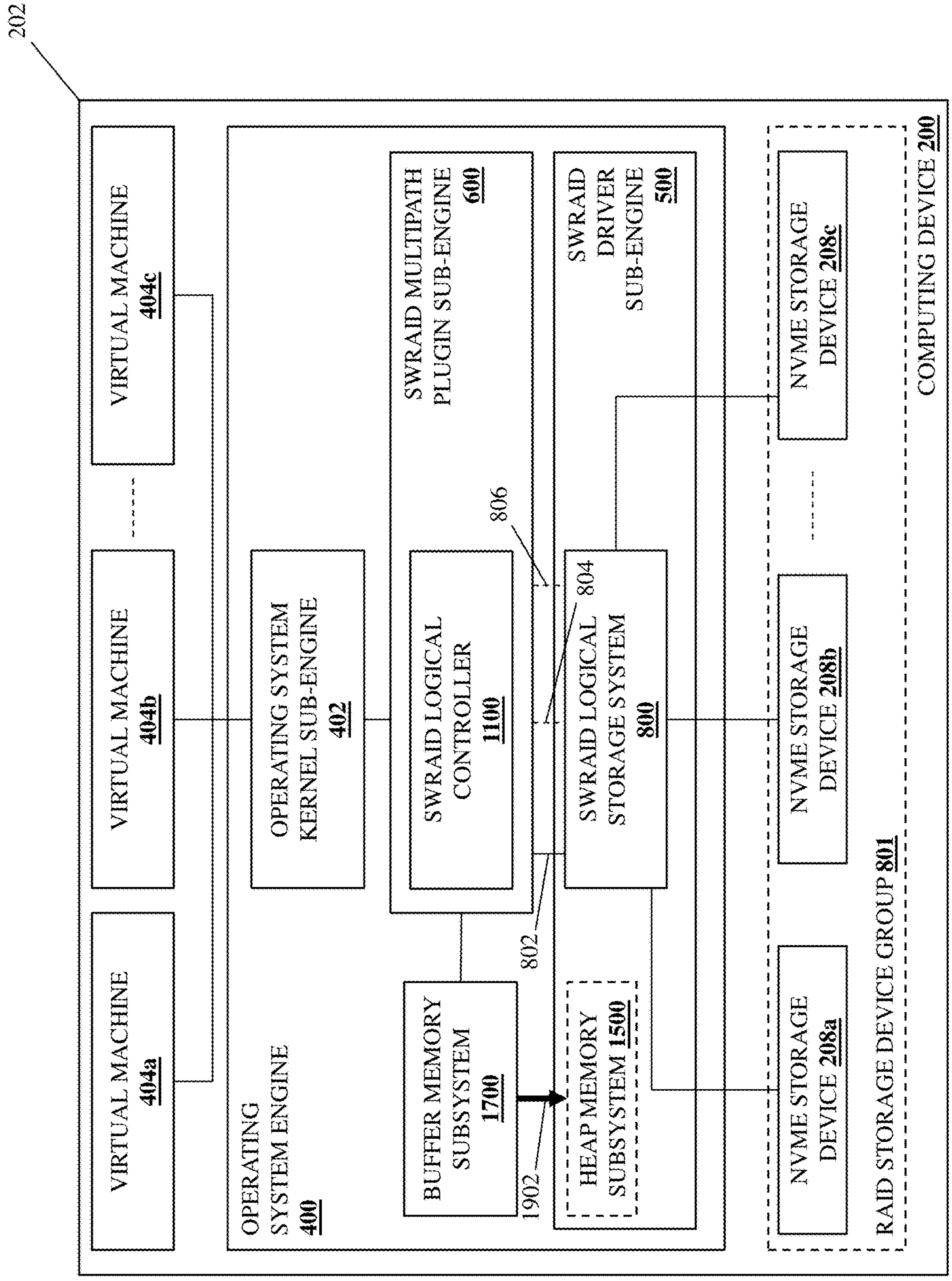
FIG. 19B is a schematic view illustrating an embodiment of the computing device of FIG. 15 operating during the method of FIG. 16.

With reference to FIG. 19B, in embodiments in which the software RAID data command is a SCSI write command, the software RAID driver sub-engine 500 may perform software RAID data retrieval operations 1902 that include copying data that was identified by the SCSI write command from the buffer memory subsystem 1700 to the heap memory subsystem 1500. Following the copying of the software RAID data from the buffer memory subsystem 1700 to the heap memory subsystem 1500, the software RAID driver sub-engine 500 may change the "PENDING" status in the status section of the buffer memory subsystem 1700 to a "COMPLETE" status.

Figure 20:
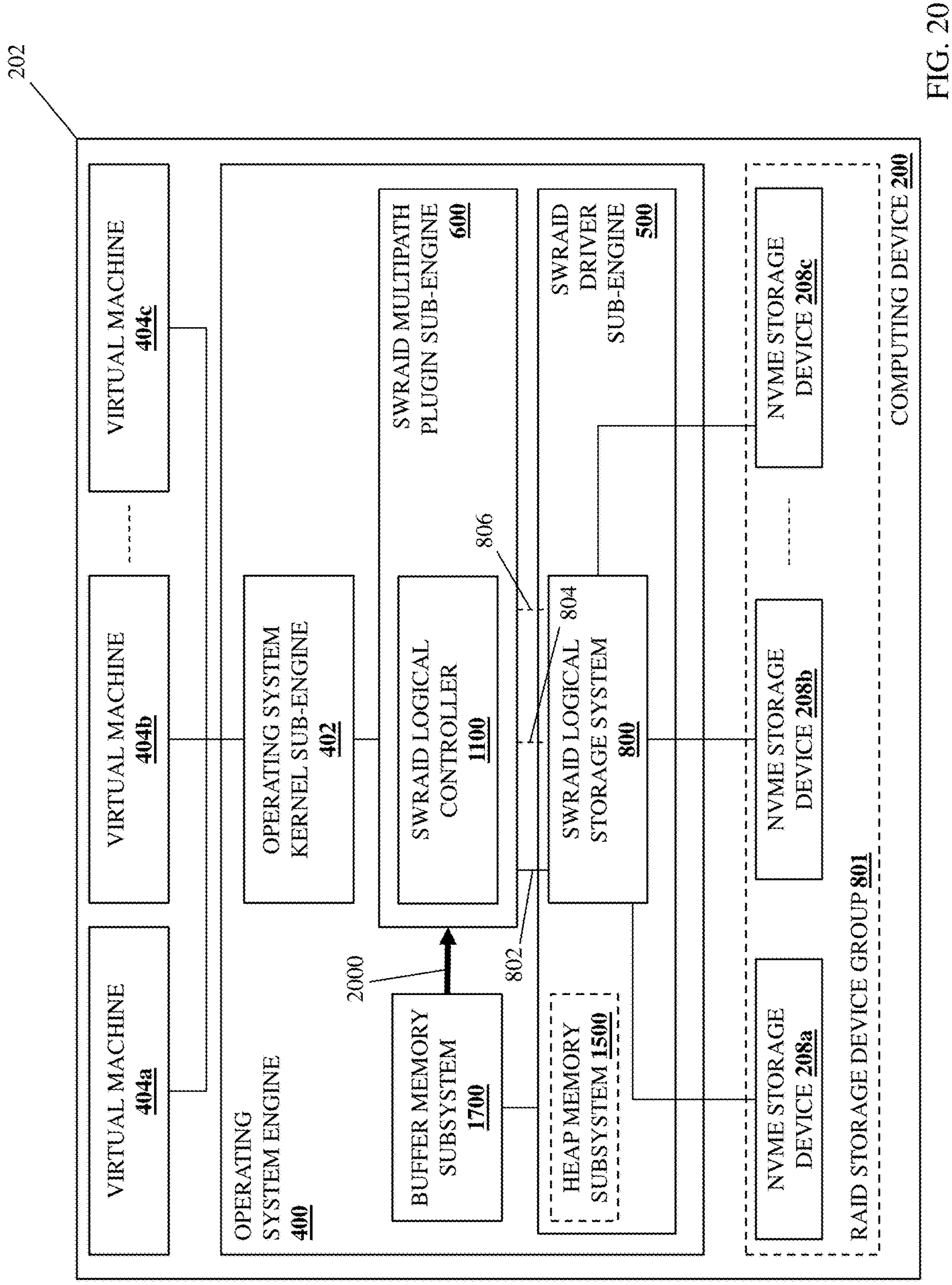
FIG. 20 is a schematic view illustrating an embodiment of the computing device of FIG. 15 operating during the method of FIG. 16.

The method 1600 then proceeds to block 1610 where the software RAID data command timer completes and the software RAID multipath plugin subsystem retrieves the software RAID data from the buffer memory subsystem. With reference to FIG. 20, in an embodiment of block 1610, the software RAID data command timer that was initiated at block 1606 may complete and, in response, the software RAID multipath plugin sub-engine 600 may perform buffer memory subsystem access operations 2000 that include accessing the buffer memory subsystem 1700 to determine a status of the software RAID data command in the status section. As will be appreciated by one of skill in the art in possession of the present disclosure, in the event the status of the software RAID data command is still pending (i.e., a "PENDING" status remains in the status section of the buffer memory subsystem 1700), the software RAID driver sub-engine 500 may resend the software RAID data command and reset the software RAID data command timer to again have the software RAID driver sub-engine 500 attempt to execute the software RAID data command, and this process may be repeated until either the software RAID data command is completed (i.e., a "COMPLETE" status has been provided in the status section of the buffer memory subsystem 1700), or the software RAID data command has been resent a threshold number of times (after which a software RAID data command failure message may be generated, provided in a log, displayed, etc.)

Continuing with the specific example above in which the software RAID data command is a SCSI read command, in the event the status of the SCSI read command is complete (i.e., a "COMPLETE" status has been provided in the status section of the buffer memory subsystem 1700), the buffer memory subsystem access operations 2000 by the software RAID driver sub-engine 500 may include retrieving the software RAID data from the response section. However, in embodiments in which the software RAID data command is a SCSI write command, the buffer memory subsystem access operations 2000 simply include identifying when the status of the SCSI read command is complete (i.e., a "COMPLETE" status has been provided in the status section of the buffer memory subsystem 1700).

Figure 21:
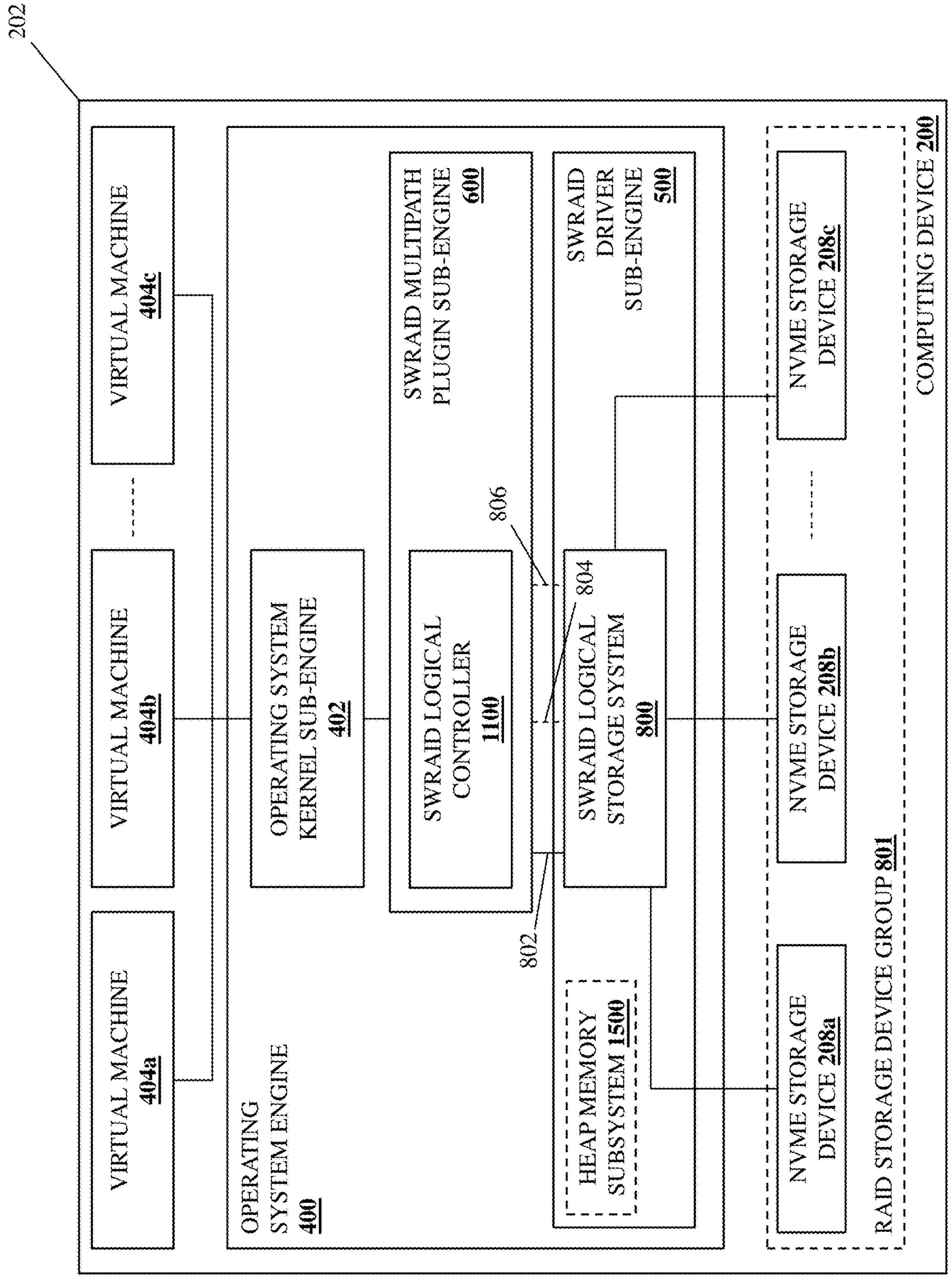
FIG. 21 is a schematic view illustrating an embodiment of the computing device of FIG. 15 operating during the method of FIG. 16.

The method 1600 may then proceed to optional block 1612 where the software RAID multipath plugin subsystem may deallocate the buffer memory subsystem. With reference to FIG. 21, in an embodiment of block 1612 and in response to the software RAID data command being completed, the software RAID multipath plugin sub-engine 600 may deallocate the buffer memory subsystem 1700 that was allocated for the software RAID data command. As will be appreciated by one of skill in the art in possession of the present disclosure, in the embodiments described above in which the software RAID multipath plugin sub-engine 600 is retrieving software RAID data from, or providing software RAID data to, the software RAID driver sub-engine 500, optional block 1612 is performed following the retrieval or provisioning of that software RAID data. However, in some of the embodiments described below in which the software RAID driver sub-engine 500 is retrieving software RAID data from, or providing software RAID data to, the software RAID multipath plugin sub-engine 600, the deallocation of the buffer memory subsystem 1700 at optional block 1612 may be delayed to allow its use for further communications between the software RAID multipath plugin sub-engine 600 and the software RAID driver sub-engine 500.

Figure 22:
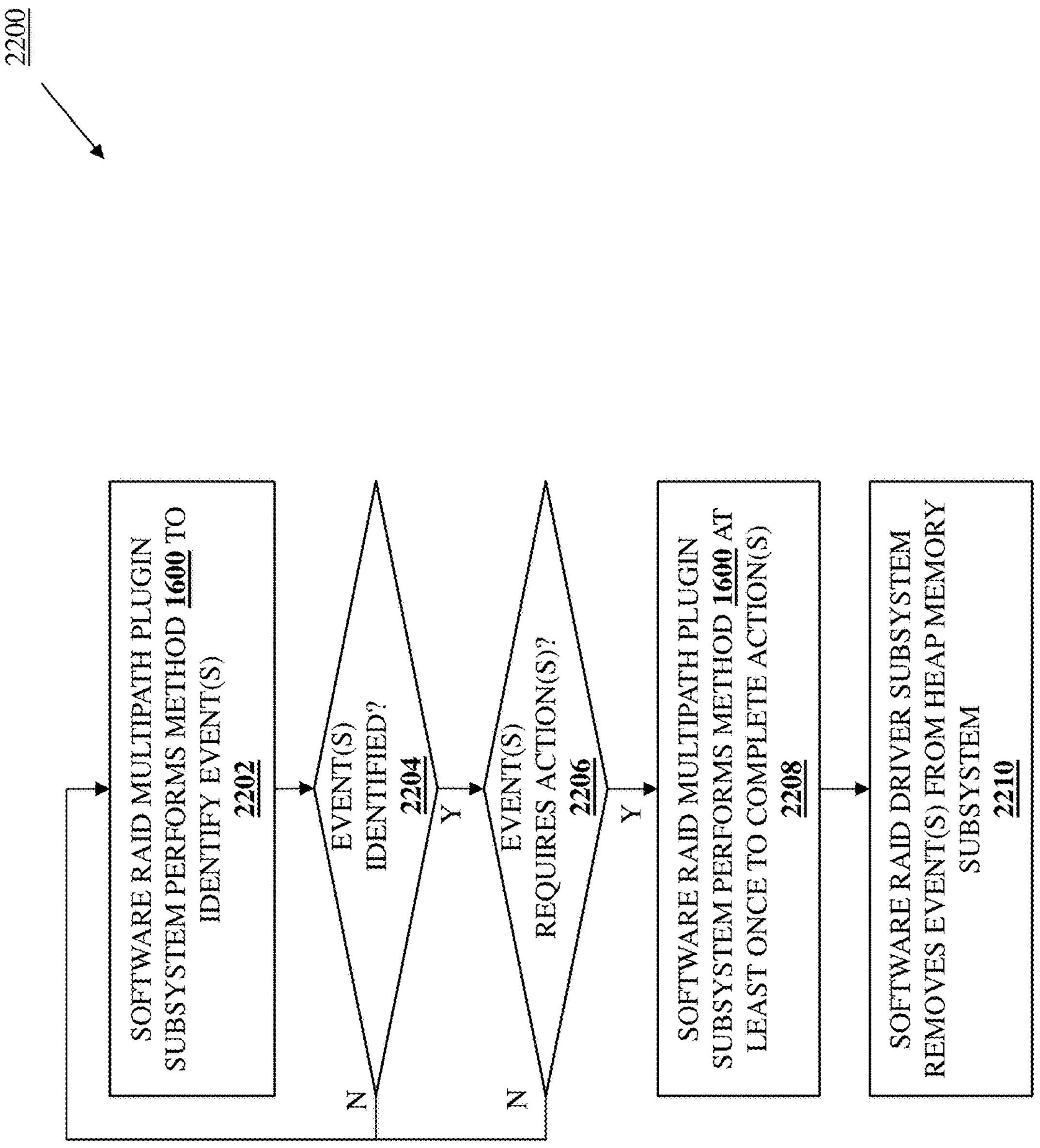
FIG. 22 is a flow chart illustrating an embodiment of a portion of a method for providing multipath plugin/driver communications in a software RAID.

Referring now to FIG. 22, an embodiment of a method 2200 for providing multipath plugin/driver communications in a software RAID is illustrated. As described below, the systems and methods of the present disclosure may utilize the method 1600 discussed above to enable a software RAID driver subsystem to communicate with a software RAID plugin subsystem via event-based communications. For example, the software RAID multipath plugin subsystem may perform the method 1600 to check for events in a heap memory subsystem of the software RAID driver subsystem that may be provided there by the software RAID driver subsystem. If event(s) are identified in the heap memory subsystem of the software RAID driver subsystem and require action(s) by the software RAID multipath plugin subsystem, the software RAID multipath plugin subsystem may perform the method 1600 at least once to complete the action(s), after which the software RAID driver subsystem may remove the event(s) from the heap memory subsystem. As such, software RAID data exchange between the software RAID multipath plugin subsystem and a software RAID driver subsystem may be performed without affecting the performance of an active path that is presented by the software RAID driver subsystem to the software RAID multipath plugin and that is used for storage data in a software RAID logical storage system.

Figure 23:
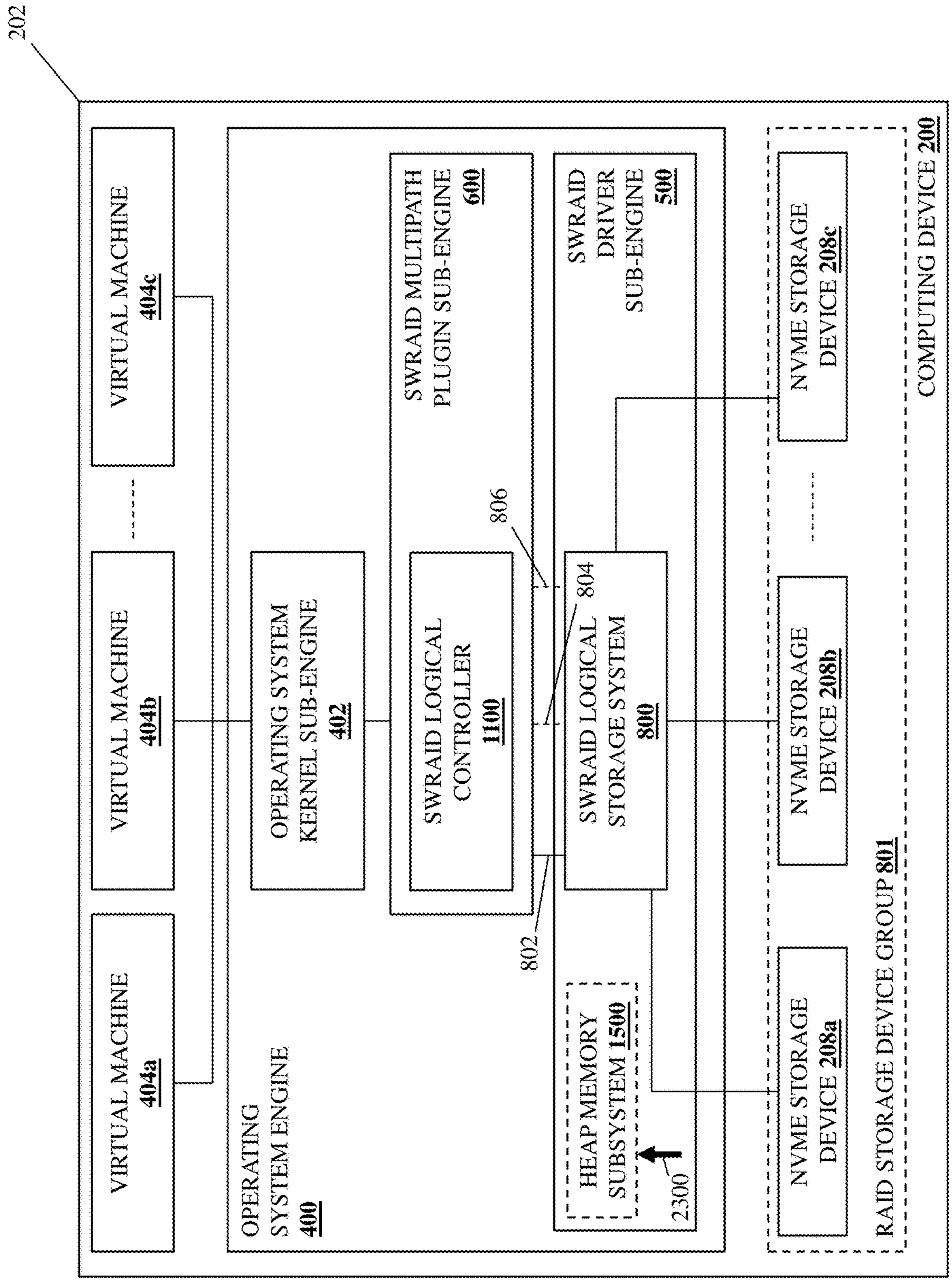
FIG. 23 is a schematic view illustrating an embodiment of the computing device of FIG. 15 operating during the method of FIG. 22.

The method 2200 begin at block 2202 where a software RAID multipath plugin subsystem performs the method 1600 to identify one or more events. With reference to FIG. 23, in an embodiment and during or prior to block 2202, the software RAID driver sub-engine 500 may perform event provisioning operations 2300 that include providing one or more events in its heap memory subsystem 1500. As will be appreciated by one of skill in the art in possession of the present disclosure, the software RAID driver sub-engine 500 is not configured to communicate with the software RAID multipath plugin sub-engine 600 via the software RAID data commands (e.g., the SCSI read commands and SCSI write commands) described above, and thus the software RAID multipath plugin/driver communication system of the present disclosure uses event-based techniques to enabled communications by the software RAID driver sub-engine 500 with the software RAID multipath plugin sub-engine 600. As such, the software RAID driver sub-engine 500 may provide events in the heap memory subsystem 1500 to request software RAID data or provide software RAID data to the software RAID multipath plugin sub-engine 600, as well as instruct the software RAID multipath plugin sub-engine 600 to perform one or more actions.

Figure 24:
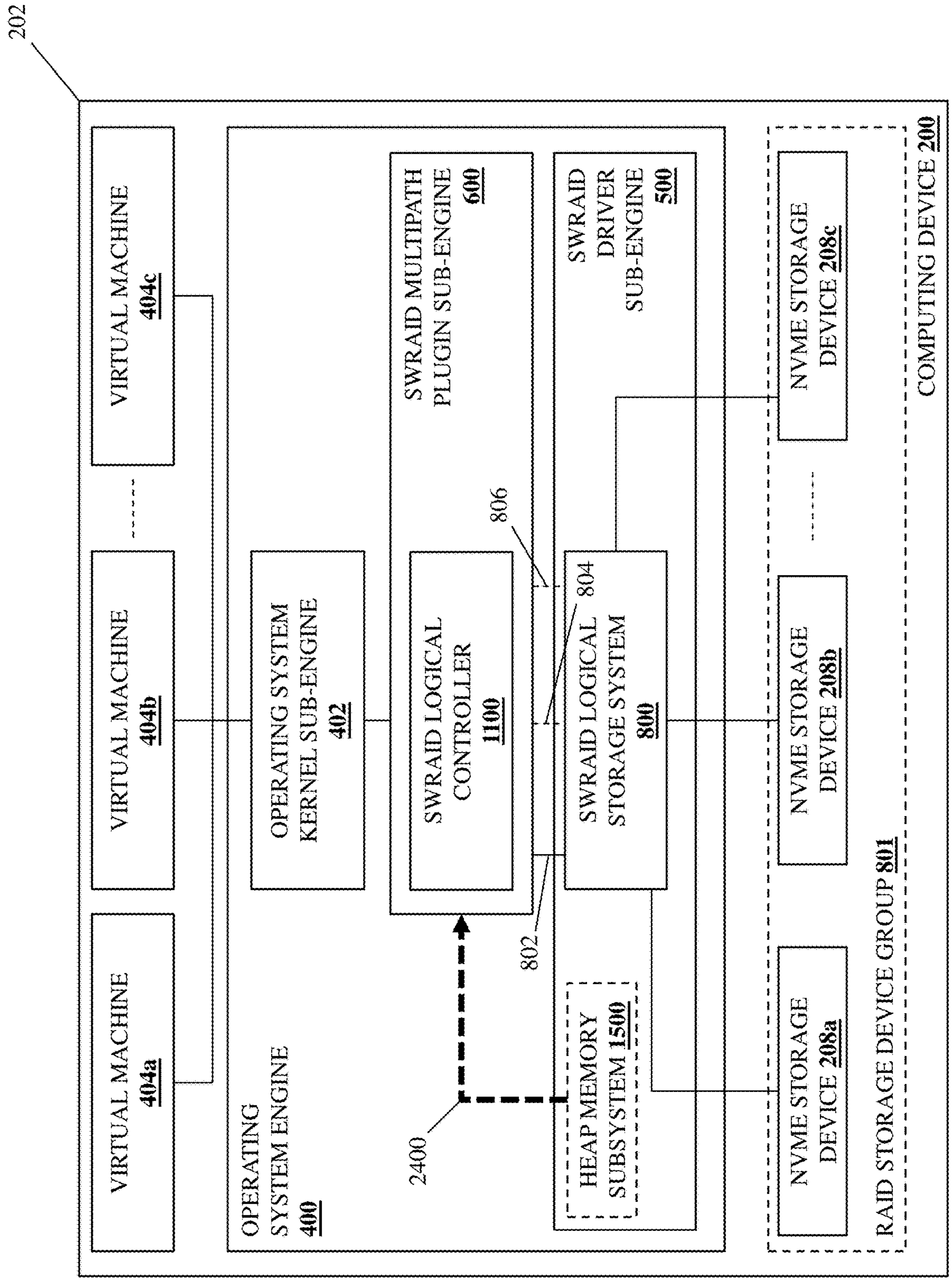
FIG. 24 is a schematic view illustrating an embodiment of the computing device of FIG. 15 operating during the method of FIG. 22.
Figure 25:
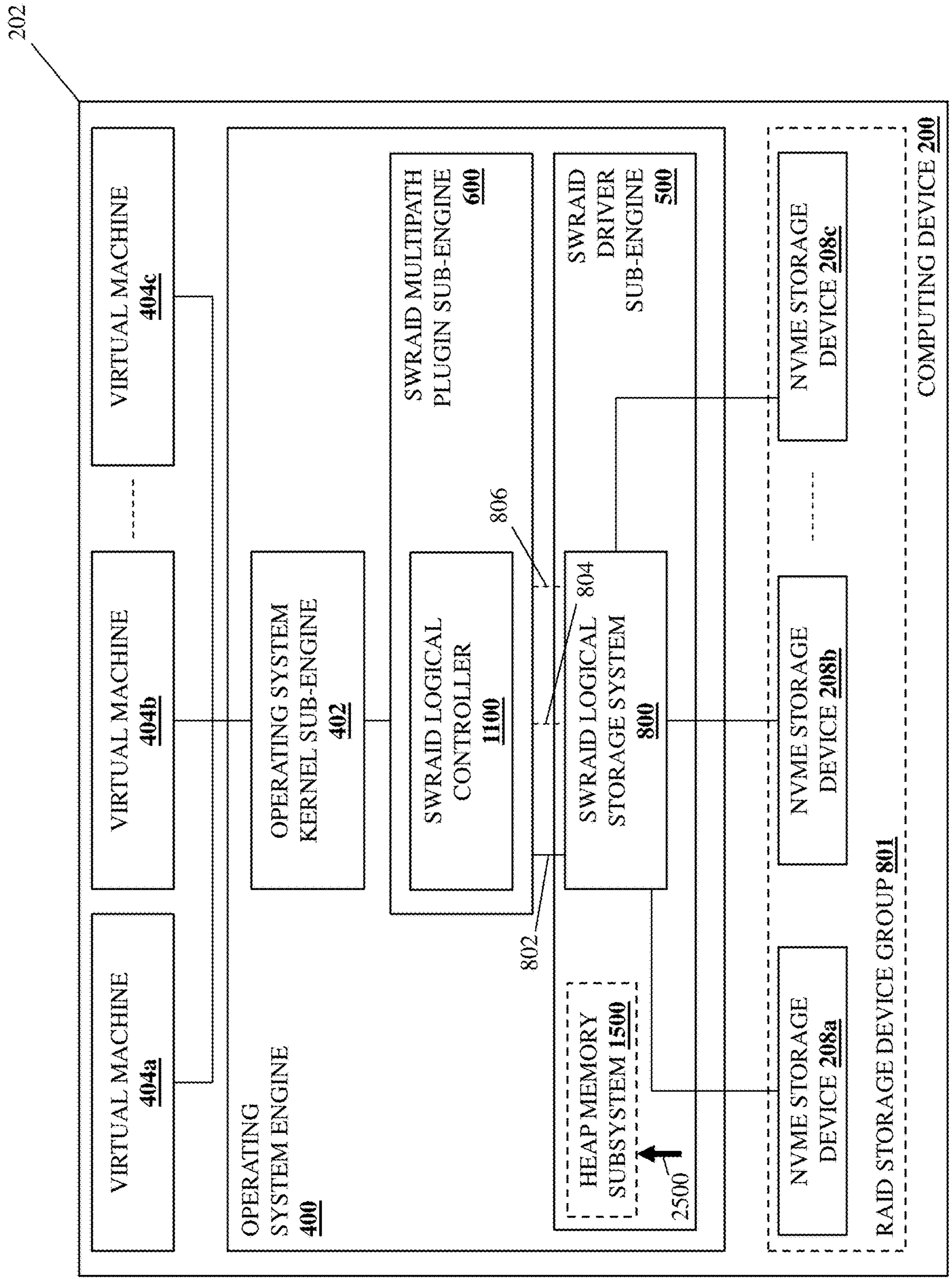
FIG. 25 is a schematic view illustrating an embodiment of the computing device of FIG. 15 operating during the method of FIG. 22.

With reference to FIG. 24, at block 2202, the software RAID multipath plugin sub-engine 600 may perform event identification operations 2400 that operate to use the method 1600 to determine whether event(s) have been provided in the heap memory subsystem 1500 by the software RAID driver sub-engine 500 (as illustrated by the bolded/dashed line for the event identification operations 2400 that indicates that those operations do not involve direct access to the heap memory subsystem 1500 by the software RAID multipath plugin sub-engine 600). For example, during or prior to the method 2200, the software RAID multipath plugin sub-engine 600 may configure a repeating event-check timer that, upon each completion of that event-check timer, causes the software RAID multipath plugin sub-engine 600 to perform the event identification operations 2400 to periodically determine whether one or more events have been provided in the heap memory subsystem 1500. However, while a specific technique for determining whether event(s) have been provided in the heap memory subsystem 1500 has been described, one of skill in the art in possession of the present disclosure will appreciate how the software RAID multipath plugin sub-engine 600 may be configured to determine whether event(s) have been provided in the heap memory subsystem 1500 using other techniques that will fall within the scope of the present disclosure as well.

As discussed above, the event identification operations 2400 may be performed at block 2202 according to the method 1600, and one of skill in the art in possession of the present disclosure will appreciate how the software RAID multipath plugin sub-engine 600 may configure a buffer memory subsystem 1700 to receive software RAID data as described above with reference to block 1602, generate a software RAID data command requesting the software RAID data as described above with reference to block 1604, transmit the software RAID data command via the failover path and initiate the software RAID data command timer as described above with reference to block 1606 (such that the software RAID driver sub-engine 500 receives that software RAID data command and provides the software RAID data in the buffer memory subsystem 1700 as described above with reference to block 1608), and retrieve the software RAID data from the buffer memory subsystem 1700 when the software RAID data command timer completes as described above with reference to block 1610.

The method 2200 then proceeds to decision block 2204 where the method 2200 proceeds depending on whether one or more events are identified in the heap memory subsystem. As discussed above, the performance of the method 1600 at block 2202 will result in the software RAID driver sub-engine 500 providing the software RAID data in the buffer memory subsystem 1700, and at decision block 2204 the software RAID multipath plugin sub-engine 600 may determine whether the software RAID data in the buffer memory subsystem 1700 includes one or more events. If, at decision block 2204, no events are identified in the heap memory subsystem, the method returns to block 2202. As such, the method 2200 may loop such that the software RAID multipath plugin sub-engine 600 periodically performs the method 1600 to determine whether event(s) have been provided in the heap memory subsystem 1500. As will be appreciated by one of skill in the art in possession of the present disclosure, if the software RAID multipath plugin sub-engine 600 determines that no events have been provided in the heap memory subsystem 1500, the software RAID multipath plugin sub-engine 600 may deallocate the buffer memory subsystem 1700 similarly as described above with reference to optional block 1612.

If, at decision block 2204, one or more events are identified in the heap memory subsystem, the method 2200 proceeds to decision block 2206 where the method 2200 proceeds depending on whether any events require at least one action. As discussed below, some events (e.g., an event that requests a configuration change in the software RAID multipath plugin sub-engine 600) may require actions (e.g., the performance of the configuration change) by the software RAID multipath plugin sub-engine 600, and thus the method 2200 may proceed at decision block 2206 depending on whether the software RAID multipath plugin sub-engine 600 is required to perform action(s) based on one or more events. If, at decision block 2206, no events require at least one action, the method returns to block 2202. As such, the method 2200 may loop such that the software RAID multipath plugin sub-engine 600 periodically performs the method 1600 to identify event(s) have been provided in the heap memory subsystem 1500 and determine whether those event(s) require action(s). As will be appreciated by one of skill in the art in possession of the present disclosure, the software RAID multipath plugin sub-engine 600 may deallocate the buffer memory subsystem 1700 similarly as described above with reference to optional block 1612 following decision block 2206 (i.e., following a determination of the event(s) that require action(s) or do not require action(s)).

If, at decision block 2206, one or more events require at least one action, the method 2200 proceeds to block 2208 where the software RAID multipath plugin subsystem performs the method 1600 at least once to complete the at least one action. In an embodiment, at block 2208 and response to identifying at least one event that includes at least one action, the software RAID multipath plugin sub-engine 600 may perform those action(s). As discussed above, the performance of action(s) at block 2208 may be according to the method 1600, and one of skill in the art in possession of the present disclosure will appreciate how the software RAID multipath plugin sub-engine 600 may, for each event requiring action(s), configure a buffer memory subsystem 1700 to receive software RAID data as part of any action for that event similarly as described above with reference to block 1602, generate a software RAID data command requesting the software RAID data as part of any action for that event similarly as described above with reference to block 1604, transmit the software RAID data command via the failover path and initiate the software RAID data command timer as part of any action for that event similarly as described above with reference to block 1606 (such that the software RAID driver sub-engine 500 receives that software RAID data command and provides the software RAID data in the buffer memory subsystem 1700 as part of any action for that event similarly as described above with reference to block 1608), and retrieve the software RAID data from the buffer memory subsystem 1700 when the software RAID data command timer completes as part of any action for that event similarly as described above with reference to block 1610.

Continuing with the specific example of the event that provides the configuration change for the software RAID multipath plugin sub-engine 600, the software RAID multipath plugin sub-engine 600 may perform the method 1600 a first time to retrieve the configuration (i.e., software RAID data in the method 1600) for the software RAID multipath plugin sub-engine 600 from the software RAID driver sub-engine 500, may perform the method 1600 any number of intermediate times as part of the configuration of the software RAID multipath plugin sub-engine 600 (with the exception of the performance of block 1602, as the same buffer memory subsystem 1700 may be used for different actions for the event for which it was created), and may perform the method 1600 a final time to report the completion of the configuration of the software RAID multipath plugin sub-engine 600 to the software RAID driver sub-engine 500 (with the exception of the performance of block 1602, as the same buffer memory subsystem 1700 may be used for different actions for the event for which it was created). As such, one of skill in the art in possession of the present disclosure will appreciate how the method 1600 may be performed by the software RAID multipath plugin sub-engine 600 different numbers of times depending on the requirements of the event(s). Following the completion of the action(s) at block 2208 for any event, the software RAID multipath plugin sub-engine 600 may deallocate the buffer memory subsystem 1700 for that event similarly as described above with reference to optional block 1612. As such, the buffer memory subsystem 1700 for any event may remain allocated for that event until the action(s) required for that event are completed.

The method 2200 then proceeds to block 2210 where the software RAID driver subsystem removes the event from the heap memory subsystem. In an embodiment, at block 2210 and following the completion of action(s) for an event, the software RAID driver sub-engine 500 may perform event removal operations 2500 that include removing that event from the heap memory subsystem 1500.

Thus, systems and methods have been described that utilize the method 1600 discussed above to enable a software RAID driver subsystem to communicate with a software RAID plugin subsystem via event-based communications. For example, the software RAID multipath plugin subsystem may perform the method 1600 to check for events in a heap memory subsystem of the software RAID driver subsystem that may be provided there by the software RAID driver subsystem. If event(s) are identified in the heap memory subsystem of the software RAID driver subsystem and require action(s) by the software RAID multipath plugin subsystem, the software RAID multipath plugin subsystem may perform the method 1600 at least once to complete the action(s), after which the software RAID driver subsystem may remove the event(s) from the heap memory subsystem. As such, software RAID data exchange between the software RAID multipath plugin subsystem and a software RAID driver subsystem may be performed without affecting the performance of an active path that is presented by the software RAID driver subsystem to the software RAID multipath plugin and that is used for storage data in a software RAID logical storage system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A software Redundant Array of Independent Disks (RAID) communication system for communicating between a software RAID multipath plugin and a software RAID multipath driver, comprising:

a plurality of physical storage devices that are configured to provide a software RAID logical storage system;

a software Redundant Array of Independent Disks (RAID) driver subsystem that presents an active path to a primary controller for the software RAID logical storage system that is provided by a first physical storage device included in the plurality of physical storage devices, and a failover path to a secondary controller for the software RAID logical storage system that is provided by a second physical storage device included in the plurality of physical storage devices; and a software RAID multipath plugin subsystem that is coupled to the software RAID driver subsystem, wherein the software RAID multipath plugin subsystem is configured to:

receive data-storage-related commands that are related to storage of data in the software RAID logical storage system;

transmit the data-storage-related commands via the active path to the software RAID driver subsystem in response to receiving the data-storage-related commands;

configure a buffer memory subsystem to receive software RAID data that is unrelated to the storage of data in the software RAID logical storage system;

generate a software RAID data command that requests the software RAID data from the software RAID driver subsystem;

transmit the software RAID data command via the failover path to the software RAID driver subsystem while the active path to the software RAID driver subsystem is being used to transmit at least one of the data-storage-related commands;

initiate a software RAID data command timer in response to transmitting the software RAID data command; and retrieve the software RAID data from the buffer memory subsystem in response to completion of the software RAID data command timer.

2. The system of claim 1, wherein the software RAID data command is a Small Computer System Interface (SCSI) command.

3. The system of claim 1, wherein the configuration of the buffer memory subsystem to receive the software RAID data includes allocating the buffer memory subsystem and configuring the buffer memory subsystem with a command section, a response section, and a status section.

4. The system of claim 3, wherein the configuration of the buffer memory subsystem to receive the software RAID data includes providing an operation code in the command section that identifies a read or write type of the software RAID data command, and providing a status in the status section.

5. The system of claim 3, wherein the retrieving the software RAID data from the buffer memory subsystem in response to completion of the software RAID data command timer includes identifying a status in the status section that has been updated by the software RAID driver subsystem.

6. The system of claim 1, wherein the software RAID multipath plugin subsystem is configured to:

deallocate the buffer memory subsystem subsequent to retrieving the software RAID data from the buffer memory subsystem.

7. An Information Handling System (IHS), comprising:

a processing system; and a memory system that is coupled to the processing system and that includes instructions that, when executed by the processing system, cause the processing system to provide an operating system engine that includes:

a software Redundant Array of Independent Disks (RAID) multipath plugin sub-engine is configured to:

receive data-storage-related commands that are related to storage of data in a software RAID logical storage system that is provided by a plurality of physical storage devices and for which a software RAID driver sub-engine included in the operating system engine presents:

an active path to a primary controller for the software RAID logical storage system that is provided by a first physical storage device included in the plurality of physical storage devices; and a failover path to a secondary controller for the software RAID logical storage system that is provided by a second physical storage device included in the plurality of physical storage devices;

transmit the data-storage-related commands via the active path to the software RAID driver subsystem in response to receiving the data-storage-related commands;

configure a buffer memory subsystem to receive software RAID data that is unrelated to the storage of data in the software RAID logical storage system;

generate a software RAID data command that requests the software RAID data from the software RAID driver sub-engine;

transmit the software RAID data command via the failover path to the software RAID driver sub-engine while the active path to the software RAID driver subsystem is being used to transmit at least one of the data-storage-related commands;

initiate a software RAID data command timer in response to transmitting the software RAID data command; and retrieve the software RAID data from the buffer memory subsystem in response to completion of the software RAID data command timer.

8. The IHS of claim 7, wherein the software RAID data command is a Small Computer System Interface (SCSI) command.

9. The IHS of claim 7, wherein the configuration of the buffer memory subsystem to receive the software RAID data includes allocating the buffer memory subsystem and configuring the buffer memory subsystem with a command section, a response section, and a status section.

10. The IHS of claim 9, wherein the configuration of the buffer memory subsystem to receive the software RAID data includes providing an operation code in the command section that identifies a read or write type of the software RAID data command, and providing a status in the status section.

11. The IHS of claim 9, wherein the retrieving the software RAID data from the buffer memory subsystem in response to completion of the software RAID data command timer includes identifying a status in the status section that has been updated by the software RAID driver subsystem.

12. The IHS of claim 7, wherein the software RAID multipath plugin sub-engine is configured to:

deallocate the buffer memory subsystem subsequent to retrieving the software RAID data from the buffer memory subsystem.

13. The IHS of claim 7, wherein the software RAID data includes at least one of: storage device path data identifying at least one path to the plurality of storage devices, software RAID multipath plugin sub-engine configuration data for the software RAID multipath plugin sub-engine, event data identifying an event associated with the software RAID driver subsystem, log data for logs generated by the software RAID driver sub-engine, and hot plug data identifying the hot-plugging of a hot-plugged device.

14. A method for communicating between a software Redundant Array of Independent Disks (RAID) multipath plugin and a software RAID driver in a software Redundant Array of Independent Disks (RAID), comprising:

receiving, by a software Redundant Array of Independent Disks (RAID) multipath plugin subsystem included in an operating system, data-storage-related commands that are related to storage of data in a software RAID logical storage system that is provided by a plurality of physical storage devices and for which a software RAID driver sub-engine included in the operating system engine presents:

an active path to a primary controller for the software RAID logical storage system that is provided by a first physical storage device included in the plurality of physical storage devices; and a failover path to a secondary controller for the software RAID logical storage system that is provided by a second physical storage device included in the plurality of physical storage devices;

transmitting, by the software RAID multipath plugin subsystem, the data-storage-related commands via the active path to the software RAID driver subsystem in response to receiving the data-storage-related commands;

configuring, by the software RAID multipath plugin subsystem, a buffer memory subsystem to receive software RAID data that is unrelated to the storage of data in the software RAID logical storage system;

generating, by the software RAID multipath plugin subsystem, a software RAID data command that requests the software RAID data from the software RAID driver subsystem;

transmitting, by the software RAID multipath plugin subsystem, the software RAID data command via the failover path to the software RAID driver subsystem while the active path to the software RAID driver subsystem is being used to transmit at least one of the data-storage-related commands;

initiating, by the software RAID multipath plugin subsystem, a software RAID data command timer in response to transmitting the software RAID data command; and retrieving, by the software RAID multipath plugin subsystem, the software RAID data from the buffer memory subsystem in response to completion of the software RAID data command timer.

15. The method of claim 14, wherein the software RAID data command is a Small Computer System Interface (SCSI) command.

16. The method of claim 14, wherein the configuration of the buffer memory subsystem to receive the software RAID data includes allocating the buffer memory subsystem and configuring the buffer memory subsystem with a command section, a response section, and a status section.

17. The method of claim 16, wherein the configuration of the buffer memory subsystem to receive the software RAID data includes providing an operation code in the command section that identifies a read or write type of the software RAID data command, and providing a status in the status section.

18. The method of claim 16, wherein the retrieving the software RAID data from the buffer memory subsystem in response to completion of the software RAID data command timer includes identifying a status in the status section that has been updated by the software RAID driver subsystem.

19. The method of claim 14, further comprising:

deallocating, by the software RAID multipath plugin subsystem, the buffer memory subsystem subsequent to retrieving the software RAID data from the buffer memory subsystem.

20. The method of claim 14, wherein the software RAID data includes at least one of: storage device path data identifying at least one path to the plurality of storage devices, software RAID multipath plugin sub-engine configuration data for the software RAID multipath plugin sub-engine, event data identifying an event associated with the software RAID driver subsystem, log data for logs generated by the software RAID driver sub-engine, and hot plug data identifying the hot-plugging of a hot-plugged device.

* * * * *